US011908264B2

(12) United States Patent
Baydin et al.

(10) Patent No.: US 11,908,264 B2
(45) Date of Patent: *Feb. 20, 2024

(54) MULTIPURPOSE CASHBAG LEVEL AND BANKNOTE PRESENCE IN ESCROW DETECTOR

(71) Applicant: Crane Payment Innovations, Inc., Malvern, PA (US)

(72) Inventors: Dmytro Baydin, Glenmoore, PA (US); Pavlo Tsushko, Kyiv (UA); Yurii Rudenko, Kyiv (UA); Vitaliy Kochubey, Kyiv (UA); David Charles Deaville, West Chester, PA (US); Vjatseslav Balovnev, Knutsford (GB)

(73) Assignee: Crane Payment Innovations, Inc., Malvern, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/452,312

(22) Filed: Oct. 26, 2021

(65) Prior Publication Data

US 2022/0044514 A1 Feb. 10, 2022

Related U.S. Application Data

(63) Continuation of application No. 16/175,608, filed on Oct. 30, 2018, now Pat. No. 11,210,887.

(30) Foreign Application Priority Data

Jul. 19, 2018 (UA) .............................. a 2018 08046

(51) Int. Cl.

*B65B 5/06* (2006.01)
*B65B 57/10* (2006.01)

(Continued)

(52) U.S. Cl.

CPC .............. *G07D 11/23* (2019.01); *B65B 5/067* (2013.01); *B65B 51/10* (2013.01); *B65B 57/10* (2013.01);

(Continued)

(58) Field of Classification Search

CPC .......... B65B 57/10; B65H 31/02; B65H 31/34

(Continued)

(56) References Cited

U.S. PATENT DOCUMENTS

| | | | | |
|---|---|---|---|---|
| 3,741,656 A | | 6/1973 | Shapiro | |
| 4,074,507 A | * | 2/1978 | Ruf | B65B 55/24 53/502 |

(Continued)

FOREIGN PATENT DOCUMENTS

| | | |
|---|---|---|
| DE | 102008003917 A1 | 7/2009 |
| EP | 1413703 A2 | 4/2004 |

(Continued)

OTHER PUBLICATIONS

ISA/US, "International Search Report and Written Opinion of the International Searching Authority," International Application No. PCT/US18/58273, Jan. 22, 2019, 13 pages.

(Continued)

*Primary Examiner* — Thanh K Truong
*Assistant Examiner* — Patrick B Fry

(57) ABSTRACT

This disclosure relates to a cashbag sealing system. The system comprises a banknote transport mechanism operable to transport a banknote to a storing unit. The storing unit includes a banknote storing bag detachably coupled to the storing unit, and an escrow plate operable to escrow the banknote before the banknote transported to the storing unit is stored in the banknote storing bag, wherein the escrow plate is operable to move from a horizontally extending hold position to a downwardly or obliquely downwardly extend- (Continued)

ing release position, and wherein the banknote transported to the storing unit is escrowed on the escrow plate when the escrow plate is located at the hold position. The system further comprises a sensor configured to detect a presence of the banknote on the escrow plate, and measure a level of banknotes in the banknote storing bag.

20 Claims, 50 Drawing Sheets

(51) Int. Cl.

| | |
|---|---|
| ***B65H 31/02*** | (2006.01) |
| ***B65H 31/34*** | (2006.01) |
| ***G07D 11/00*** | (2019.01) |
| ***G07D 11/23*** | (2019.01) |
| ***B65B 51/10*** | (2006.01) |
| ***G07D 11/16*** | (2019.01) |
| ***G07D 11/235*** | (2019.01) |

(52) U.S. Cl.
CPC ........... *G07D 11/16* (2019.01); *G07D 11/235* (2019.01); *G07D 2211/00* (2013.01)

(58) Field of Classification Search
USPC ............................................................ 57/495
See application file for complete search history.

(56) References Cited

U.S. PATENT DOCUMENTS

| | | | | |
|---|---|---|---|---|
| 4,732,375 | A | 3/1988 | Tetherton | |
| 4,774,403 | A | 9/1988 | Arts | |
| 5,341,625 | A * | 8/1994 | Kramer | B65B 57/04 53/64 |
| 7,167,803 | B2 * | 1/2007 | Kinoshita | B65B 9/20 702/35 |
| 7,230,223 | B2 | 6/2007 | Jespersen et al. | |
| 7,915,717 | B2 * | 3/2011 | Rezende | H01L 27/14618 257/E31.118 |
| 9,045,309 | B2 | 6/2015 | Hashimoto | |
| 9,080,368 | B2 | 7/2015 | Razzaboni et al. | |
| 9,089,318 | B2 * | 7/2015 | Henniges | A61G 12/001 |
| 9,266,693 | B2 | 2/2016 | Hashimoto | |
| 9,452,853 | B2 * | 9/2016 | Doll | B29C 66/81435 |
| 2003/0057638 | A1 | 3/2003 | Nakamura | |
| 2004/0045787 | A1 | 3/2004 | Zimmermann | |
| 2005/0010525 | A1 | 1/2005 | Ross et al. | |
| 2008/0006682 | A1 | 1/2008 | Bell | |
| 2012/0285788 | A1 | 11/2012 | Akamatsu et al. | |
| 2014/0081874 | A1 | 3/2014 | Lewis et al. | |
| 2014/0158495 | A1 | 6/2014 | Philipp et al. | |
| 2014/0209518 | A1 | 7/2014 | Mishra et al. | |
| 2015/0027089 | A1 | 1/2015 | Owens et al. | |
| 2016/0163145 | A1 | 6/2016 | Tamahashi | |
| 2018/0029730 | A1 * | 2/2018 | Yokoo | B65B 7/02 |
| 2018/0033228 | A1 * | 2/2018 | Akagi | B65B 5/00 |
| 2018/0130277 | A1 | 5/2018 | Schneider | |
| 2018/0305047 | A1 | 10/2018 | Takemura et al. | |
| 2019/0279453 | A1 | 9/2019 | Yokoo et al. | |

FOREIGN PATENT DOCUMENTS

| | | | |
|---|---|---|---|
| EP | 3263497 | A1 | 1/2018 |
| EP | 3432280 | A1 | 1/2019 |
| WO | 2013078482 | A1 | 5/2013 |
| WO | 2018047567 | A1 | 3/2018 |
| WO | 2018075555 | A1 | 4/2018 |

OTHER PUBLICATIONS

Supplementary European Search Report dated Aug. 6, 2021, in connection with European Patent Application No. 18926499.7, 4 pages.
State Enterprise Ukrainian Institute for Intellectual Property, “Provisional Conclusion of Formal Examination,” Application No. a 2018 08046, Oct. 26, 2018, 3 pages.
Communication pursuant to Article 94(3) EPC dated Oct. 4, 2021, in connection with European Patent Application No. 18926499.7, 7 pages.

* cited by examiner

MULTIPURPOSE CASHBAG LEVEL AND BANKNOTE PRESENCE IN ESCROW DETECTOR

CROSS-REFERENCE TO RELATED APPLICATIONS

This application is a continuation of application Ser. No. 16/175,608, which is related to and claims priority to Ukrainian Application No. a 2018 08046, filed Jul. 19, 2018, the contents of which are incorporated herein by reference in their entirety.

TECHNICAL FIELD

This disclosure relates generally to automated payment systems. More specifically, this disclosure relates to a sensing arrangement for detecting the position of a banknote relative to a fixed point in a banknote bag sealing system.

BACKGROUND

Banknote acceptors can be included in cashier safes, gaming machines, cashier-assisted automated cash handling systems, self-service terminals such as vending machines, ticket dispensers, photocopiers, ATMs, and the like. In many of these devices, banknote acceptors can be banknote validators or banknote recyclers. Banknote acceptors generally have an opening where a customer or a user inserts single or multiple banknotes, a well-defined banknote path to convey banknotes from said opening to sensor systems and cash storage, said sensor systems to scan the banknotes and a computational system to determine if the inserted banknote is genuine or not, and a banknote storage unit. The storage unit could be a cashbox with or without a stacking mechanism, a cashbag, or a box. The cash storage unit is generally removable or has an opening for the operator to remove cash from the cash storage unit. In addition, many banknote acceptors may have a temporary storage or escrow before sending banknotes to the banknote storage unit. In addition, banknote acceptors may have a bulk feeder system that may allow insertion of a stack of banknotes for serial processing. Banknote recyclers may have an additional ability to sort banknotes to individual storage locations and to provide change at the end of a transaction, thereby increasing operational efficiency by executing more transactions per cash pick up.

A banknote acceptor in lock-safe operation accepts genuine banknotes and stores accepted genuine banknotes into a cashbag. In operation, the banknote acceptor transports banknotes to an escrow and once a certain number of banknotes are accumulated in escrow the banknotes are then moved to a cashbag. Once the cashbag is full, the cashbag is removed and an empty cashbag is installed.

In some lock-safe operations accepted genuine banknotes are transported to a cashbag that is housed inside a stacker. In these lock-safe operations, the cashbag is mounted inside a cashbox and expands as more banknotes get stacked during operation of the lock-safe. However, these types of cashbags are capacity limited by the capacity of the cashbox they are housed in. In addition, these types of cashbags require special tamper evident features that activate upon opening, which can increase their cost.

At present, some lock-safe operating organizations collect cashbags at preset time intervals rather than when the level of banknotes accumulating increases above a predetermined level. This is partly because of the lack of a simple, low cost, efficient, and accurate way of determining the approximate level of banknotes accumulating in a cashbag without an operator visiting the lock-safe in which the cashbag is housed.

SUMMARY

The present disclosure relates to a sensing arrangement for detecting the position of a banknote relative to a fixed point in banknote sealing system. In particular, this disclosure relates to a sensing arrangement incorporated in a banknote acceptor to detect the presence and position of a banknote after the banknote has been authenticated and moved for temporary storage where a sensing device determines the position of the banknote in the banknote cashbag sealing system. The disclosure relates to a cashbag system banknote presence sensor including an optical proximity sensor that also detects a level of banknotes in the cashbag. This disclosure relates to cashier safes, cashier-assisted automated cash handling systems, self-service terminals, or other systems incorporating a banknote acceptor.

According to a first aspect of the present disclosure there is provided a cashbag sealing system. The system comprises a banknote transport mechanism operable to transport a banknote to a storing unit, the storing unit operable to store the banknote transported to the storing unit, wherein the storing unit includes a banknote storing bag to store the banknote detachably coupled to the storing unit, and an escrow plate provided above the banknote storing bag operable to escrow the banknote before the banknote transported to the storing unit is stored in the banknote storing bag, wherein the escrow plate is operable to move from a horizontally extending hold position to a downwardly or obliquely downwardly extending release position, and wherein the banknote transported to the storing unit is escrowed on the escrow plate when the escrow plate is located at the hold position. The system further comprises a sensor configured to detect a presence of the banknote on the escrow plate, and to measure a level of banknotes in the banknote storing bag.

The sensor during operation measures a distance of the banknotes in the banknote storing bag from the sensor or from the level of banknotes in the banknote storing bag. As more banknotes accumulate in the banknote storing bag during operation, the sensor measures a decrease in distance between the banknotes and the sensor. Once the distance between the banknotes and the sensor reaches a predetermined threshold, a sealing mechanism for the banknote storing bag may be activated.

In addition, the sensor is also configured to measure a height of a banknote stack on the escrow plate.

In addition, the sensor is also configured to detect if the movement of escrow plates from the horizontally extending hold position to the downwardly or obliquely downwardly extending release position, to drop the banknote stack resting on the escrow plates, has completed successfully or not.

In addition, the sensor is also configured to detect if the banknote storing bag is installed properly.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1A through 22B, discussed below, and the various embodiments used to describe the principles of the present disclosure in this patent document are by way of illustration only and should not be construed in any way to limit the scope of the disclosure. Those skilled in the art will understand that the principles of this disclosure may be implemented in any suitably arranged device or system.

As used throughout this specification, the terms currency denomination, denomination of currency, valuable document, currency bill, bill, banknote, note, check, bank check, paper money, paper currency, plastic money, plastic banknote, plastic currency, money order, coupon, ticket, and cash may be used interchangeably herein to refer to a type of a negotiable instrument or any other writing that evidences a right to the payment of a monetary obligation, typically issued by a central banking authority. In this specification, the terms cashbag, cash bag, banknote storing bag, banknote storing portion, document storing bag, document storing portion, tamper evident envelop, document storing envelop may be used interchangeably herein to refer to a type of an instrument or any other device that may transport currency from any systems incorporating a banknote acceptor to another location.

Figure 1A:
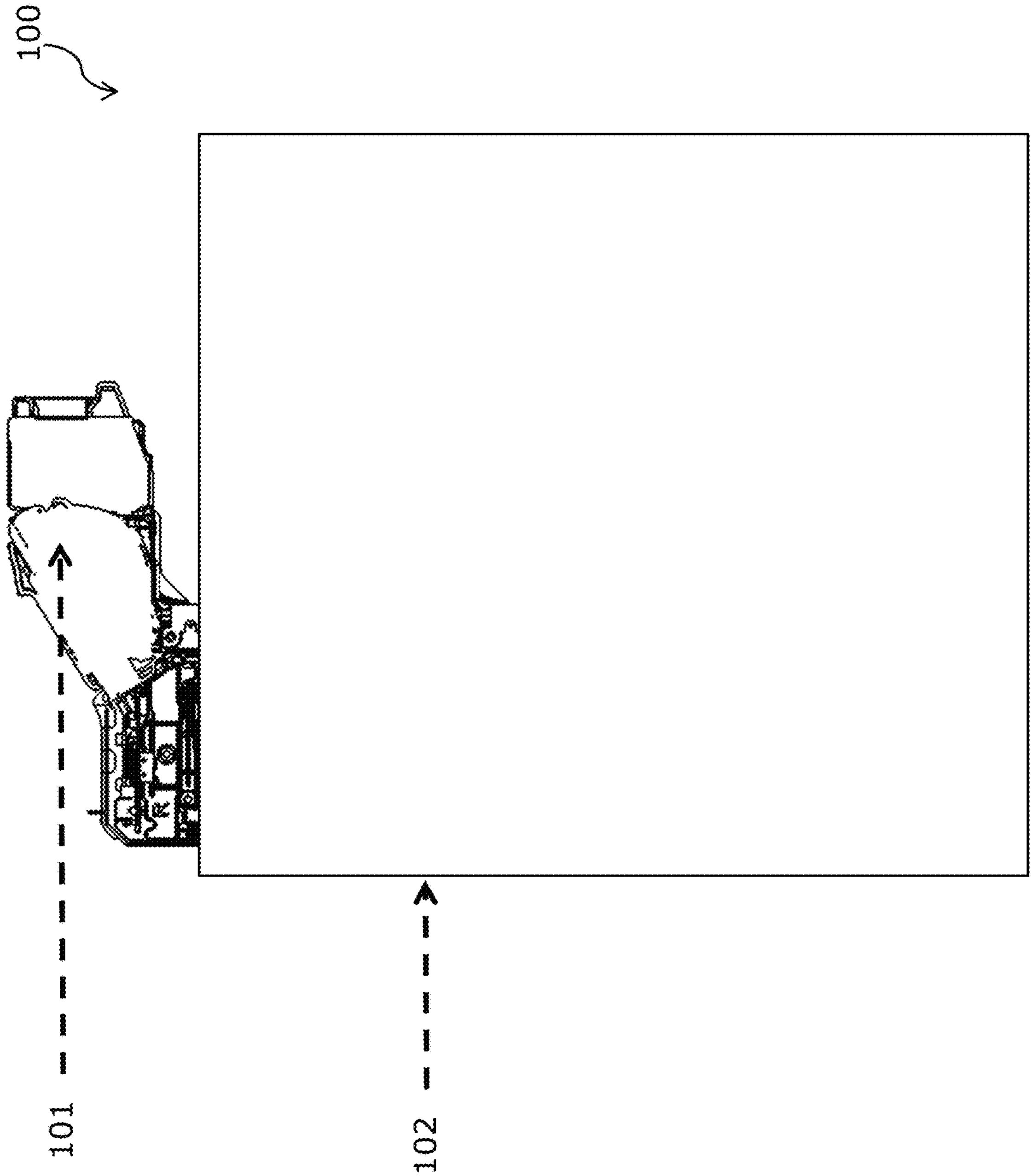
FIG. 1A illustrates an example of a side view of a lock-safe apparatus in accordance with various embodiments of the present disclosure.
Figure 1B:
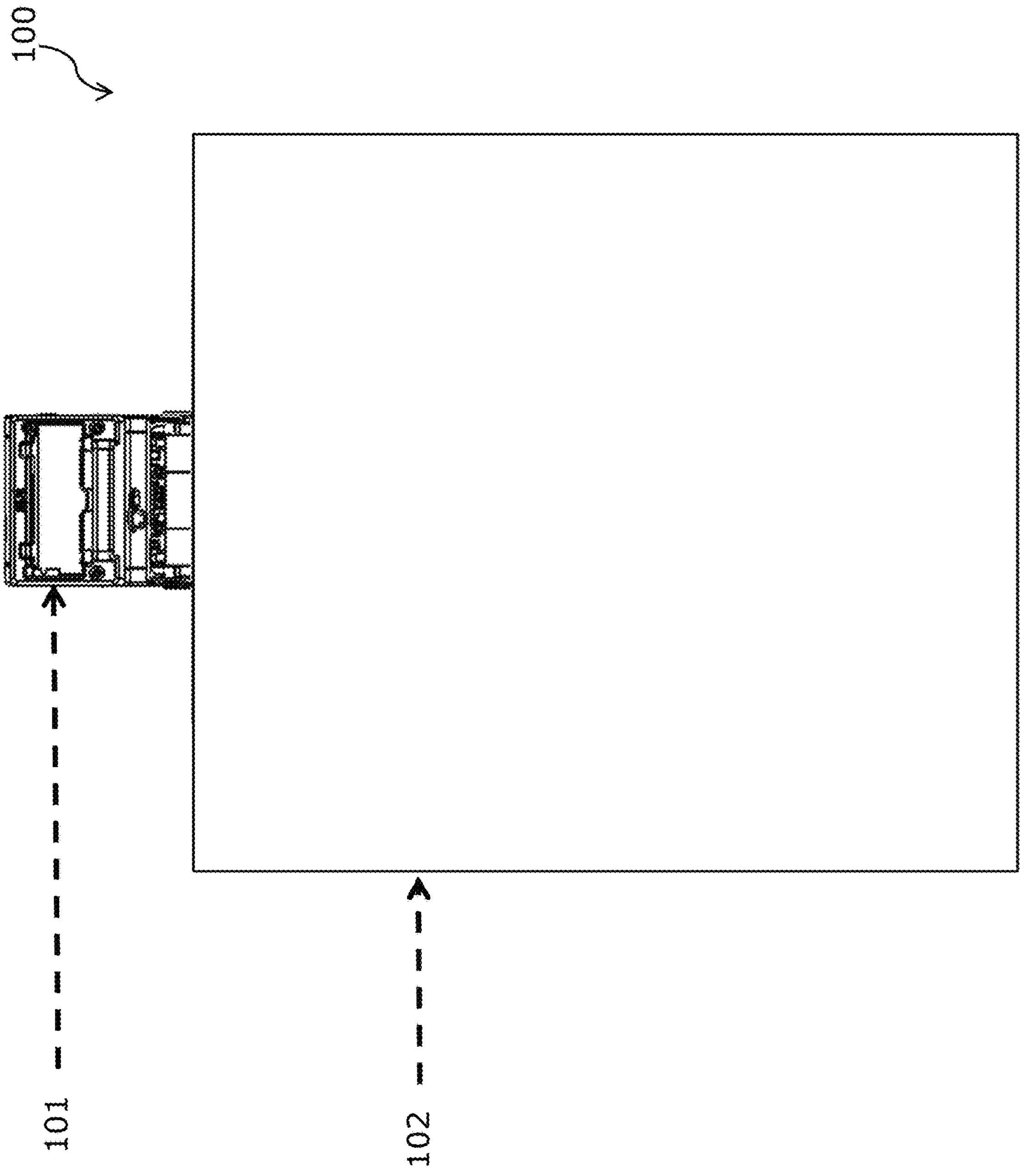
FIG. 1B illustrates an example of a front view of a lock-safe apparatus in accordance with various embodiments of the present disclosure.

FIGS. 1A and 1B illustrate a lock-safe apparatus 100. FIG. 1A illustrates an example of a side view of the lock-safe apparatus 100 in accordance with various embodiments of the present disclosure, and FIG. 1B illustrates an example of a front view of the lock-safe apparatus 100 in accordance with various embodiments of the present disclosure. Lock-safe apparatuses can come in a wide variety of configurations, and FIGS. 1A and 1B do not limit the scope of this disclosure to any particular implementation of a lock-safe apparatus. In the lock-safe apparatus 100, a banknote acceptor 101 validates an inserted banknote and transports the validated banknote into a safe 102. Safe 102 includes a secure locking mechanism (not shown) accessed by only lock-safe operator employees.

Figure 2A:
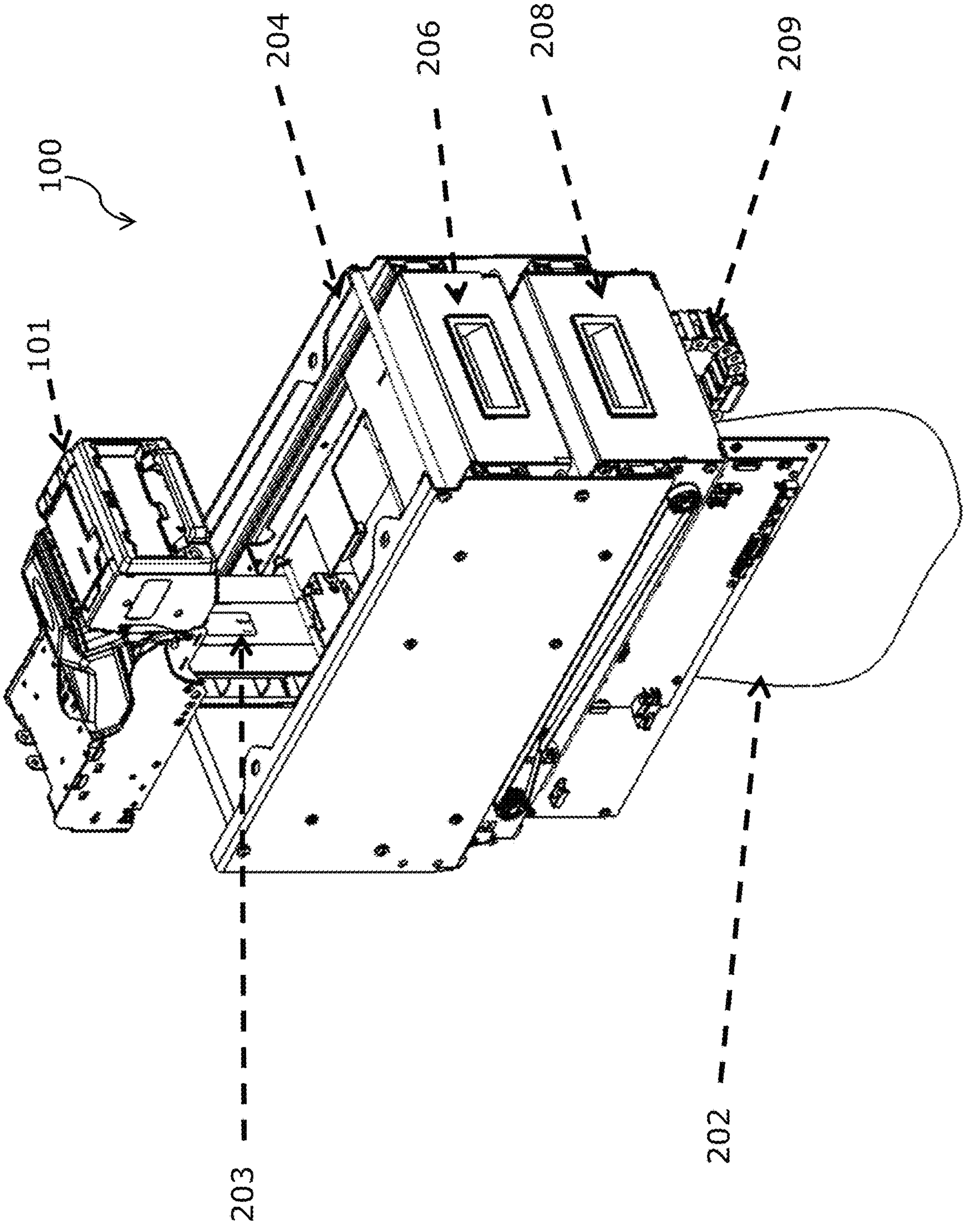
FIG. 2A illustrates an example of a perspective view of a lock-safe apparatus showing an internal structure in accordance with various embodiments of the present disclosure.
Figure 2B:
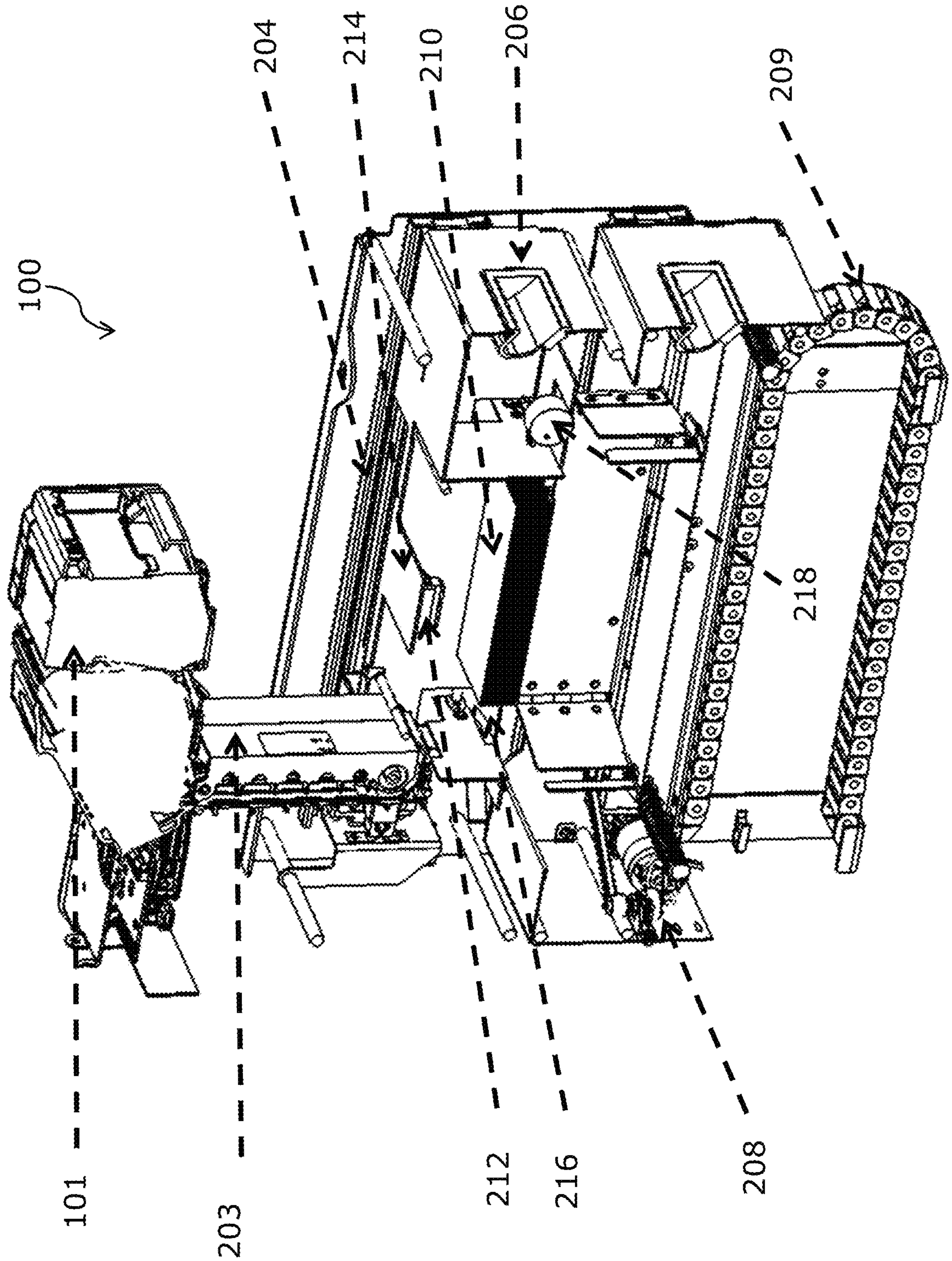
FIG. 2B illustrates a cross section view of a lock-safe apparatus showing an internal structure in accordance with various embodiments of the present disclosure.
Figure 2C:
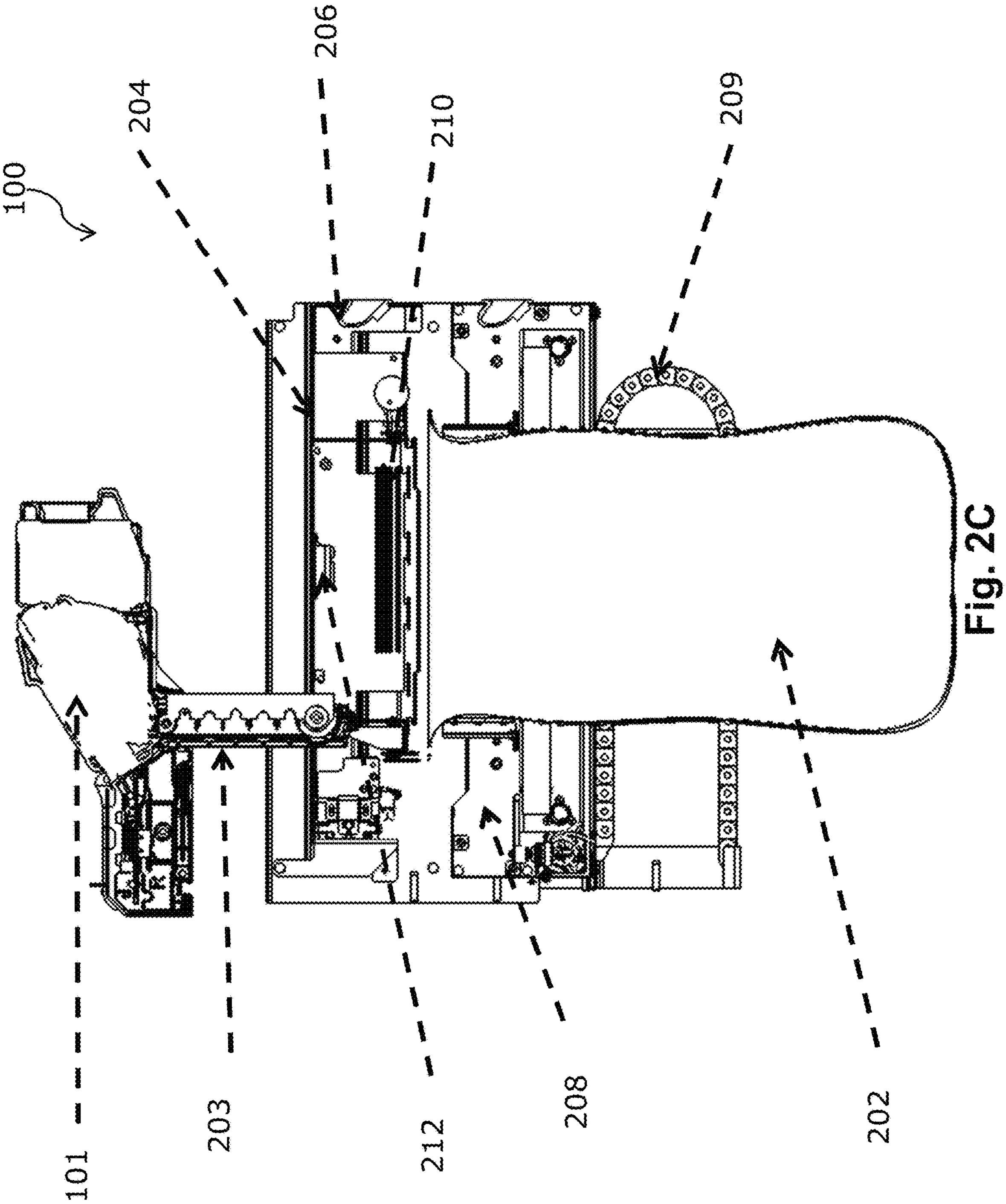
FIG. 2C illustrates a cross section side view of a lock-safe apparatus showing an internal structure and a cashbag in accordance with various embodiments of the present disclosure.
Figure 2D:
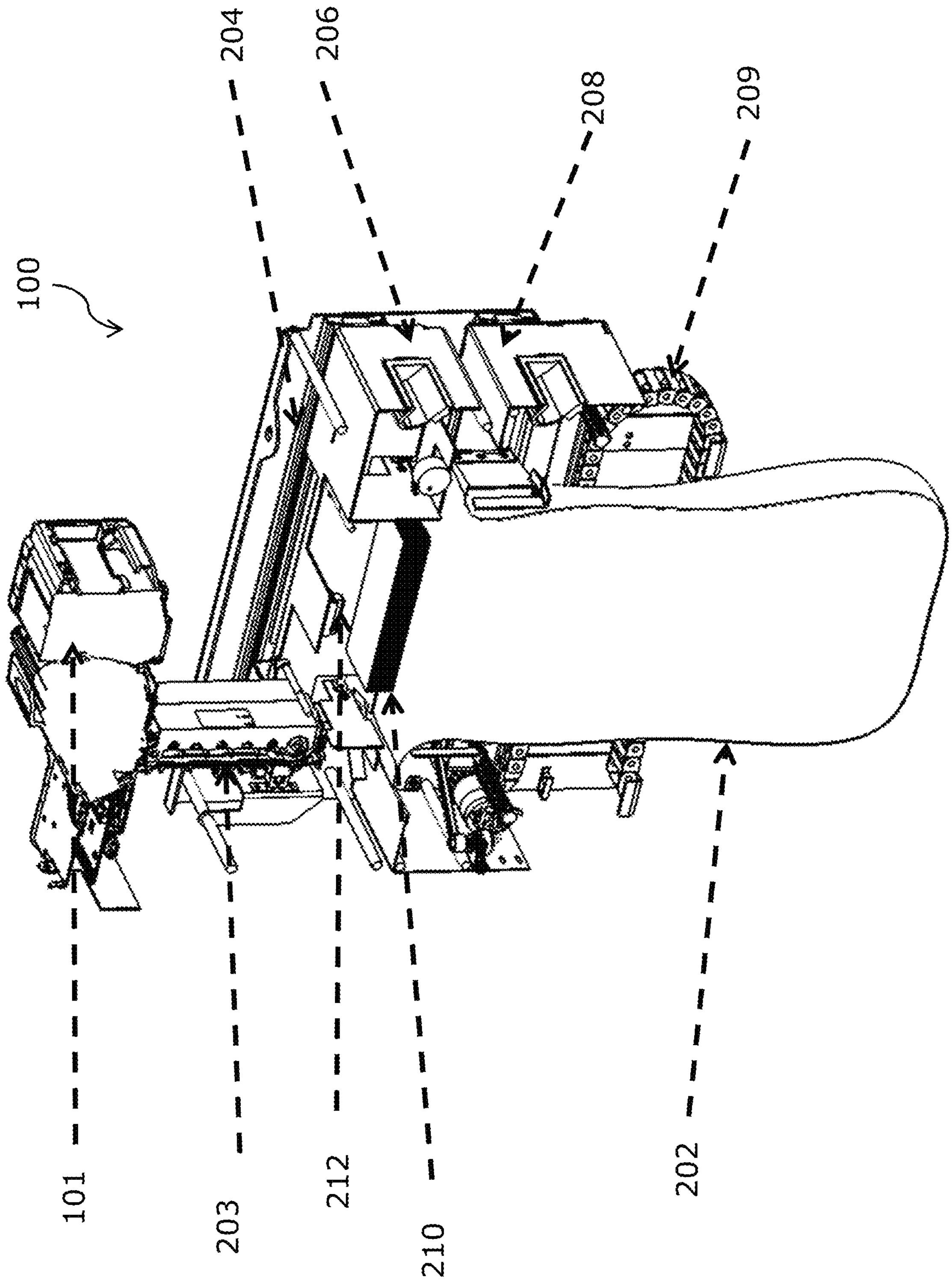
FIG. 2D illustrates a cross section of a lock-safe apparatus showing an internal structure and a cashbag in accordance with various embodiments of the present disclosure.

FIGS. 2A-2D illustrate views of the lock-safe apparatus 100 illustrated in FIGS. 1A and 1B. FIG. 2A illustrates an example of a perspective view of the lock-safe apparatus 100 showing an internal structure in accordance with various embodiments of the present disclosure, FIG. 2B illustrates a cross section view of the lock-safe apparatus 100 showing an internal structure in accordance with various embodiments of the present disclosure, FIG. 2C illustrates a cross section side view of the lock-safe apparatus 100 showing an internal structure and a cashbag or banknote storing bag 202 in accordance with various embodiments of the present disclosure, and FIG. 2D illustrates a cross section of the lock-safe apparatus 100 showing an internal structure and the cashbag 202 in accordance with various embodiments of the present disclosure.

In addition to the locking mechanism (not shown), the safe 102 also includes a banknote transport and turn-around mechanism 203, frame 204 to support an escrow module or storing unit 206, and a bag holding and sealing mechanism 208 that supports cashbag 202. In some embodiments, the banknote transport and turn-around mechanism 203 can be a banknote transport mechanism that includes a frame supporting a series of conveyer belts turnable by wheels, gearshafts, or other components. The conveyer belts are disposed along a banknote path formed between the conveyer belts to pull banknotes through the banknote transport mechanism. In some embodiments, the banknote transport and turn-around mechanism 203 can be a banknote transport mechanism that includes a series of wheels that includes pairs of wheels, each pair of wheels creating a pinchpoint in a space between the pair. This banknote transport mechanism transports banknotes along a banknote path, each pinchpoint receiving the banknote to pull the banknote further along the path. Sealing mechanisms for cashbags are described in WIPO Publication No. WO/2018/075555, which is incorporated by reference herein in its entirety. Sealing mechanisms are illustrated in FIGS. 10A to 16 of WO/2018/075555 that describe spring loaded sealing mechanism that uses knee lever mechanism illustrated in FIGS. 12A to 15. The lever mechanism described in WO/2018/075555 reduces required amount of force to move sealers. In addition, as shown in FIG. 16 of WO/2018/075555 additional compression springs along one of the sealing element may increase seal quality of the seal by evenly distributing force along the length of the mating sealing elements. Genuine banknotes verified by banknote acceptor 101 and transported to the safe 102 are further transported and turned-around by mechanism 203 and dropped into the escrow module 206. Banknotes coming into escrow module 206 are freely stacked into a banknote stack 210. A multipurpose cashbag level and banknote presence in escrow detector 212 is mounted on a support 214 looking down into the temporary storage of the escrow module 206. The escrow module 206 includes escrow plates 216 that are pivoted on a shaft rotated by a motor 218. The lock-safe apparatus 100 also includes a cable tray 209. The cable tray 209 holds cables connected to the sealing and holding mechanism 208; and as the sealing and holding mechanism 208 is pulled out from the lock-safe apparatus 100 to be accessed by personnel, and to be pushed back into the position illustrated in FIGS. 2A-2D the cable tray 209 prevents entanglement of cables in the safe 102.

Figure 3A:
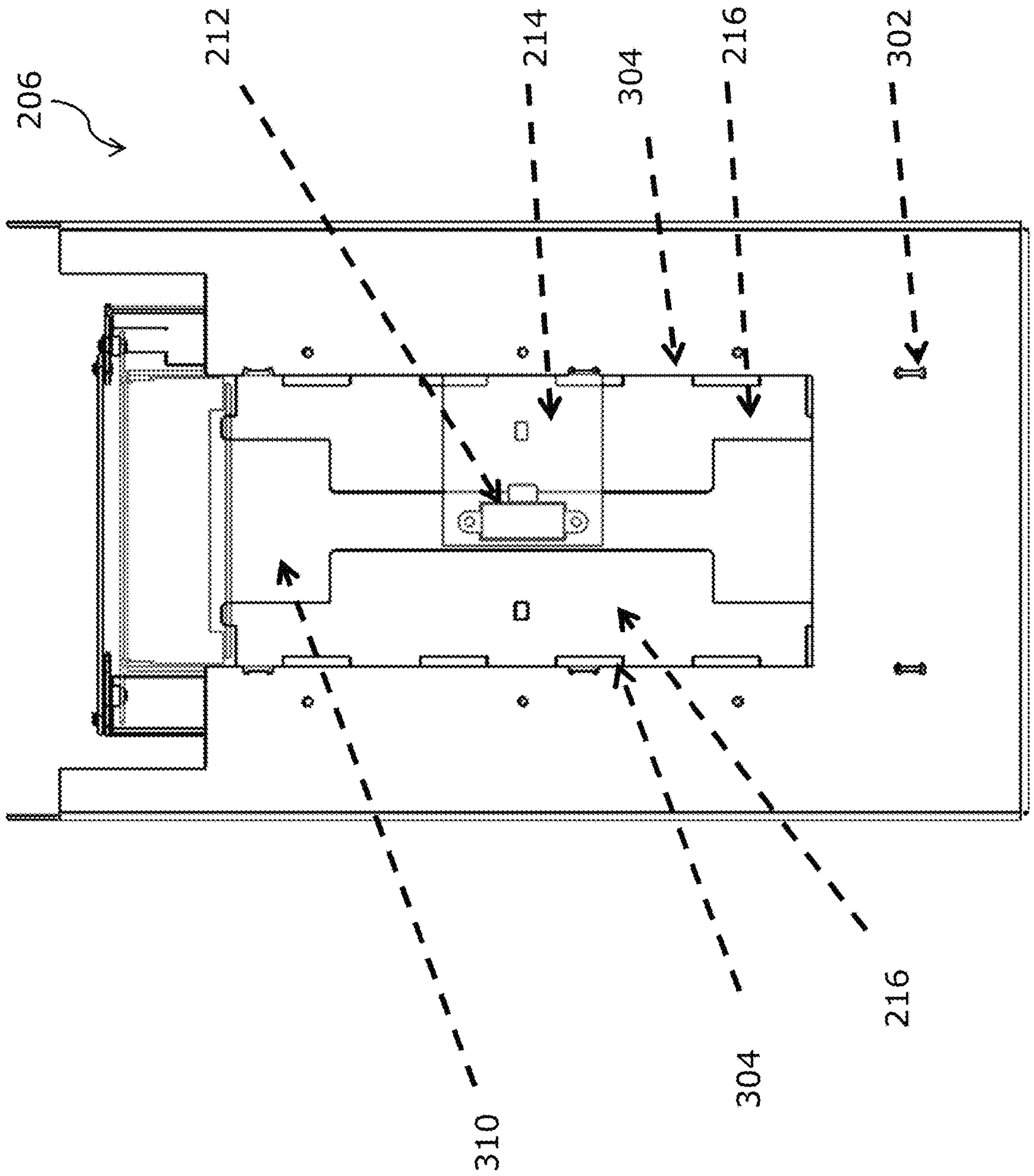
FIG. 3A illustrates a top view of an escrow module in accordance with various embodiments of the present disclosure.
Figure 3B:
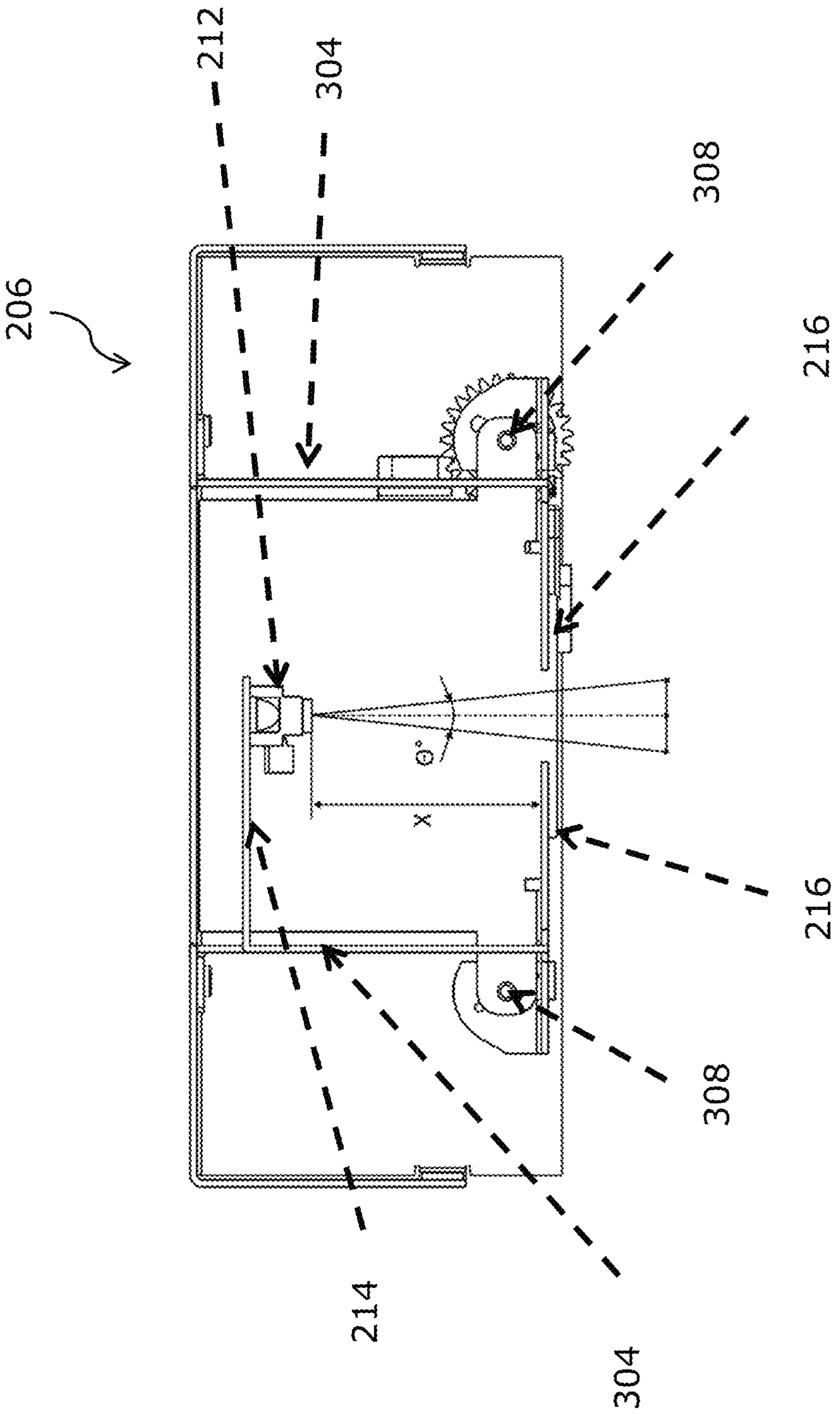
FIG. 3B illustrates a cross section front view of an escrow module in accordance with various embodiments of the present disclosure.
Figure 3C:
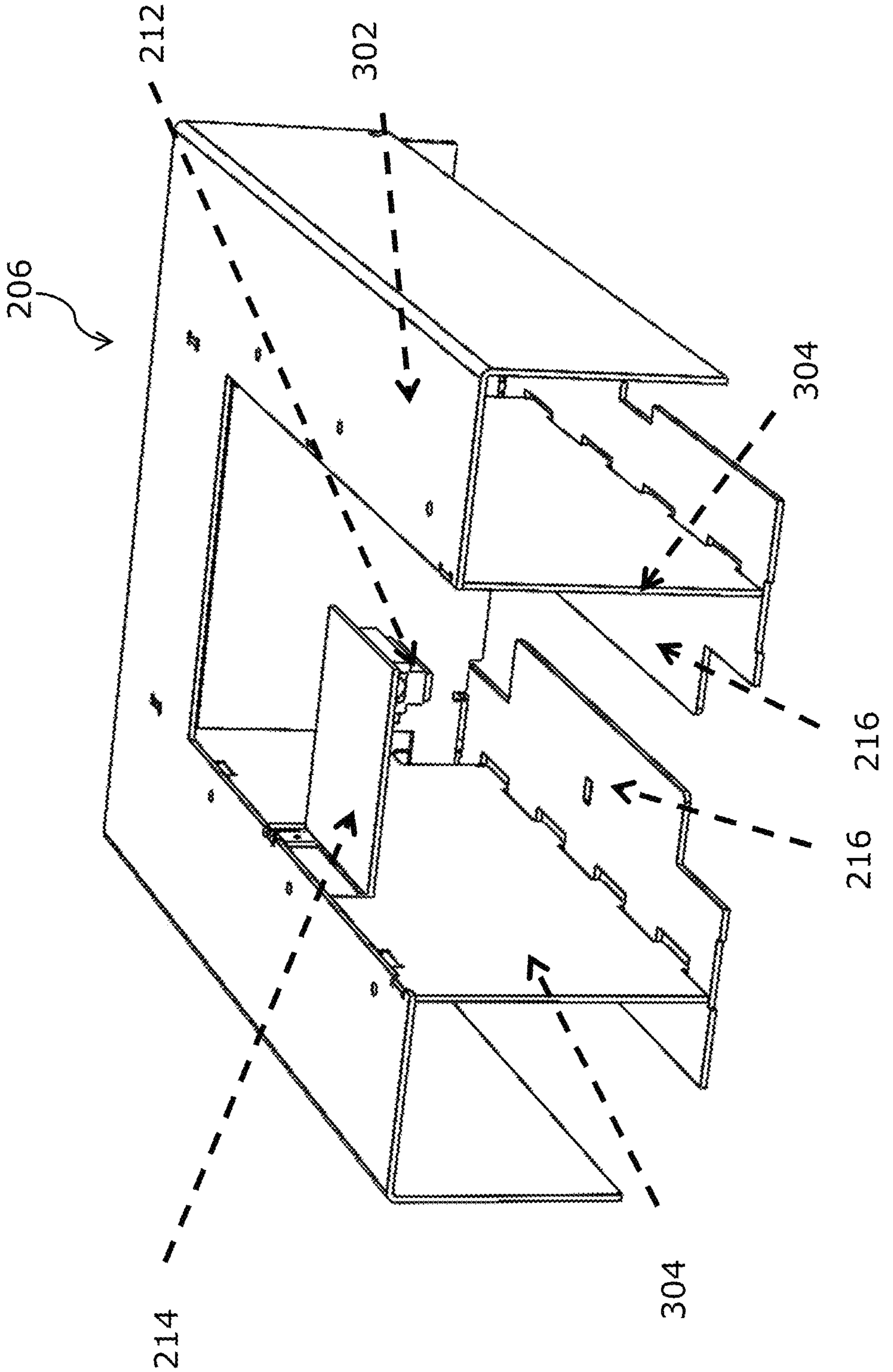
FIG. 3C illustrates a perspective view of an escrow module in accordance with various embodiments of the present disclosure.
Figure 3D:
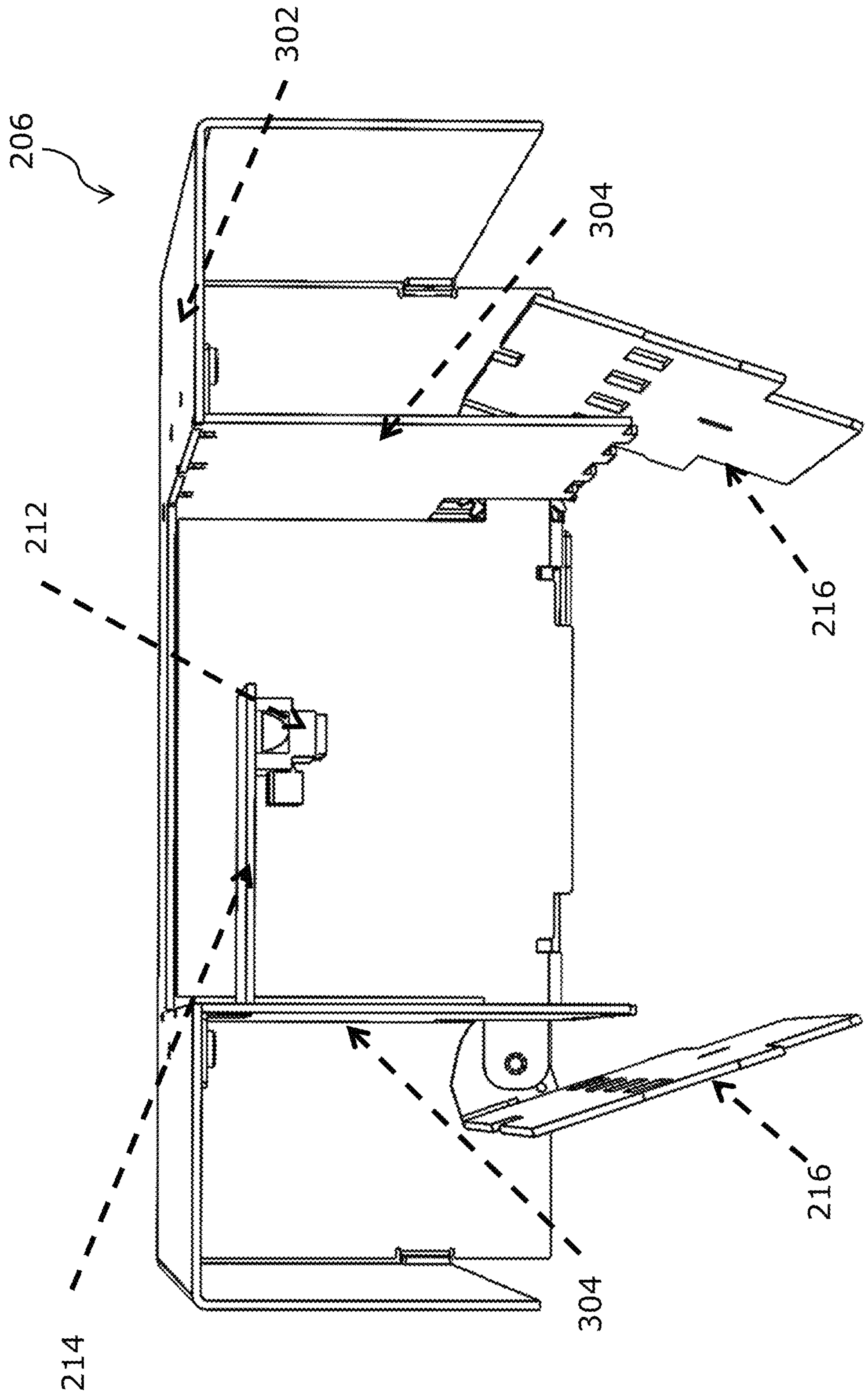
FIG. 3D illustrates a cross section front view of an escrow module in accordance with various embodiments of the present disclosure.
Figure 3E:
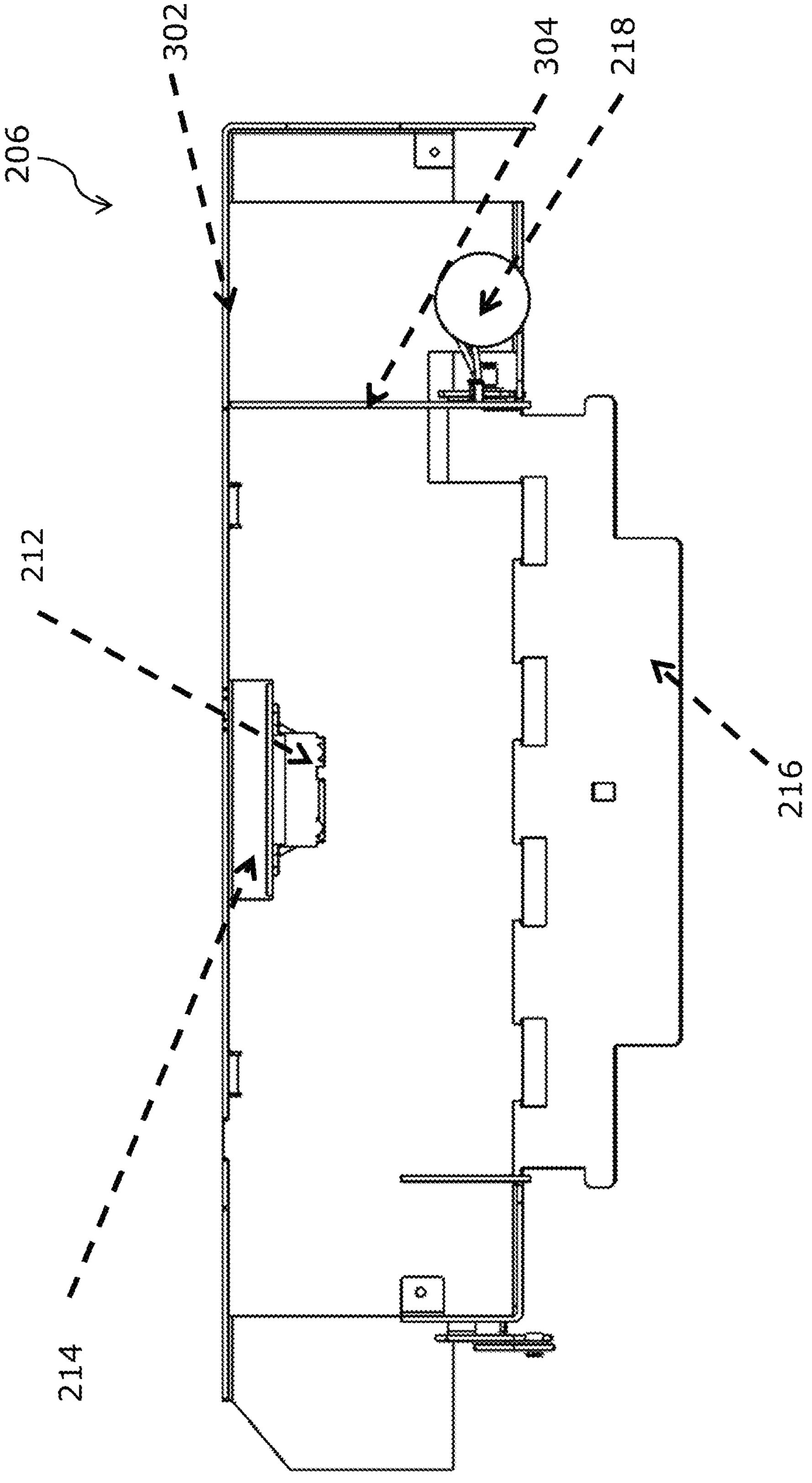
FIG. 3E illustrates a cross section side view of an escrow module in accordance with various embodiments of the present disclosure.

FIGS. 3A-3E illustrate in detail the location of the multipurpose cashbag level and banknote presence in escrow detector 212 inside escrow module 206. FIG. 3A illustrates a top view of the escrow module 206 in accordance with various embodiments of the present disclosure, FIG. 3B illustrates a cross section front view of the escrow module 206 in accordance with various embodiments of the present disclosure, FIG. 3C illustrates a perspective view of the escrow module 206 in accordance with various embodiments of the present disclosure, FIG. 3D illustrates a cross section front view of the escrow module 206 in accordance with various embodiments of the present disclosure, and FIG. 3E illustrates a cross section side view of the escrow module 206 in accordance with various embodiments of the present disclosure. Escrow modules can come in a wide variety of configurations, and FIGS. 3A-3E do not limit the scope of this disclosure to any particular implementation of an escrow module. The escrow module 206 illustrated in FIGS. 3A-3E can be included in the lock-safe apparatus 100 of FIGS. 1A and 1B disclosed herein.

Authenticated genuine banknotes enter escrow module 206 for temporary storage, such as a pre-stacking module or escrow. The escrow module 206 contains a body 302 to attach the escrow module with the frame 204 of the safe 102 and banknote acceptor 101. Temporary storage inside escrow module 206 is defined by walls 304 on three sides and a banknote entrance 306 on the fourth side. A bottom of the escrow module 206 is defined by escrow plates 216. Escrow plates 216 are pivoted on shafts 308 rotated by motor 218. The escrow plates 216 move between horizontally extending hold positions as shown in FIG. 3C and a downwardly or obliquely downwardly extending release position as shown in FIG. 3D.

When the escrow plates 216 are in the horizontally extending holding positions, entered banknotes rest on escrow plates 216. Authenticated banknotes are transported by banknote acceptor 101 and banknote transport and turn-around mechanism 203. The authenticated banknotes enter the escrow module 206 through banknote entrance 306. Banknotes are stacked freely on top of each other as the height of the stack grows on escrow plates 216. After receiving instruction from banknote acceptor 101, a safe operator, or a safe controller, the escrow plates 216 move from the horizontal holding position to the downwardly or obliquely downwardly extending release position, dropping banknotes from the temporary storage into cashbag 202.

Sensor 212 in some embodiments is an optical distance sensor, a proximity sensor, or an optical triangulation sensor, comprising an emitter and a receiver. Light emitted from the emitter of the sensor 212 reflects off the top of the top banknote surface of the banknote stack, and the reflected light is received by the receiver of the sensor 212. Triangulation can then be performed to determine the distance of a banknote, a stack of banknotes, or a cashbag from the sensor 212. The emitter in sensor 212 could be a LED that may emit light in UV, visible or infrared wavelengths. In other embodiments, the emitter in sensor 212 could be a laser without deviating from this disclosure.

Once the banknote stack 210 reaches a predetermined height the escrow plates 216 rotate from the holding position to the downwardly or obliquely downwardly extending release position, dropping banknotes from this temporary storage into cashbag 202. In other embodiments, the stack of banknotes can be dropped into the cashbag 202 before reaching the predetermined height after some predefined events like the end of the transaction, initiation of sealing of cashbag 202, or any other trigger events that may require the operator to drop banknotes into cashbag 202.

In this embodiment, the escrow plates 216 are designed in a manner such that an open area is maintained between two escrow plates 216 allowing sensor 212 to see through the open area and into the cashbag 202 when no banknotes are being held on escrow plates 216 in the temporary storage area of the escrow module 206. In other embodiments, the escrow plate 216 may be made of only one plate covering most of the bottom of the temporary storage. In other embodiments, the escrow plates could be more than two with each escrow plate mounted on a shaft. These escrow plates may form the bottom of the temporary storage. In other embodiments, these escrow plates could be transparent or partly transparent or may have transparent windows for sensor 212 to see through. In other embodiments, escrow plates may include hollow sections for sensor 212 to see through.

In other embodiments, the escrow plates 216 may move out of the holding position by sliding motion and drop the banknote stack 210 into cashbag 202. In this embodiment, the escrow plates 216 may move up or down or sideways as space constraints permit. In other embodiments, escrow plates 216 may move out of the holding position by rotating in the same holding plane in such a manner that distance may increase between the escrow plates 216 and banknote stack 210 is then dropped into cashbag 202. In other embodiments, the escrow plates 216 may move out of the holding position by rolling into barrel housings.

Figure 4A:
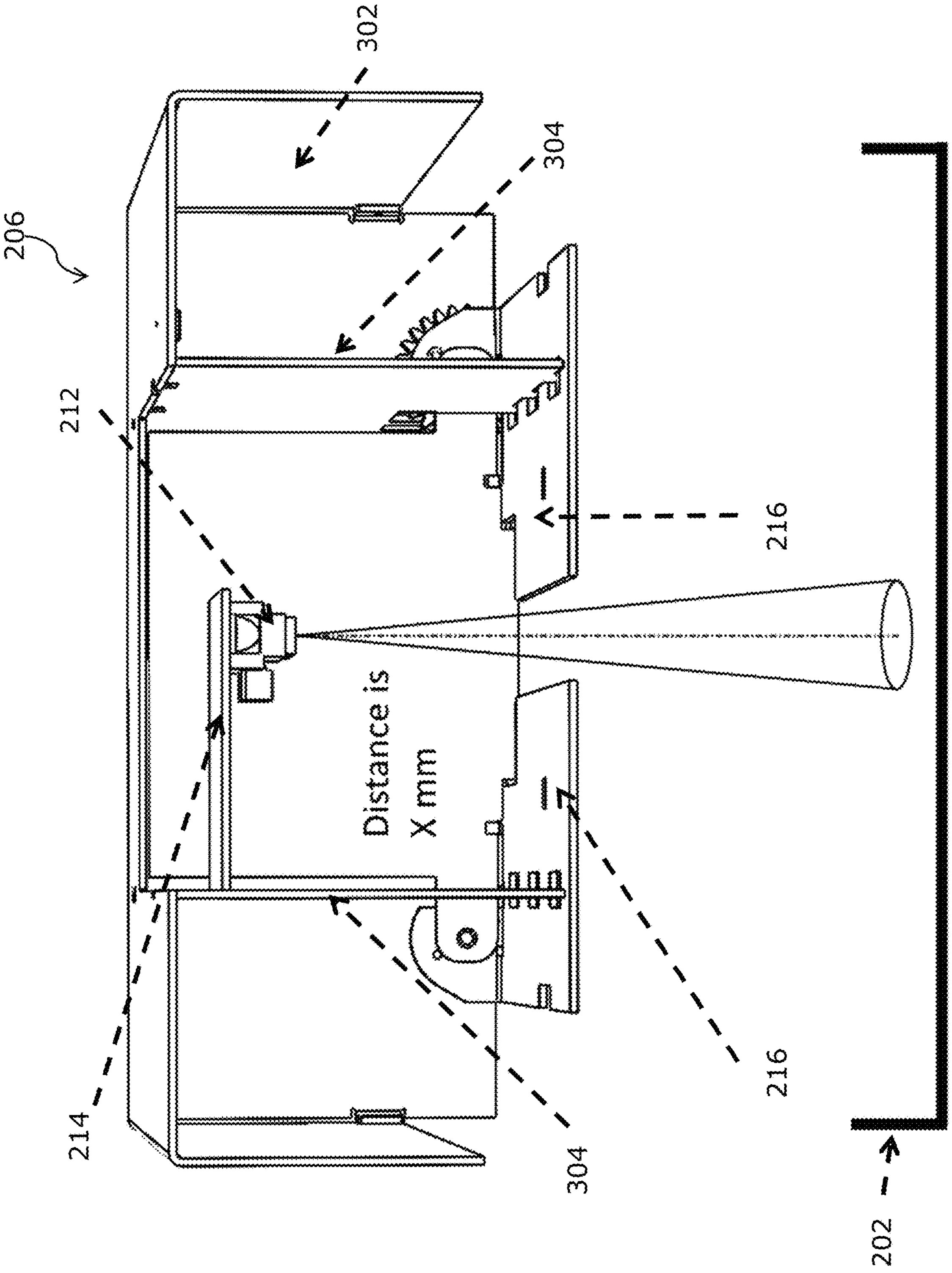
FIG. 4A illustrates a cross section front view of an escrow module with a sensor measuring a maximum distance in accordance with various embodiments of the present disclosure.
Figure 4B:
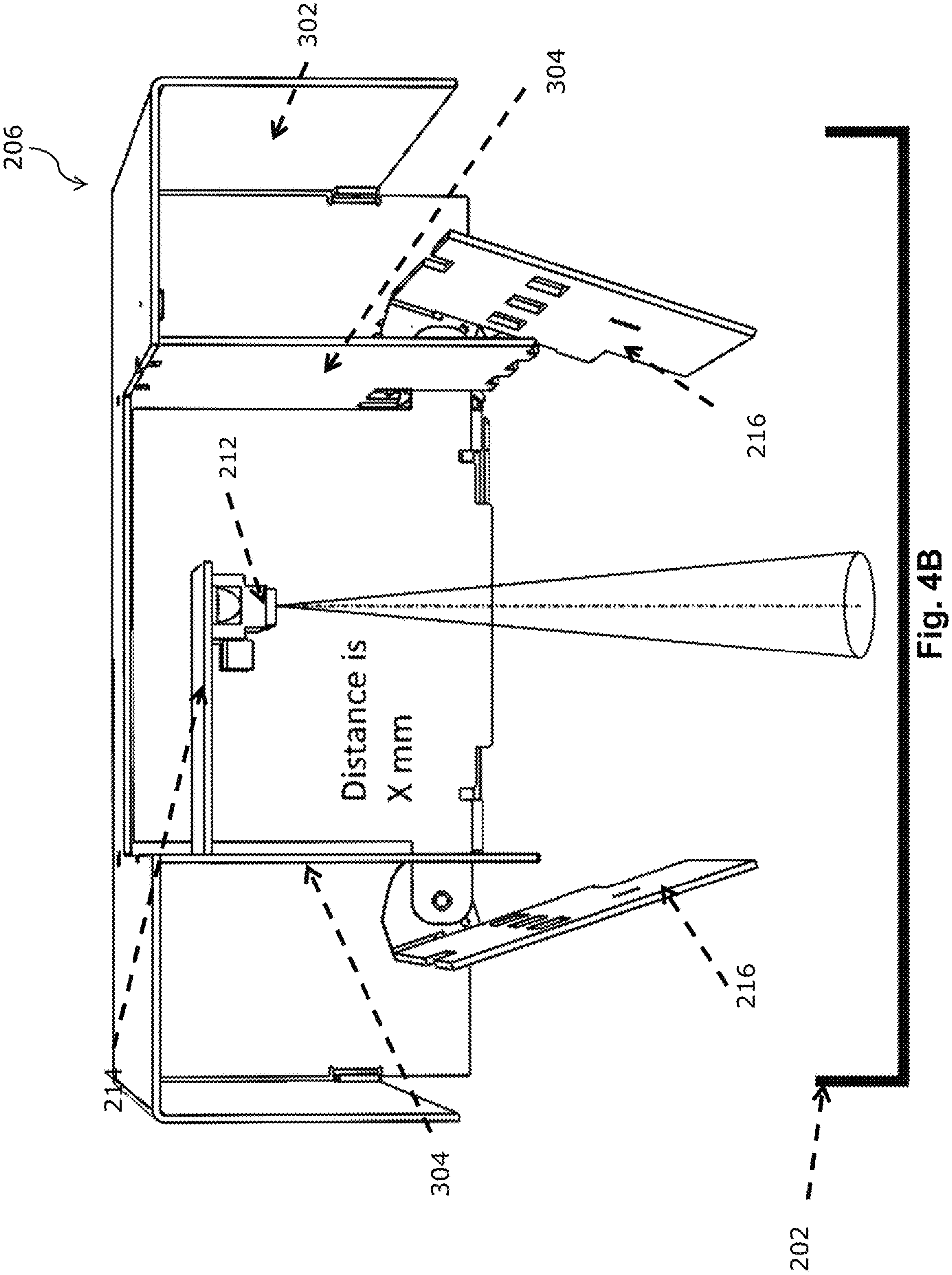
FIG. 4B illustrates a cross section front view of an escrow module with a sensor measuring a maximum distance in accordance with various embodiments of the present disclosure.

FIGS. 4A and 4B illustrate cross section front views of the escrow module 206 with the sensor 212 measuring a maximum distance in accordance with various embodiments of the present disclosure. Escrow modules and sensors can come in a wide variety of configurations, and FIGS. 4A and 4B do not limit the scope of this disclosure to any particular implementation of an escrow module or sensor. The escrow module 206 and sensor 212 illustrated in FIGS. 4A and 4B can be included in the lock-safe apparatus 100 disclosed herein.

As shown in FIG. 4A, when the escrow plates 216 are in horizontally extending holding position and are not holding any banknotes, the sensor 212 is looking into the empty volume of the cashbag 202. The open area between horizontally extending escrow plates 216 in the holding position allows the sensor 212 to see through the bottom of the escrow module. This open space between these two escrow plates 216 allow the sensor 212 to see through into cashbag 202 through movement of escrow plates 216 between a horizontally extending hold position as shown in FIG. 4A and a downwardly or obliquely downwardly extending release position as shown in FIG. 4B. As the escrow plates 216 move into the downwardly or obliquely downwardly extending release position from the horizontally extending holding position, the view of sensor 212 into cashbag 202 is unobstructed. In this case, a signal from sensor 212 may be at the minimum, as there may be a minimal reflection from the bottom of the bag or the distance may be out of the range of the sensor 212. This signal may be assigned as distance "X" that may indicate insertion of a new cashbag 202 that is either empty or nearly empty.

Figure 5:
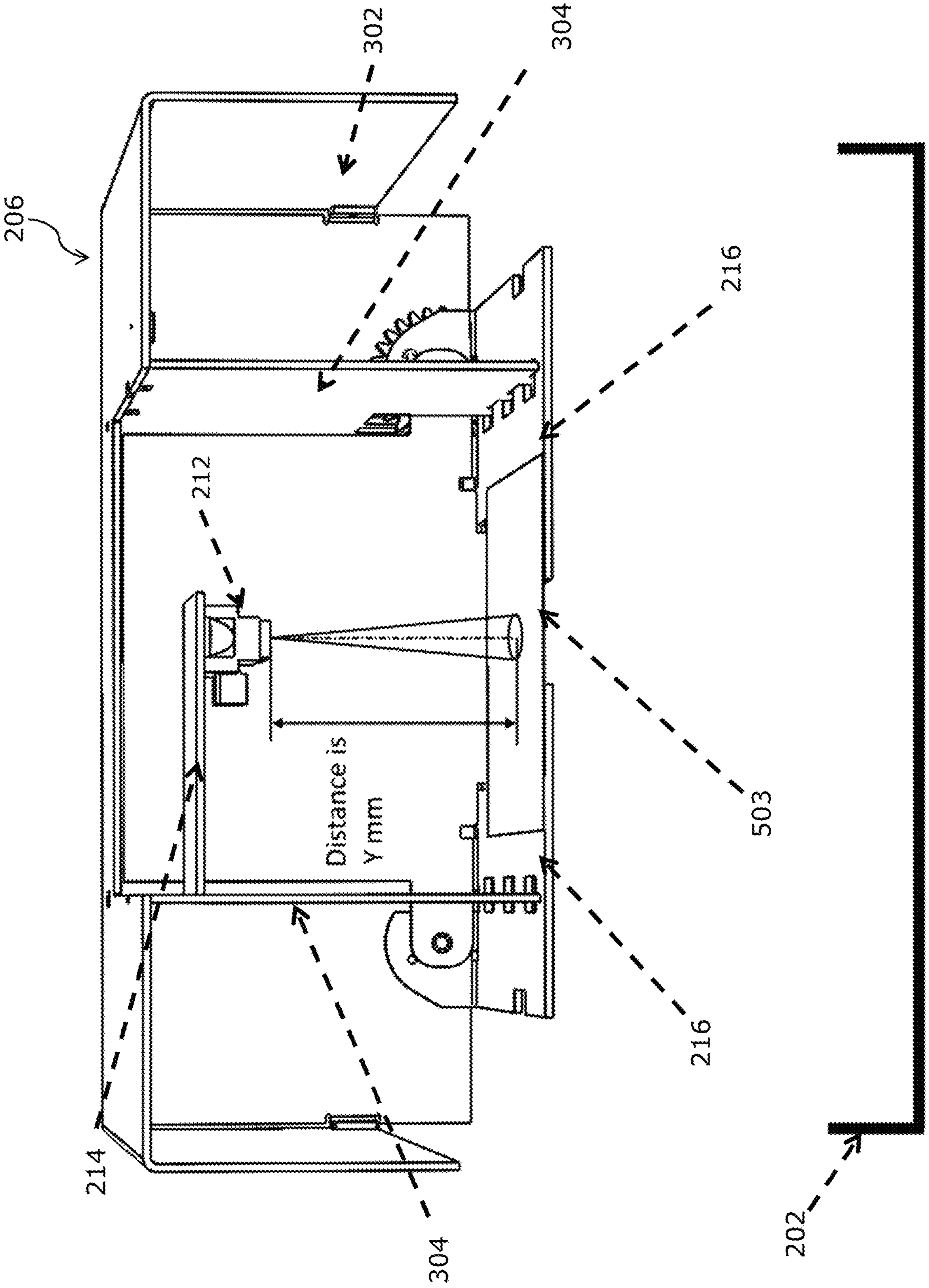
FIG. 5 illustrates a cross section front view of an escrow module with a sensor measuring a distance of a banknote from the sensor in accordance with various embodiments of the present disclosure.

FIG. 5 illustrates a cross section front view of the escrow module 206 with the sensor 212 measuring a distance of a banknote from the sensor 212 in accordance with various embodiments of the present disclosure. Escrow modules and sensors can come in a wide variety of configurations, and FIG. 5 does not limit the scope of this disclosure to any particular implementation of an escrow module or sensor. The escrow module 206 and sensor 212 illustrated in FIG. 5 can be included in the lock-safe apparatus 100 disclosed herein.

FIG. 5 shows a banknote 503 resting on the escrow plates 216. The light emitting from the emitter of sensor 212 is reflected by the sensor 212 facing surface of the banknote 503 facing the sensor 212 into the receiver of sensor 212. This results in a change of the signal from sensor 212 to a safe controller, to an operator, or to the banknote acceptor 101. This signal may be inferred as distance "Y". This signal may be used as a tracking signal that confirms the arrival of banknote 503 from transport and turn-around mechanism 203 into escrow module 206.

Figure 6:
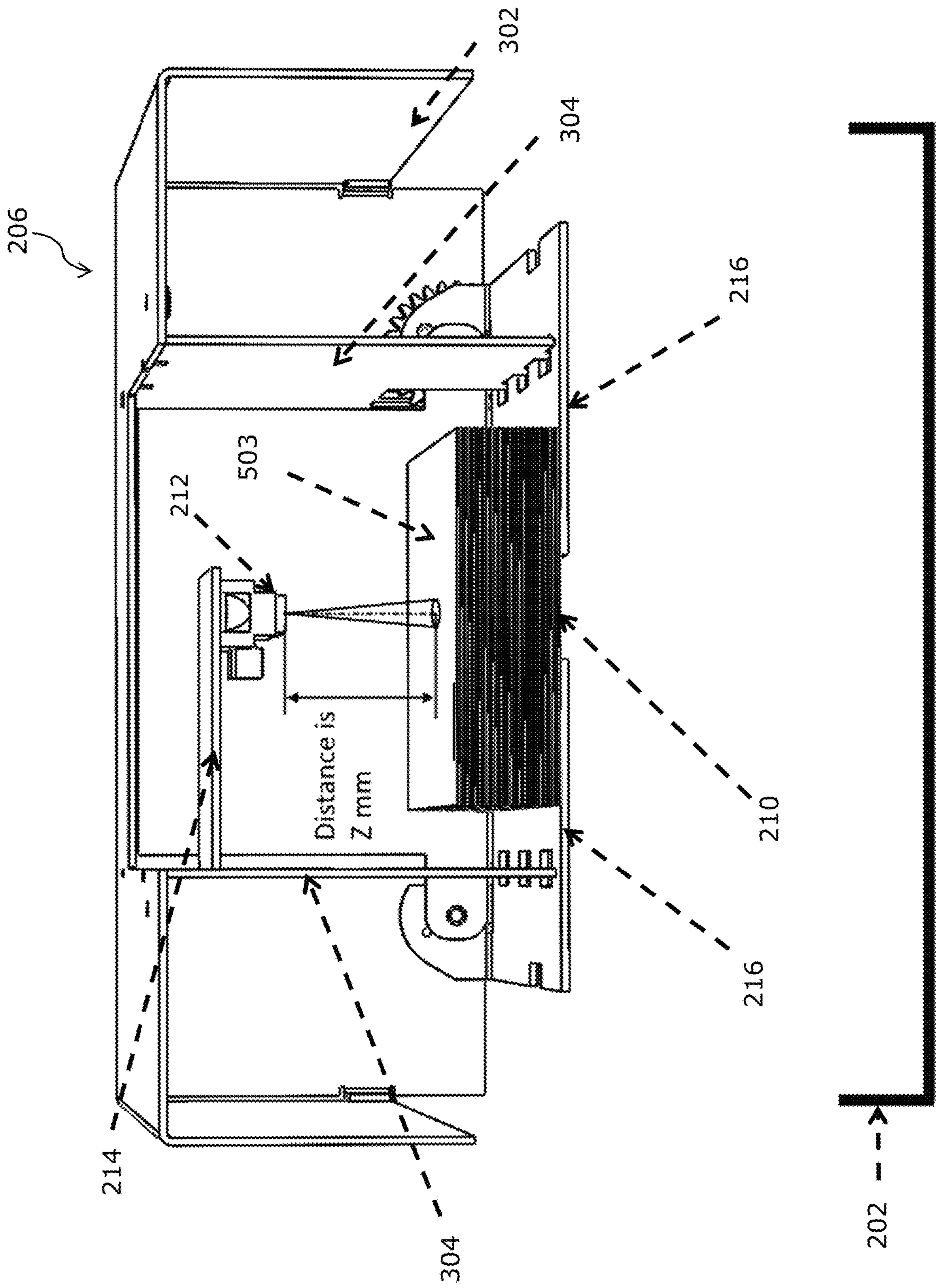
FIG. 6 illustrates a cross section front view of an escrow module with a sensor measuring a distance of a banknote stack from the sensor in accordance with various embodiments of the present disclosure.

FIG. 6 illustrates a cross section front view of the escrow module 206 with the sensor 212 measuring a distance of a banknote stack from the sensor 212 in accordance with various embodiments of the present disclosure. Escrow modules and sensors can come in a wide variety of configurations, and FIG. 6 does not limit the scope of this disclosure to any particular implementation of an escrow module or sensor. The escrow module 206 and sensor 212 illustrated in FIG. 6 can be included in the lock-safe apparatus 100 disclosed herein.

FIG. 6 shows a banknote stack 210 resting on the escrow plates 216. The light emitting from the emitter of sensor 212 is reflected by the sensor 212 facing surface of the banknote 503 on top of the banknote stack 210 into the receiver of sensor 212. As the height of the banknote stack 210 is different from a single banknote 503, the reflection signal measured by the sensor 212 changes. This signal may be inferred as distance "Z". This updated distance signal from sensor 212 is sent to a safe controller, to the operator, or to the banknote acceptor 101. Once the number of banknotes accumulated in the banknote stack reaches 30 to 50 notes, the banknote stack 210 is dropped into the cashbag 202 by movement of escrow plates 216 between a horizontally extending hold position and a downwardly or obliquely downwardly extending release position.

Generally, the banknote acceptor 101, the operator, or the lock-safe controller keep track of banknotes stored in escrow and, after accumulation of approximately 30 to 50 banknotes, the banknote stack 210 is dropped into the cashbag 202 by movement of escrow plates 216 between a horizontally extending hold position and a downwardly or obliquely downwardly extending release position. However, banknotes collected from customers generally do not have a fixed volume due to crinkles or creases. This may result in quicker than expected filling of the temporary storage area in the escrow module 206. The sensor 212 is configured to measure the height of the banknote stack 210 and prevent jams due to accumulation of banknotes in the temporary storage area in escrow module 206.

Figure 7A:
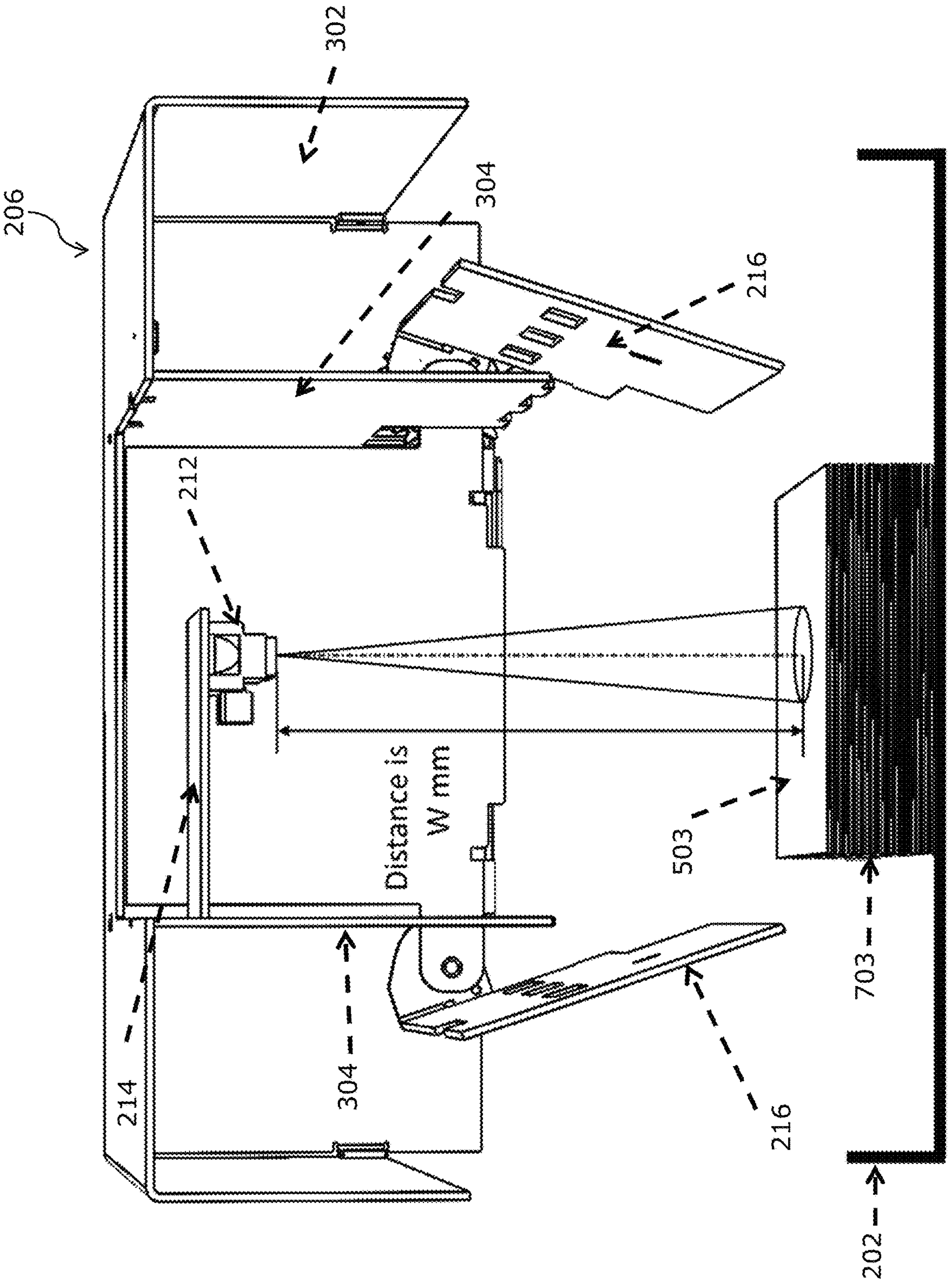
FIG. 7A illustrates a cross section front view of an escrow module with a sensor measuring a distance of a banknote stack in a cashbag from the sensor in accordance with various embodiments of the present disclosure.

FIG. 7A illustrates a cross section front view of the escrow module 206 with the sensor 212 measuring a distance of a banknote stack 703 in the cashbag 202 from the sensor 212 in accordance with various embodiments of the present disclosure. FIG. 7A shows banknote stack 703 dropped in the cashbag 202 as the escrow plates 216 move into downwardly or obliquely downwardly extending release position. The light emitting from the emitter of sensor 212 is reflected by the sensor 212 facing surface of the banknote 503 on top of the banknote stack 703, dropped in cashbag 202, into the receiver of sensor 212. As the height of the banknote stack 703 inside cashbag 202 is different from a banknote 503, the reflection signal measured by the sensor 212 changes. This signal may be inferred as distance "W". This inferred distance "W" may be used to estimate how much the cashbag 202 is full or empty. If this inferred distance "W" approaches inferred distance "X" in FIGS. 4A and 4B, then cashbag 202 is mostly empty. If this inferred distance "W" approaches distance "Y" in FIG. 5, then cashbag 202 is nearly full.

Figure 7B:
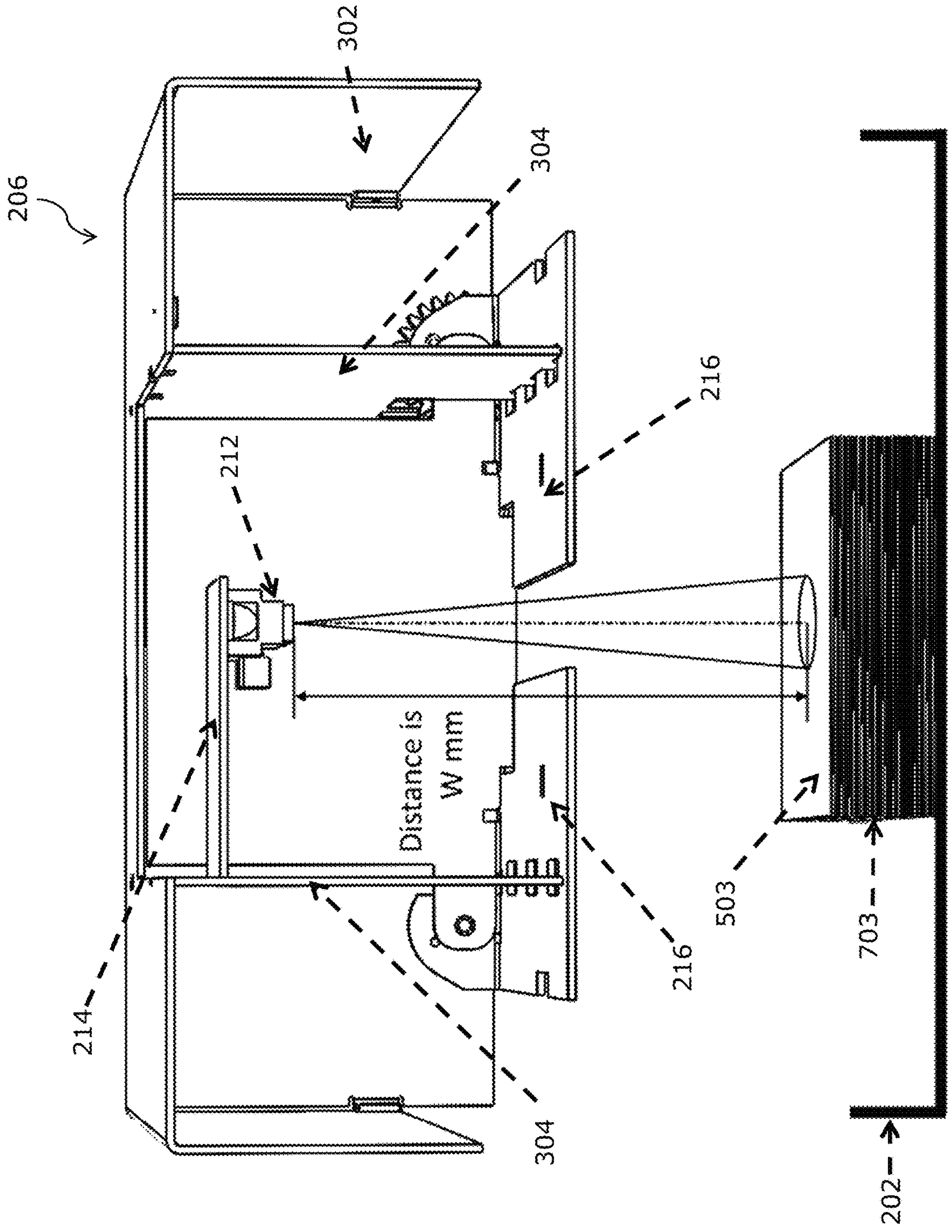
FIG. 7B illustrates a cross section front view of an escrow module with a sensor measuring a distance of a banknote stack in a cashbag from the sensor in accordance with various embodiments of the present disclosure.

FIG. 7B illustrates a cross section front view of the escrow module 206 with the sensor 212 measuring a distance of the banknote stack 703 in the cashbag 202 from the sensor 212 in accordance with various embodiments of the present disclosure. FIG. 7B shows banknote stack 703 dropped in the cashbag 202 as the escrow plates 216 are in the horizontally extending hold position. The open area between escrow plates permits light emitting from the emitter of sensor 212 to reflect by the sensor 212 facing surface of the banknote 503 on top of the banknote stack 703 dropped in cashbag 202 into the receiver of sensor 212. This signal may be inferred as distance "W" as escrow plates 216 have moved from the downwardly or obliquely downwardly extending release position to the horizontally extending hold position and no new banknotes have been added into either the temporary storage area of the escrow module 206 or into the cashbag 202. This signal inferred as "W" may act as a validation that dropping of the banknote stack 210 from the escrow plates 216 has been successful and no banknotes are present on escrow plates 216 to obstruct the view of the sensor 212 into cashbag 202.

Figure 7C:
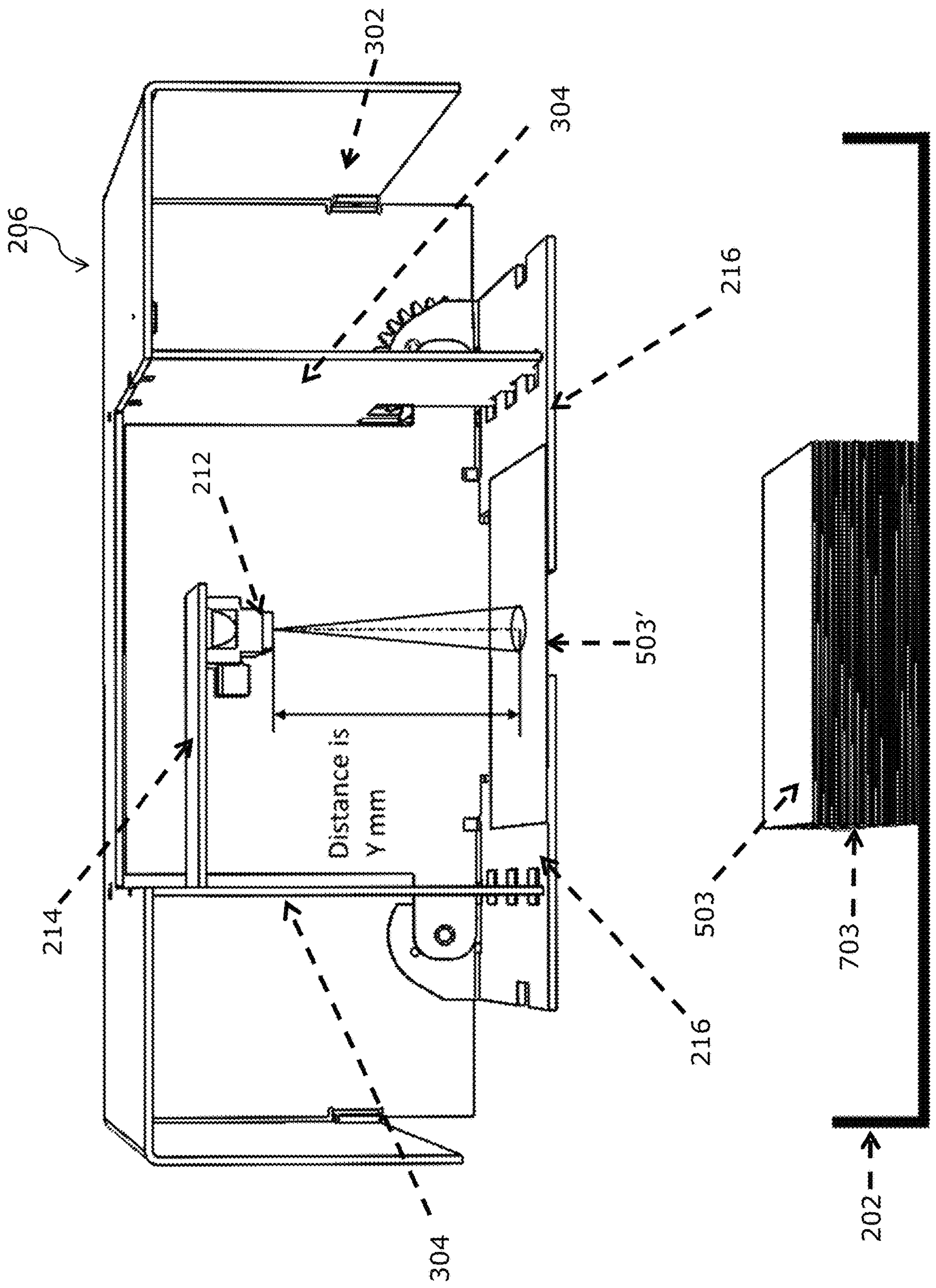
FIG. 7C illustrates a cross section front view of an escrow module with a sensor measuring a distance of a banknote from the sensor in accordance with various embodiments of the present disclosure.

FIG. 7C illustrates a cross section front view of the escrow module 206 with the sensor 212 measuring a distance of a banknote 503' from the sensor 212 in accordance with various embodiments of the present disclosure. FIG. 7C shows a scenario where a banknote stack 703 has been accumulated in cashbag 202 and the banknote 503' resting on escrow plates 216. This banknote 503' may generate a signal that may be inferred as distance "Y" that is different than signal "W" from the banknote 503 on top of the banknote stack 703 dropped in cashbag 202. This signal may indicate that as escrow plates 216 moved from the downwardly or obliquely downwardly extending release position to the horizontally extending hold position, either banknote 503' has been stuck on one of the escrow plates 216 or a new banknote has been introduced into the temporary storage area of escrow module 206. If the banknote 503' is stuck with escrow plates 216 then an error signal may be sent to the operator, banknote acceptor 101 or lock-safe, and appropriate remedies may be taken.

Escrow modules and sensors can come in a wide variety of configurations, and FIGS. 7A-7C do not limit the scope of this disclosure to any particular implementation of an escrow module or sensor. The escrow module 206 and sensor 212 illustrated in FIGS. 7A-7C can be included in the lock-safe apparatus 100 disclosed herein.

Figure 8A:
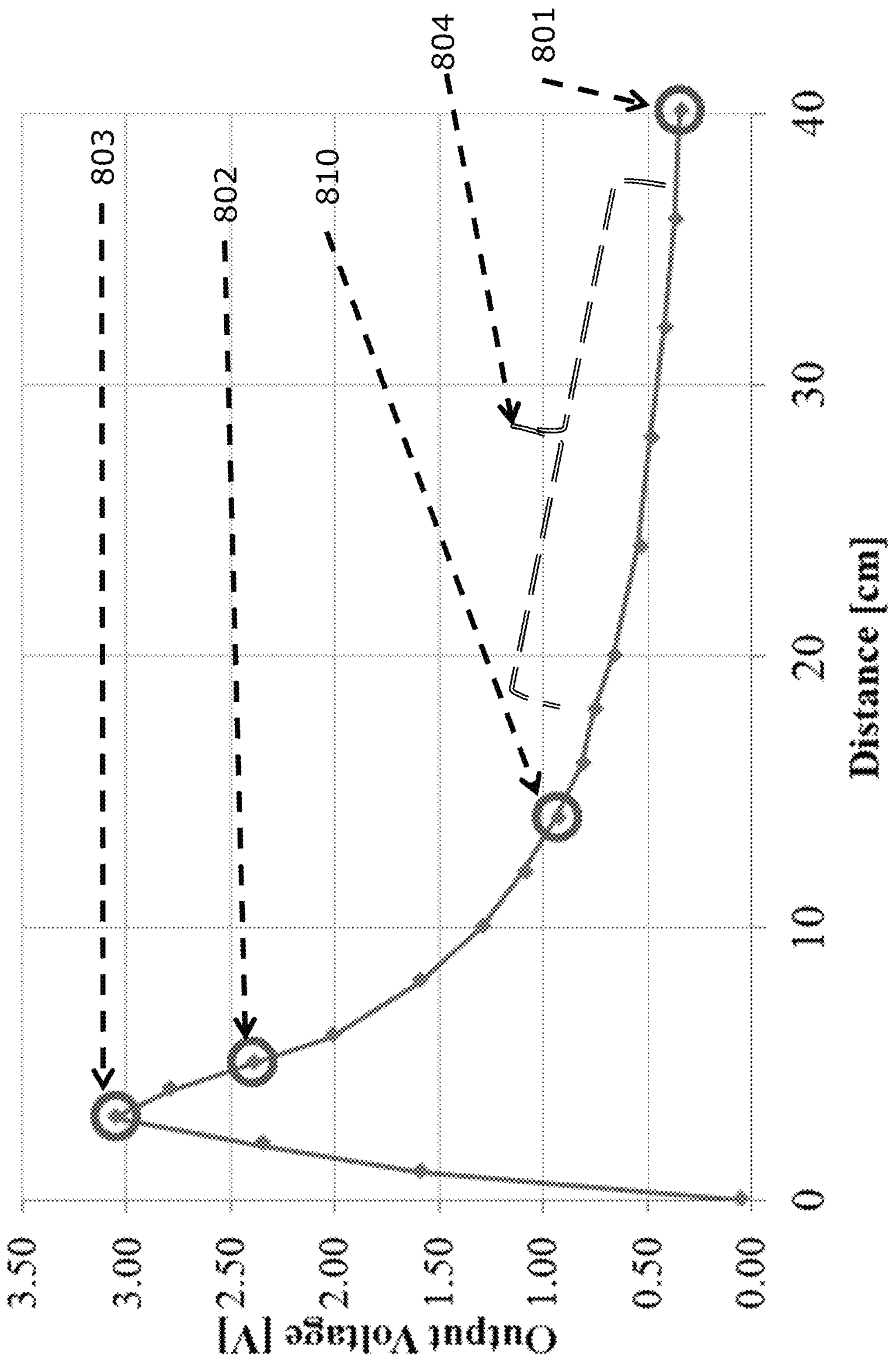
FIG. 8A illustrates an example output from a sensor in accordance with various embodiments of the present disclosure.
Figure 8B:
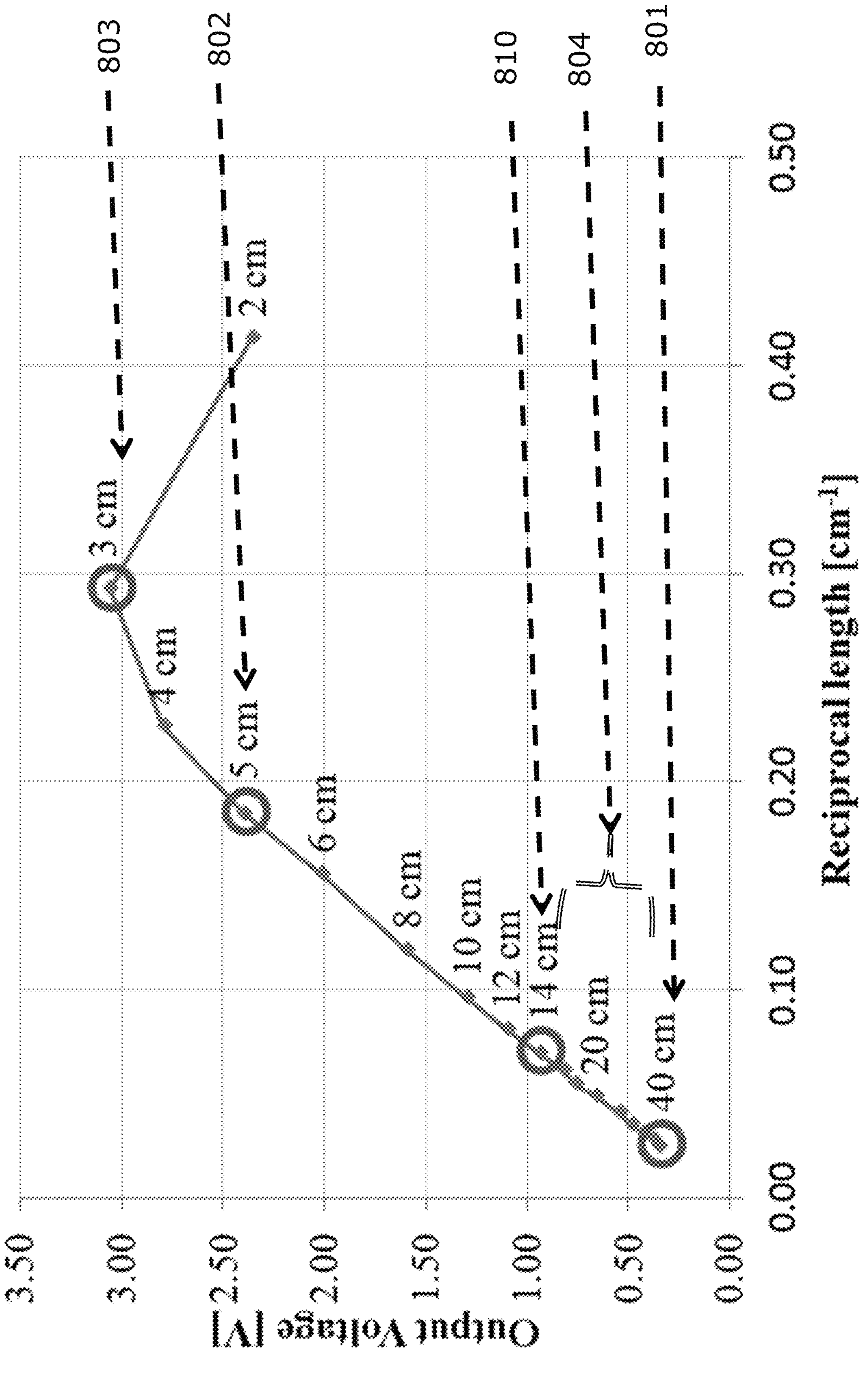
FIG. 8B illustrates an example output from a sensor in accordance with various embodiments of the present disclosure.

FIGS. 8A-8B illustrate example outputs from the sensor 212 in accordance with various embodiments of the present disclosure. FIG. 8 shows output from sensor 212 during an operation cycle of a cashbag 202 inside safe 102. The voltage measured from sensor 212 can be correlated to the distance measured by sensor 212 as shown in FIG. 7. As a new cashbag 202 is installed properly inside safe 102 and lock-safe 100 is activated, sensor 212 then emits light from the emitter and may receive a reflected light in the sensor. In this case, the signal from sensor 212 may be at the minimum as shown as 801 in FIG. 8, as there may be a minimal reflection from the bottom of the bag or the distance may be out of the range of the sensor 212. This signal 801 may be assigned as distance "X" that may indicate insertion of the new cashbag 202 that is either empty or nearly empty. Once a new banknote 503 is inserted on escrow plates 216 as shown in FIG. 5, the reflected signal indicates distance "Y" shown as 802. As the banknote stack 210 accumulates on escrow plates 216 during operation of the banknote acceptor 101, the reflected signal indicates distance "Z" as shown in FIG. 6, which is shown as 803 in FIGS. 8A-8B.

Once the sensor 212 sends a signal indicating point 803, the escrow plates 216 are activated and move into the downwardly or obliquely downwardly extending release position from the horizontally extending hold position. Banknote stack 210 is then dropped into cashbag 202 as banknote stack 703. If the banknote stack 703 is successfully dropped into cashbag 202, then signal 804 indicating distance "W" as shown in FIGS. 7A and 7B is received from sensor 212. During operation of the lock-safe 100, more banknotes are deposited to banknote acceptor 101 and are accumulated in cashbag 202 and signals 804 move from approaching 801 (empty cashbag 202) towards approaching signal 810. The distance indicated by signal 804 indicates how much the cashbag 202 is full at any point when the lock-safe 100 is operational. As signals 804 move towards signal 810, the cashbag 202 is nearly full and the sealing mechanism can be activated.

In addition, if a new banknote 503 enters the temporary storage area of escrow module 206 and rests on the escrow plates 216, the signal sent by the sensor 212 may change from 801 or 804 to 802. This change may be used to indicate a successful transfer of banknote 503 from a banknote transport and turn-around mechanism 203 to the temporary storage in escrow module 206.

In addition, as the sensor 212 also detects that banknotes are present on escrow plates 216, the presence of banknote 503' obstructs the view of sensor 212 into the cashbag 202 and sends signal 802. This signal 802 from sensor 212 to the safe controller, to the operator, or to the banknote acceptor 101 informs that malfunction may have occurred and the temporary storage area has not been cleared after movement of escrow plates 216 between a horizontally extending hold position as shown in FIG. 3A and a downwardly or obliquely downwardly extending release position as shown in FIG. 3B, necessitating another cycle of movement of escrow plates 216 between a horizontally extending hold position and a downwardly or obliquely downwardly extending release position. This additional cycle may clear the temporary storage area and maintain continuous operation of the lock-safe once the sensor 212 does not detect the presence of banknotes on the escrow plates 216. If repeated cycles of movement of escrow plates 216 between the horizontally extending hold position and the downwardly or obliquely downwardly extending release position do not clear the temporary storage area, an error or maintenance signal may be sent to the safe controller, the operator, the banknote acceptor 101.

FIG. 8 shows that if a new cashbag 202 is properly installed then signal 801 is received by sensor 212. If the sensor reports a signal other than 801, it may indicate that the cashbag 202 may not be installed properly. In this scenario, the operator may be notified to fix the issue and prevent a jam of banknotes in the cashbag 202 during operation.

Figure 9A:
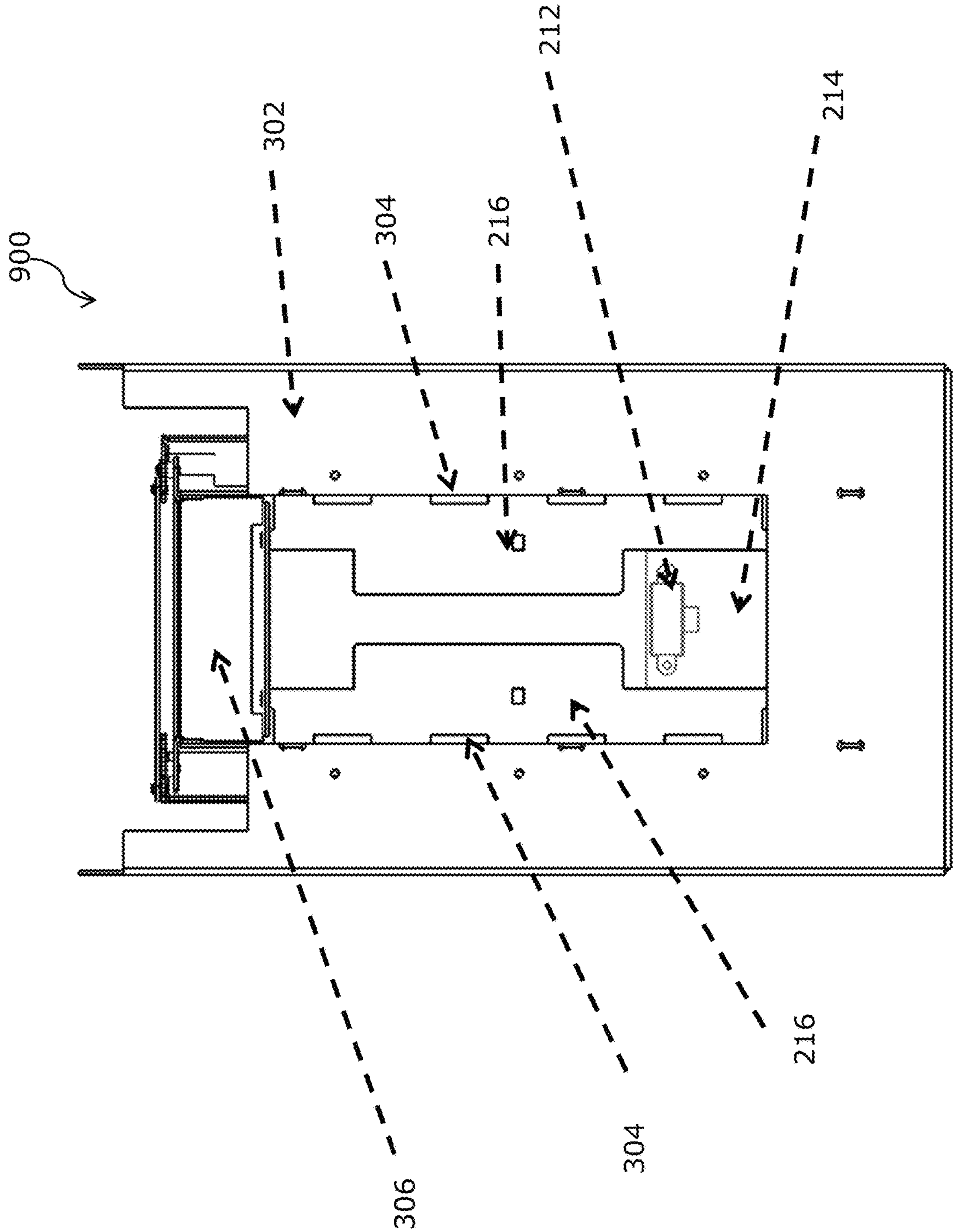
FIG. 9A illustrates a top view of an escrow module in accordance with various embodiments of the present disclosure.
Figure 9B:
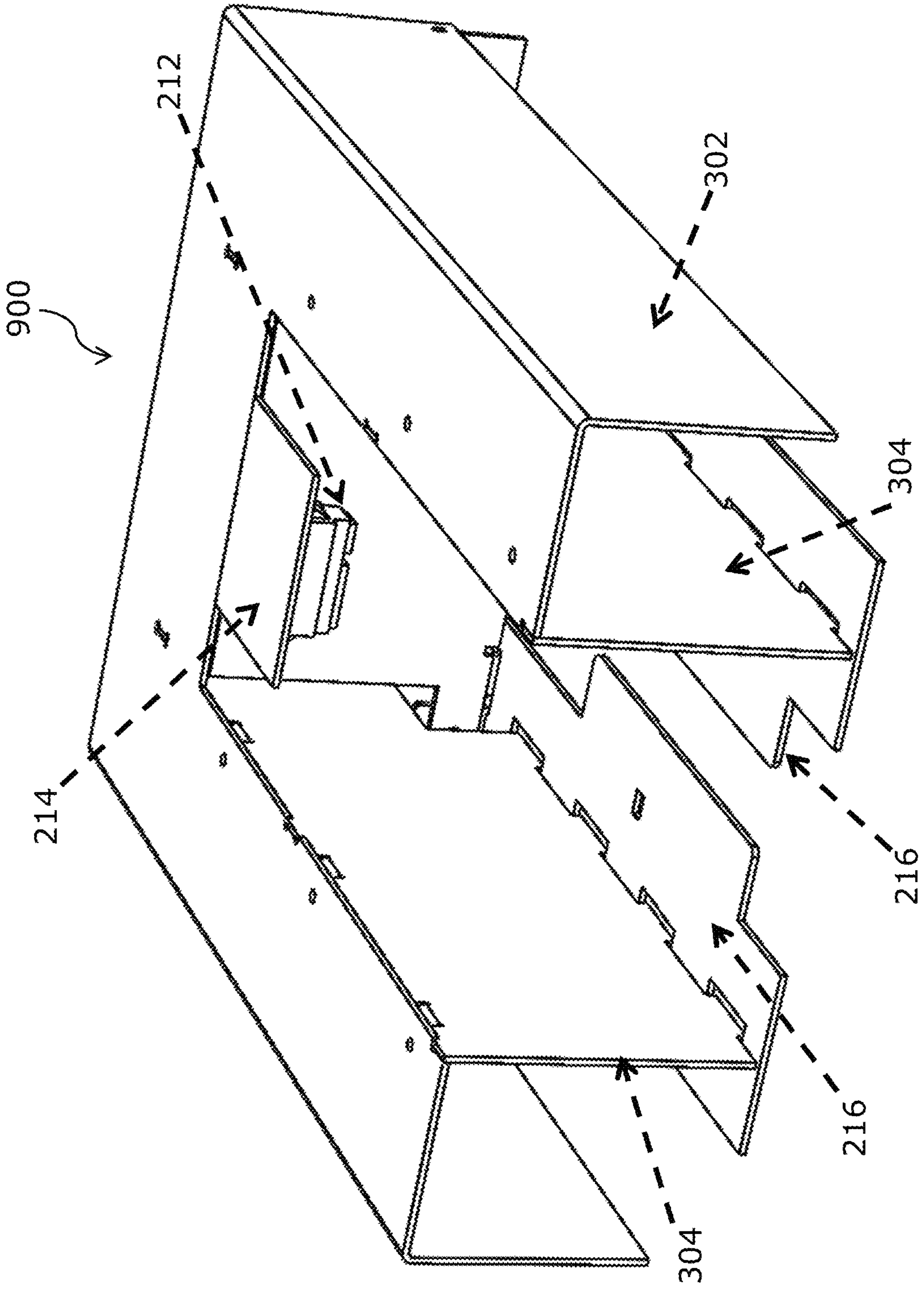
FIG. 9B illustrates a perspective view of an escrow module in accordance with various embodiments of the present disclosure.

FIGS. 9A and 9B illustrate various views of an escrow module 900 in accordance with various embodiments of the present disclosure. FIG. 9A illustrates a top view of an escrow module 900 in accordance with various embodiments of the present disclosure and FIG. 9B illustrates a perspective view of the escrow module 900 in accordance with various embodiments of the present disclosure. Escrow modules can come in a wide variety of configurations, and FIGS. 9A and 9B do not limit the scope of this disclosure to any particular implementation of an escrow module. The escrow module 900 illustrated in FIGS. 9A and 9B can be included in the lock-safe apparatus 100 disclosed herein.

FIGS. 9A and 9B show different positions of the sensor 212 and the support 214 looking down into the temporary storage of the escrow module 900. This arrangement shows another embodiment of this disclosure. The sensor 212 and the support 214 of escrow module 900 are positioned at a side of the escrow module 900 opposite the banknote entrance 306. The position of the sensor 212 in escrow module 900 can move the sensor 212 out of the path of banknotes entering the escrow module 900 and entering the temporary storage area, while still allowing the sensor 212 to view banknotes on the escrow plates 216 or in the cashbag 202.

Figure 10:
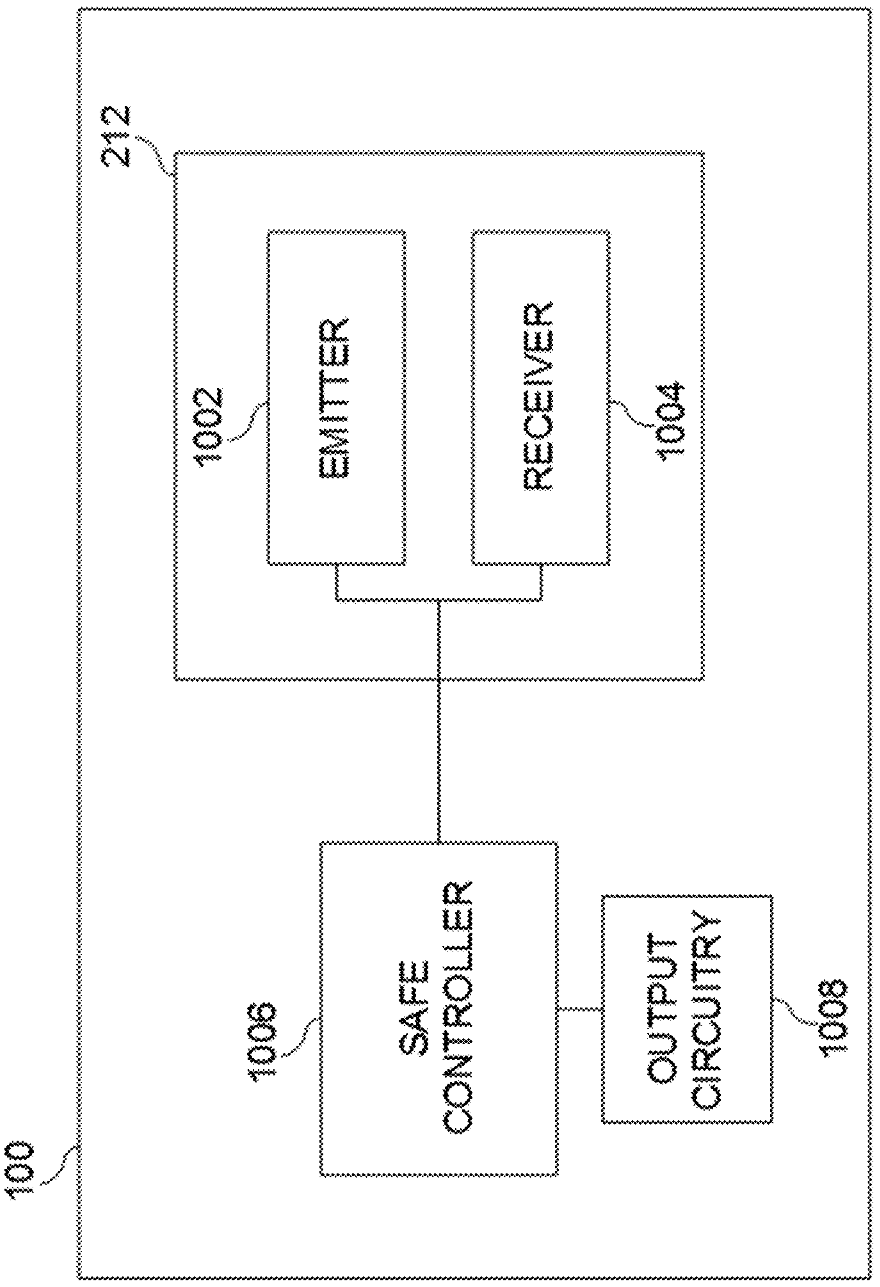
FIG. 10 illustrates a block diagram of a lock-safe apparatus including a sensor in accordance with various embodiments of the present disclosure.

FIG. 10 illustrates a block diagram of the lock-safe apparatus 100 including the sensor 212 in accordance with various embodiments of the present disclosure. Lock-safe apparatuses and sensors can come in a wide variety of configurations, and FIG. 10 does not limit the scope of this disclosure to any particular implementation of a lock safe apparatus or sensor. The lock-safe apparatus 100 illustrated in FIG. 10 can be the lock-safe apparatus 100 illustrated in FIGS. 1A and 1B.

The sensor 212 in some embodiments is an optical distance sensor, a proximity sensor, or an optical triangulation sensor, comprising an emitter 1002 and a receiver 1004. Light emitted from the emitter 1002 of the sensor 212 reflects off the top of the top banknote surface of the banknote stack, and the reflected light is received by the receiver 1004. Triangulation can then be performed to determine the distance of a banknote, a stack of banknotes, or a cashbag from the sensor 212. The emitter in sensor 212 could be a LED that may emit light in UV, visible or infrared wavelengths. In other embodiments, the emitter in sensor 212 could be a laser without deviating from this disclosure.

In another embodiment the sensor 212 could measure distance using time of flight for the roundtrip from emitter to receiver. In this time of flight embodiment, light emitted from the emitter 1002 of the sensor 212 reflects off the top of the top banknote surface of the banknote stack, and the reflected light is received by the receiver 1004. Based on the time period between the emission of the light and the reception of the corresponding measurement signal, the distance of a banknote, a stack of banknotes, or a cashbag from the sensor 212 is measured. Sensors of this type are described in WIPO Publication No. WO/2016/150655, which is related to US Patent Publication No. 2018/151018, both of which are incorporated by reference herein in their entirety. FIG. 1 in both WO/2016/150655 and US 2018/151018 illustrate a device for determining a distance of an object from the device, comprising at least one optical radiation transmitter that is arranged in a defined position in such a way that optical radiation transmitted by the at least one optical radiation transmitter impinges on first surface in its path and at least one optical radiation receiver that is arranged in a defined position in such a way that optical radiation, which is transmitted by the at least one optical radiation transmitter and reflected by first surface, is received by the at least one optical radiation receiver as a measurement signal, and a control and evaluation apparatus which is connected to the at least one optical radiation transmitter and the at least one optical radiation receiver, and is configured to control the at least one optical radiation transmitter for the transmission of optical radiation and to determine the distance of the object from the device, based on a time period between the transmission of optical radiation and the reception of a corresponding measurement signal by the at least one optical receiver.

In another embodiment receiver 1004 of the sensor 212 could be an imaging sensor. In this imaging sensor embodiment, the imaging sensor takes images of the top of the banknote. Based on the apparent size of the banknote calculated from the image sensor distance of the banknote can be calculated from the receiver 1004. In addition to measuring distance, the imaging sensor can also take image of the sealed cashbag 202 and determine if quality of seal the is acceptable. The receiver 1004 of the imaging sensor 212 may measure quality of bag mounting and wrong position of dropped notes, like jamming or clogging, detection of clean sealing line. If the banknotes are stuck with the side of the cashbag 202 then the sealer 208 during operation of the sealing may seal the cashbag 202 with banknotes stuck in the seal and damage accepted banknote and result in lower quality seal. The receiver 1004 of the imaging sensor 212 according to this embodiment may determine that if the banknotes are stuck with the side of the cashbag 202 where seal may happen and send appropriate signal to safe controller 1006 or banknote acceptor 101. Imaging sensors of this type are described in WIPO Publication No. WO/2016/162378, which is related to US Patent Publication No. 2018/130277, both of which are incorporated by reference herein in their entirety. FIGS. 1-6 in both WO/2016/162378 and US 2018130277 describe a device for determining a distance of an object from the device, where the device comprises at least one spatially resolving optical sensor that is arranged in a defined position and configured to capture at least one spatially resolved image of an upper side of the object and an evaluation unit coupled to the at least one spatially resolving optical sensor and configured to receive the at least one spatially resolved image, wherein the evaluation unit is configured to evaluate at least one spatially resolved image to detect a dimension of the uppermost object and determine distance of the object from the device by ratio between one of an inner or an outer dimension of the uppermost object on the spatially resolved image and the known dimension of the uppermost object. The difference in dimensions of banknotes in captured images provides distance of banknotes from the sensor.

In some embodiments, the emitter 1002 and the receiver 1004 are electrically connected to a safe controller 1006 disposed in the escrow module 206, the banknote acceptor 101, or elsewhere in the lock-safe apparatus 100. In some embodiments, the safe controller is a digital signal processor (DSP), or the system may include a DSP in addition to the safe controller. In some embodiments, the system may not include a safe controller, and instead the sensor 212 is connected to a circuit board or similar device to provide signals to other components of the lock-safe apparatus 100, such as to the banknote acceptor 101 or signals to the motor 218 to instruct the motor 218 to activate to drop the banknote stack into the cashbag 202, in response to signals received by the receiver 1004.

In other embodiments, the safe controller 1006 can be configured to instruct the emitter 1002 to emit light, and to receive an input from the receiver 1004 after the light is reflected off the top banknote surface of the banknote stack and received by the receiver 1004. In some embodiments, an analog-to-digital converter may also be used to convert an analog signal from the receiver 1004 to a digital signal for use by the safe controller 1006. The safe controller 1006 is connected to output circuitry 1008. The output circuitry 1008 is configured to transport signals from the safe controller 1006, such as to the banknote acceptor 101 or the motor 218 to instruct the motor 218 to activate to drop the banknote stack into the cashbag 202, in response to the distance of the banknote stack calculated by the sensor 212 and safe controller 1006.

Figure 11A:
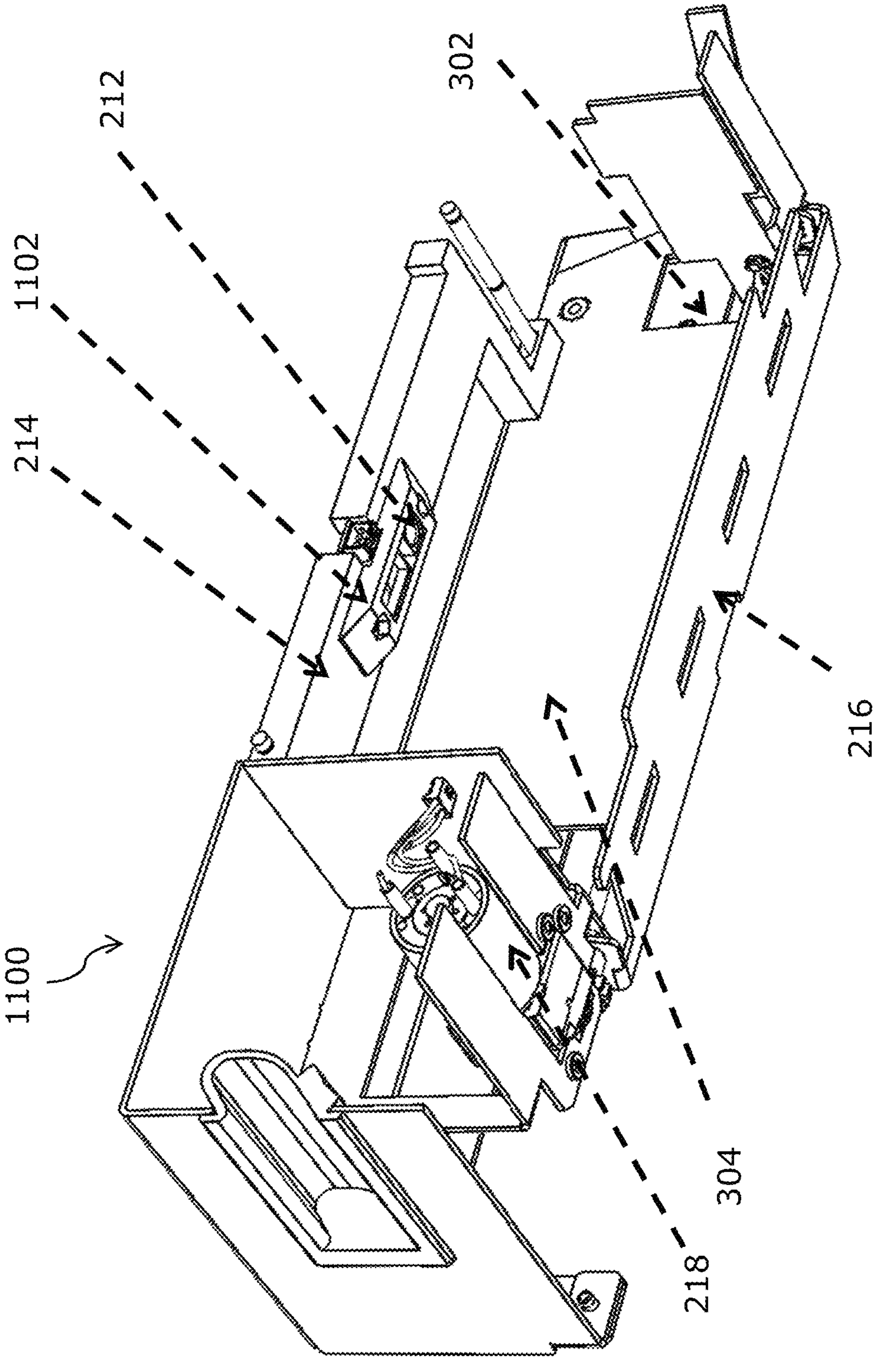
FIG. 11A illustrates an example of a bottom view of an escrow module in accordance with various embodiments of the present disclosure.
Figure 11B:
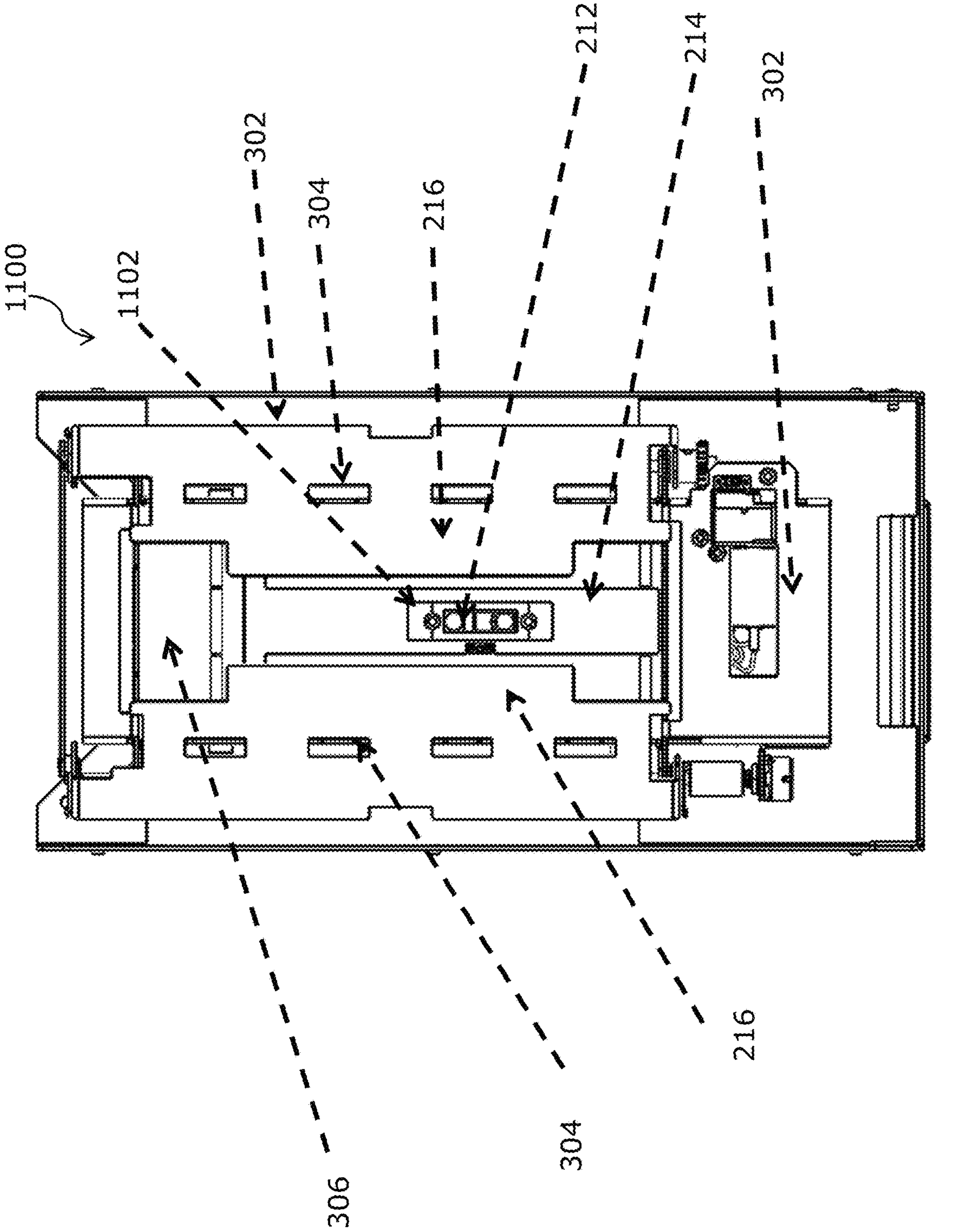
FIG. 11B illustrates a top view of an escrow module in accordance with various embodiments of the present disclosure.
Figure 11C:
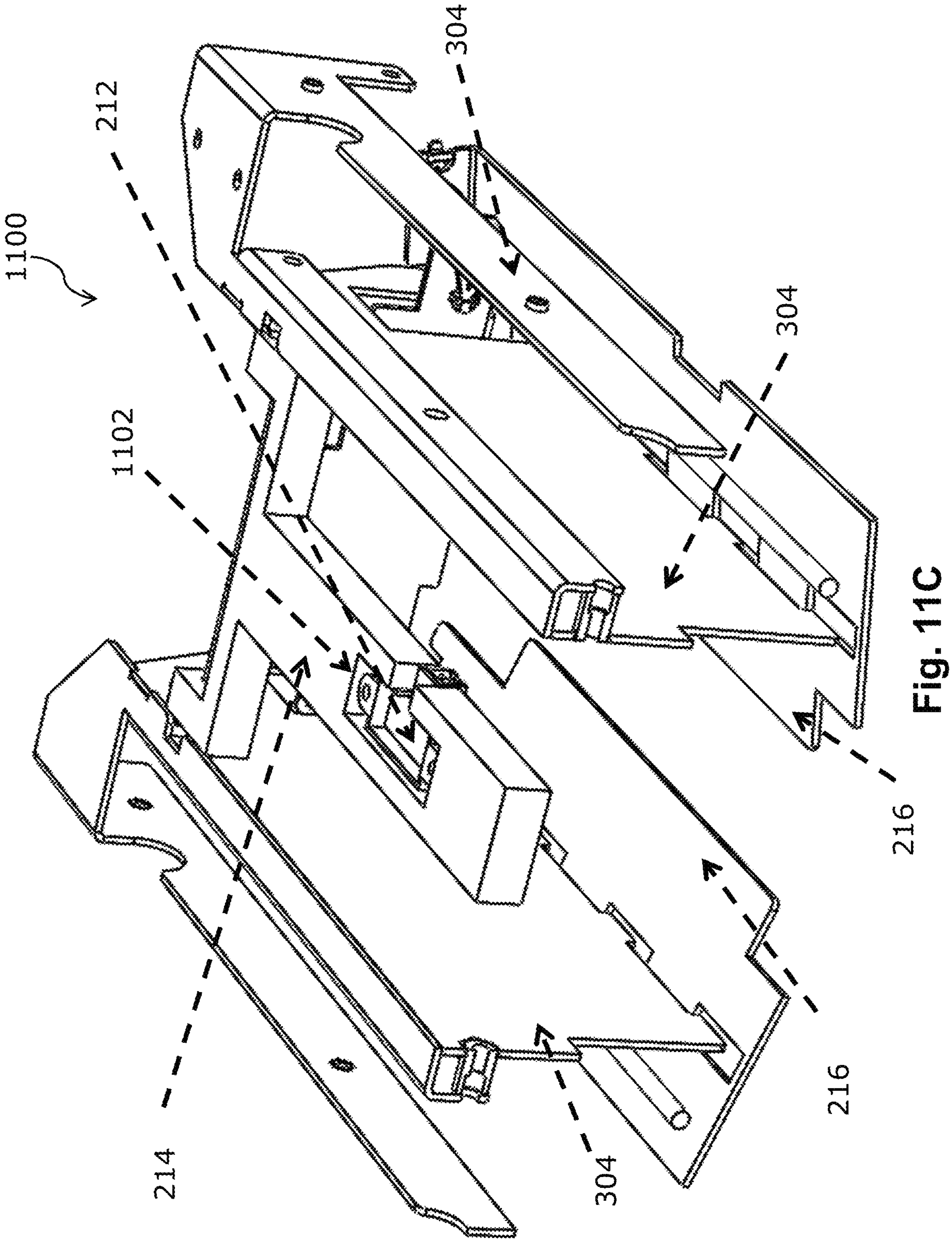
FIG. 11C illustrates a perspective view of an escrow module in accordance with various embodiments of the present disclosure.

FIGS. 11A-11C illustrate various views of an escrow module 1100 in accordance with various embodiments of the present disclosure. FIG. 11A illustrates a bottom view of the escrow module 1100 in accordance with various embodiments of the present disclosure, FIG. 11B illustrates a top view of the escrow module 1100 in accordance with various embodiments of the present disclosure, and FIG. 11C illustrates a perspective view of the escrow module 1100 in accordance with various embodiments of the present disclosure. Escrow modules can come in a wide variety of configurations, and FIGS. 11A-11C do not limit the scope of this disclosure to any particular implementation of an escrow module. The escrow module 1100 illustrated in FIGS. 11A-11C can be included in the lock-safe apparatus 100 disclosed herein. A multipurpose cashbag level and banknote presence in escrow detector 212 is mounted on a support 214 looking down into the temporary storage of the escrow module 1100. In this embodiment, support 214 includes a protective cover 1102 surrounding sensor 212 and protecting the sensor 212 from curled up banknotes. Many street quality banknotes upon leaving confined banknote pathway such as banknote transport and turn-around mechanism 203 may spring up or move towards sensor 212 and block the sensor. Support 214 shown in FIGS. 11A-11C can protect sensor 212 against curled up banknotes. In other embodiments, protective cover 1102 may be cylinder, triangle, rectangle or any other polygon shape that allows sensor 212 access to viewing area.

Figure 12A:
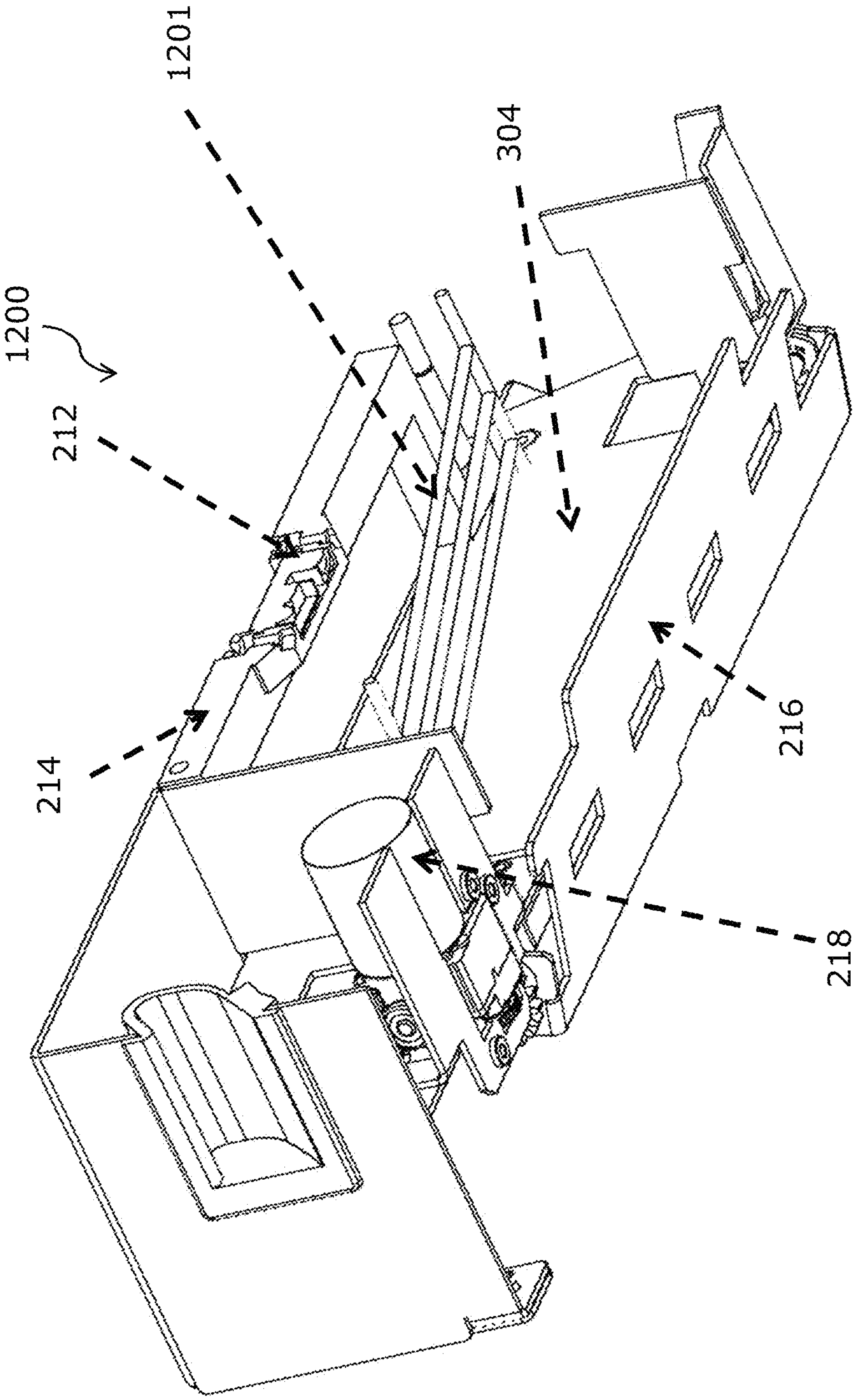
FIG. 12A illustrates an example of a bottom view of an escrow module in accordance with various embodiments of the present disclosure.
Figure 12B:
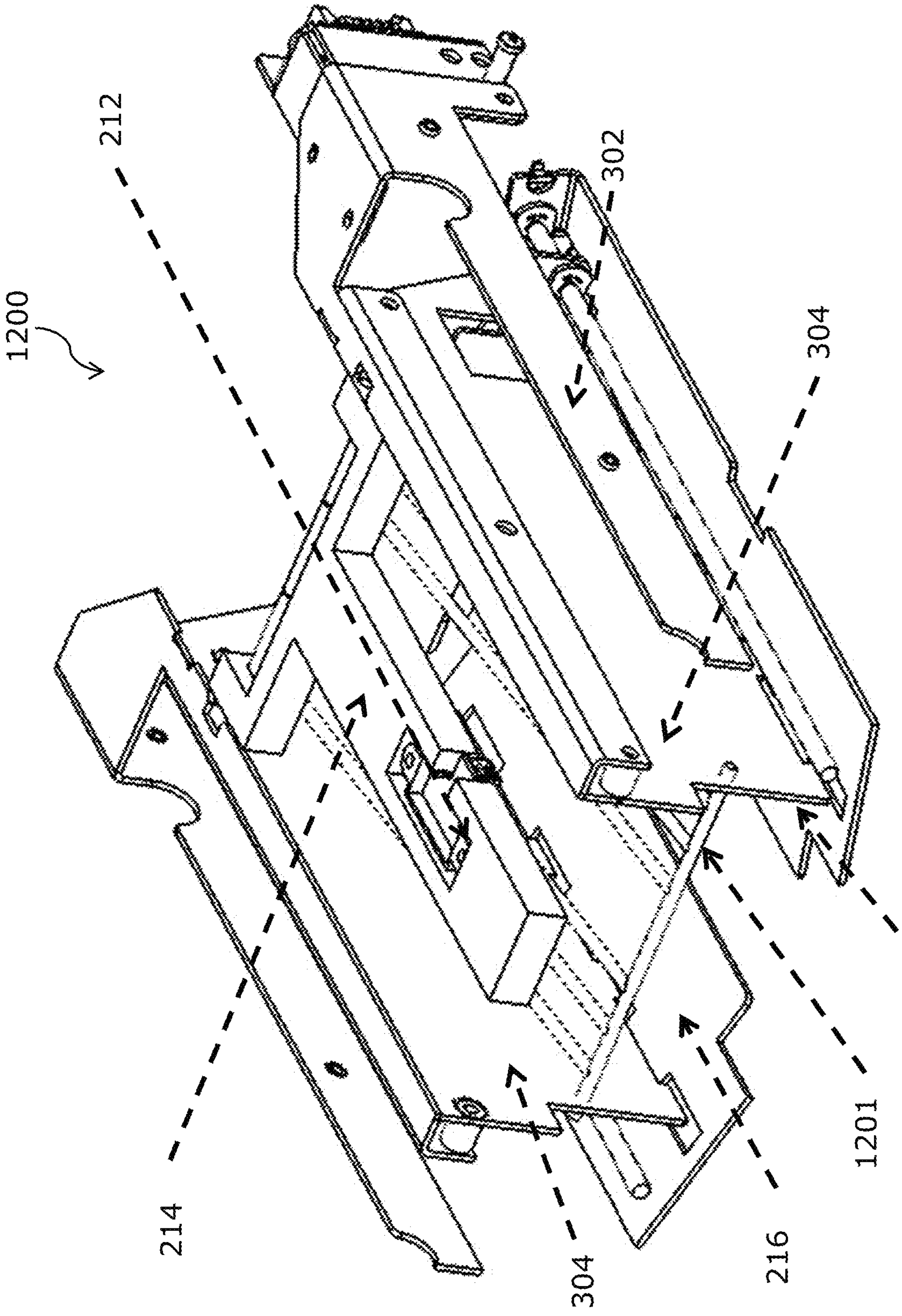
FIG. 12B illustrates an example perspective view of an escrow module in accordance with various embodiments of the present disclosure.
Figure 12C:
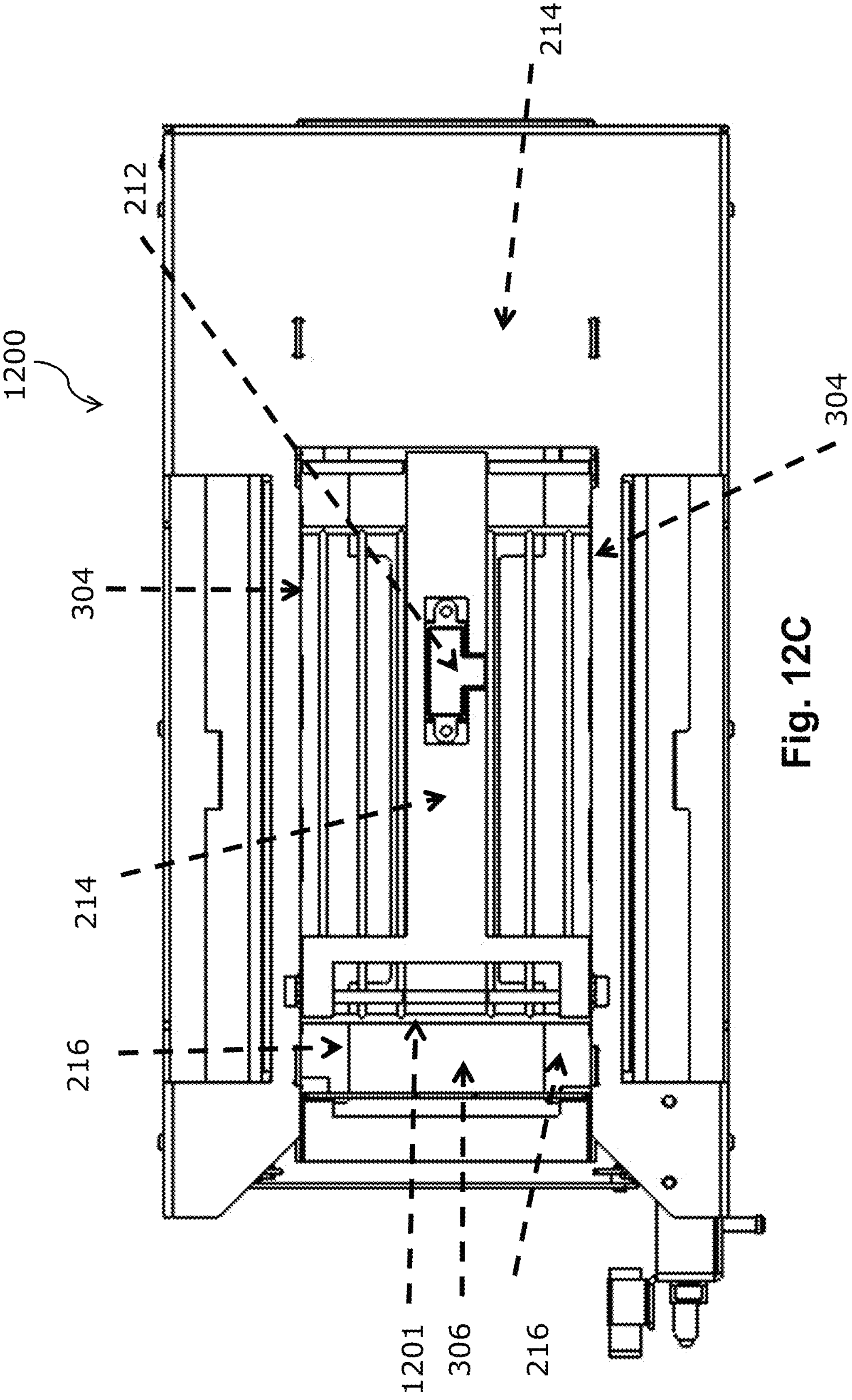
FIG. 12C illustrates an example of a top view of an escrow module in accordance with various embodiments of the present disclosure.
Figure 12D:
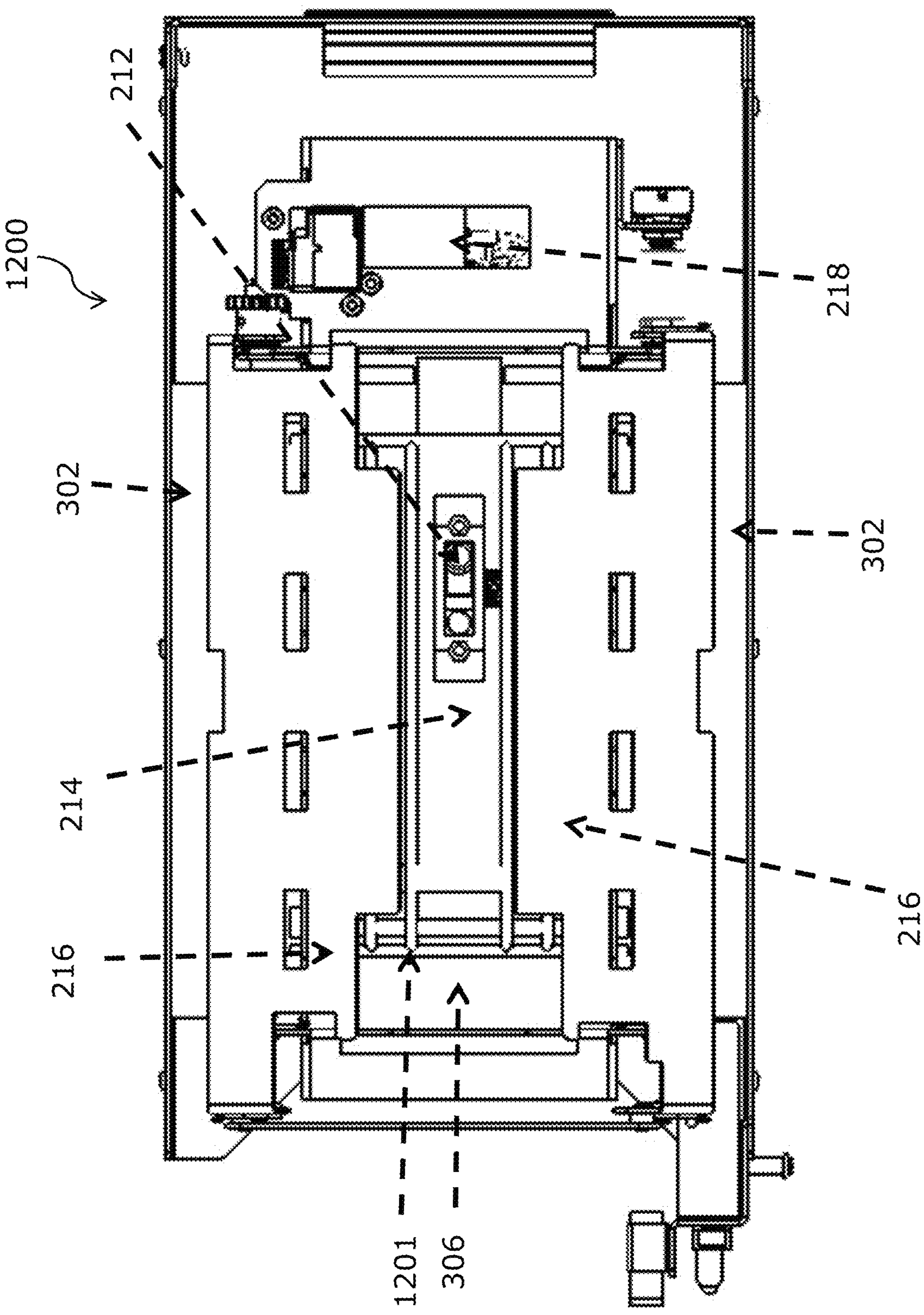
FIG. 12D illustrates an example of a bottom view of an escrow module in accordance with various embodiments of the present disclosure.

FIGS. 12A-12D illustrates various views of an escrow module 1200 in accordance with various embodiments of the present disclosure. FIG. 12A illustrates a bottom view of the escrow module 1200 in accordance with various embodiments of the present disclosure. FIG. 12B illustrates a perspective view of the escrow module 1200 in accordance with various embodiments of the present disclosure. FIG. 12C illustrates a top view of the escrow module 1200 in accordance with various embodiments of the present disclosure. FIG. 12D illustrates a bottom view of the escrow module 1200 in accordance with various embodiments of the present disclosure. Escrow modules can come in a wide variety of configurations, and FIGS. 12A-12D do not limit the scope of this disclosure to any particular implementation of an escrow module. The escrow module 1200 illustrated in FIGS. 12A-12D can be included in the lock-safe apparatus 100 disclosed herein.

In the embodiment illustrated in FIGS. 12A-12D, a protective baffle 1201 is placed below the support 214 and the sensor 212, between the sensor 212 and escrow plates 216, to protect sensor 212 against curled up banknotes. The baffle 1201 includes a number of bars connected between two rods, such that there is open space between each of the bars, allowing the sensor 212 to still detect the presence of the banknotes or the cashbag even though the baffle 1201 is positioned between the sensor 212 and the escrow plates 216. In other embodiments, baffle 1201 may comprise a mesh or grid allowing viewing area for sensor 212. In other embodiments, baffle 1201 may comprise a plate with either a hole or transparent section allowing viewing area for sensor 212.

Figure 13A:
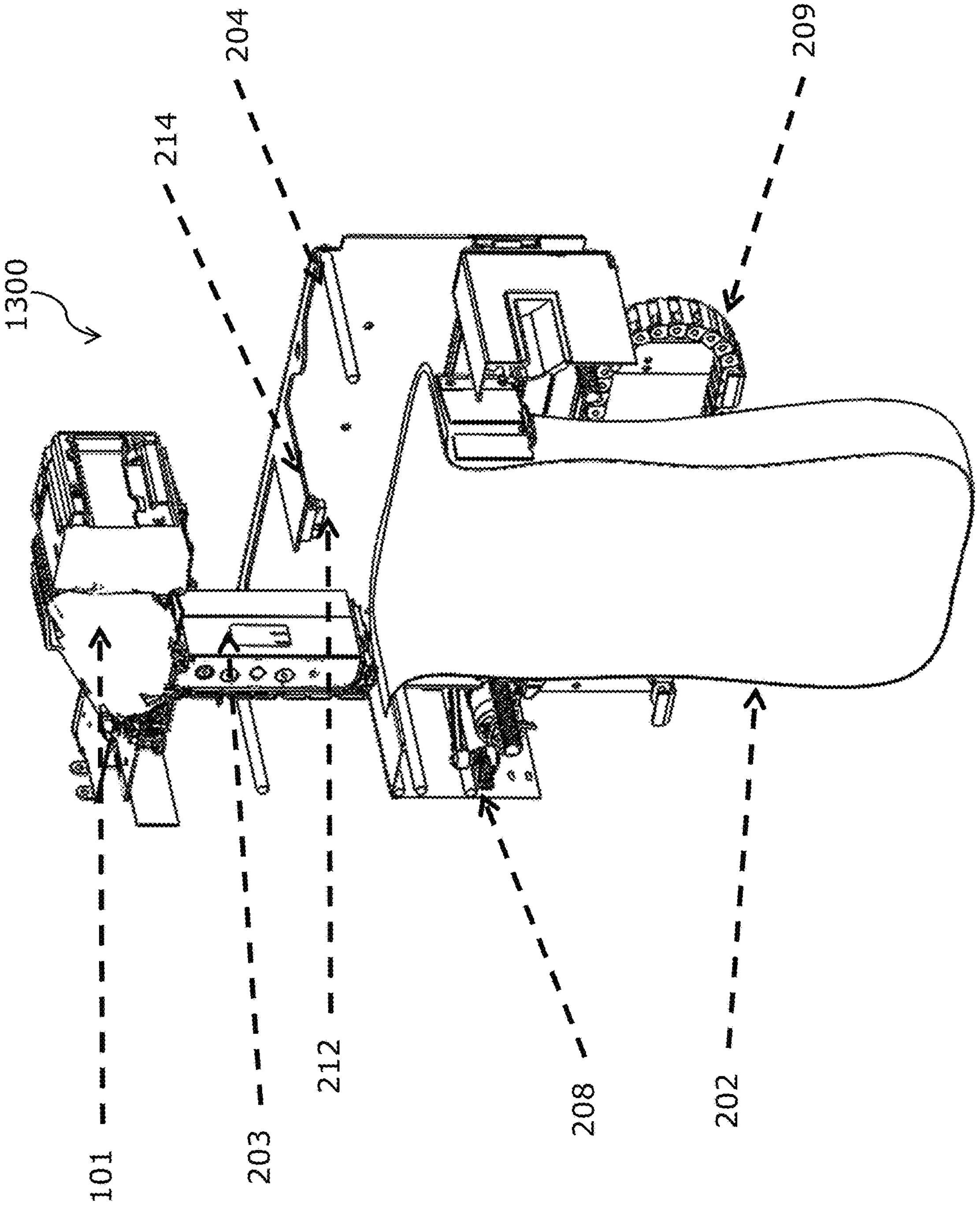
FIG. 13A illustrates an example of a perspective cross section of a lock-safe apparatus showing an internal structure in accordance with various embodiments of the present disclosure.
Figure 13B:
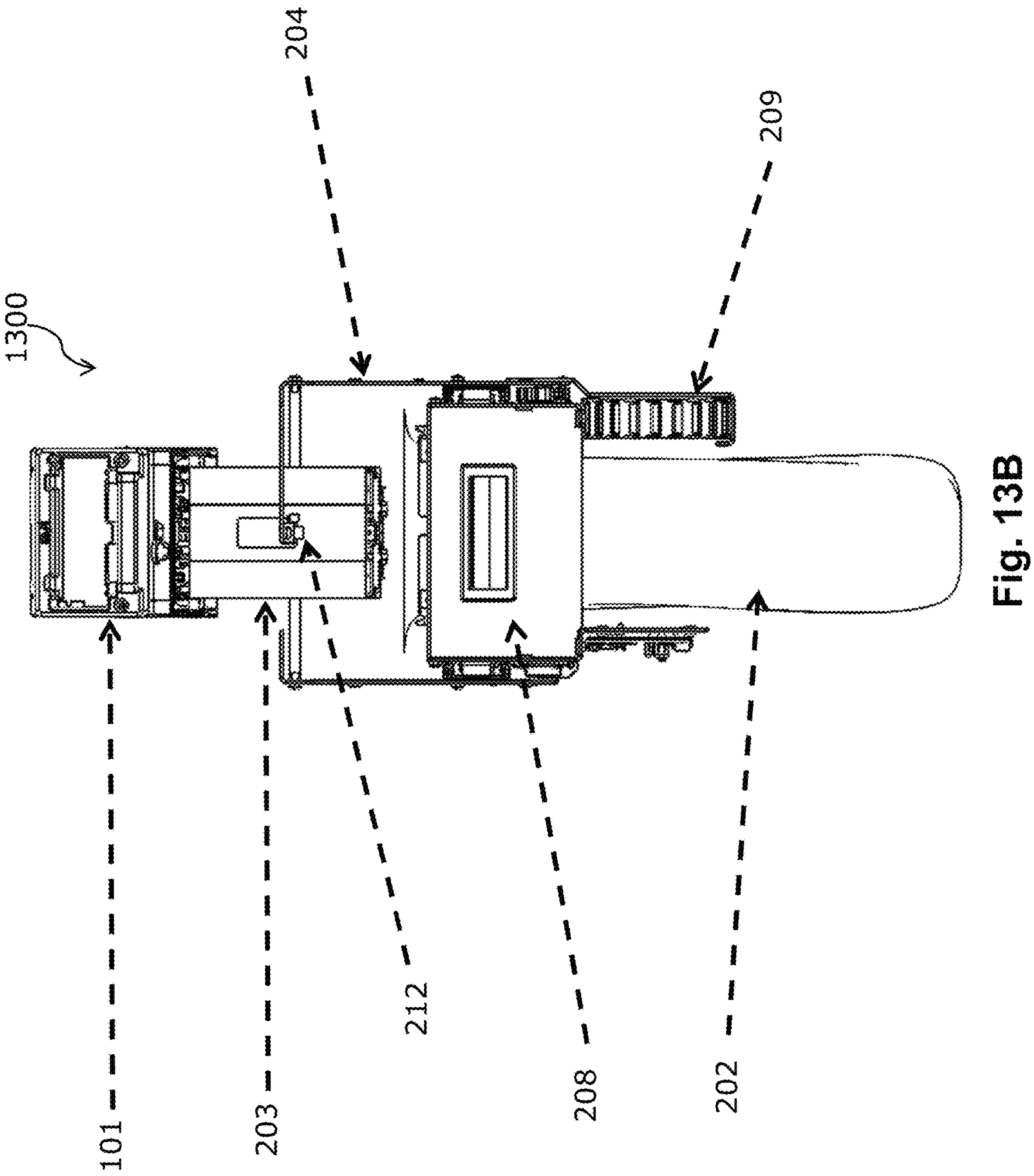
FIG. 13B illustrates an example of a front view of a lock-safe apparatus showing an internal structure in accordance with various embodiments of the present disclosure.
Figure 13C:
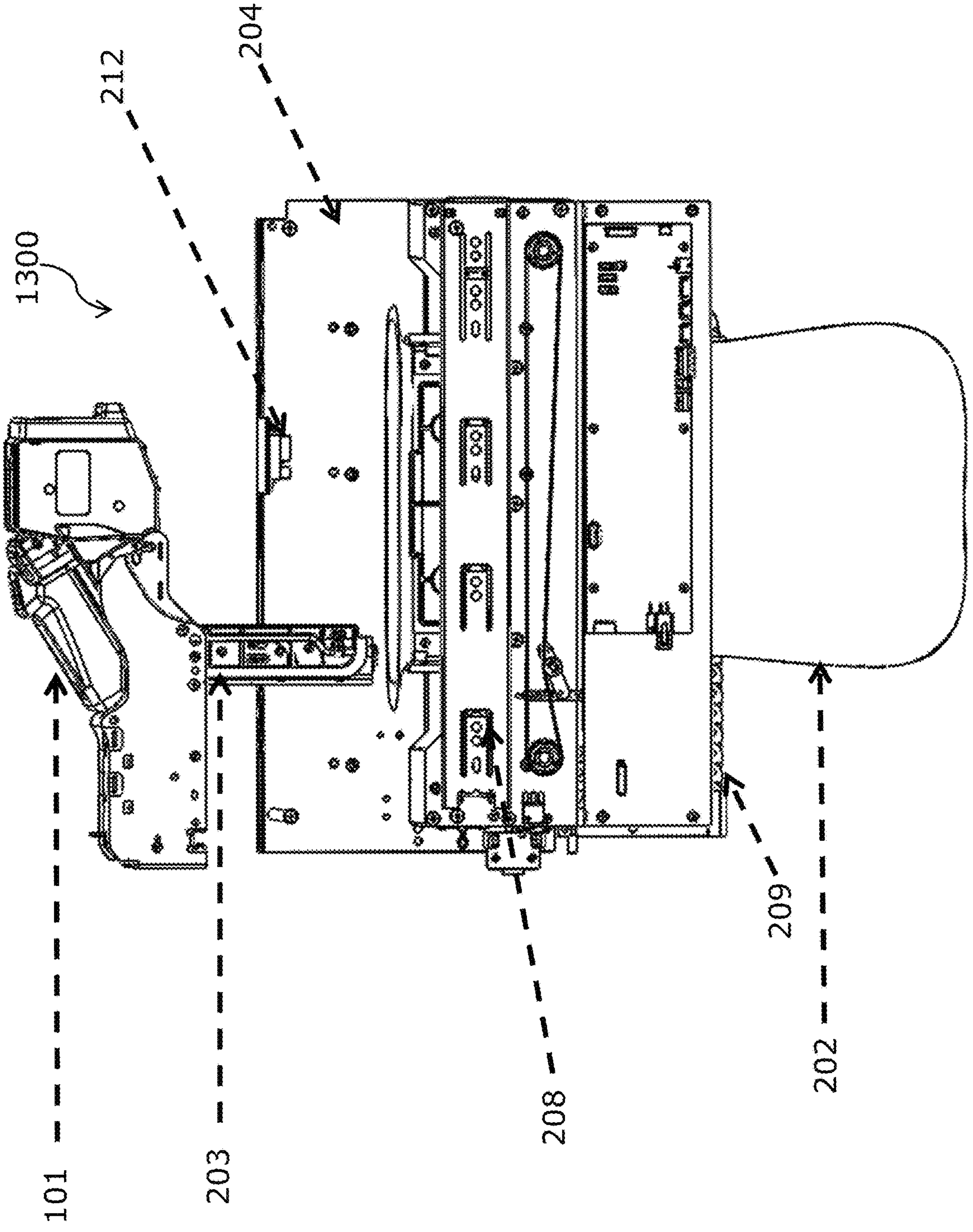
FIG. 13C illustrates an example of a side view of a lock-safe apparatus showing an internal structure in accordance with various embodiments of the present disclosure.

FIGS. 13A-13C illustrate various views of an embodiment of a lock-safe apparatus 1300 showing an internal structure. The internal structure of the lock-safe apparatus 1300 can be a part of the lock-safe apparatus 100 illustrated in FIGS. 1A and 1B. FIG. 13A illustrates an example of a perspective view of the lock-safe apparatus 1300 showing an internal structure in accordance with various embodiments of the present disclosure, FIG. 13B illustrates a front view of the lock-safe apparatus 1300 showing an internal structure in accordance with various embodiments of the present disclosure, FIG. 13C illustrates a cross section side view of the lock-safe apparatus 1300 showing an internal structure and a cashbag or banknote storing bag 202 in accordance with various embodiments of the present disclosure.

In addition to the locking mechanism (not shown), the safe 102 (FIGS. 1A-1B) also includes a banknote transport and turn-around mechanism 203, frame 204 to support a bag holding and sealing mechanism 208 that supports cashbag 202. Genuine banknotes verified by banknote acceptor 101 and transported to the safe 102 (FIGS. 1A-1B) are further transported and turned-around by mechanism 203 and dropped into the cashbag 202. A multipurpose cashbag level and banknote presence in escrow detector 212 is mounted on a support 214 looking down into the cashbag 202. Support 214 is mounted on frame 204.

Figure 14A:
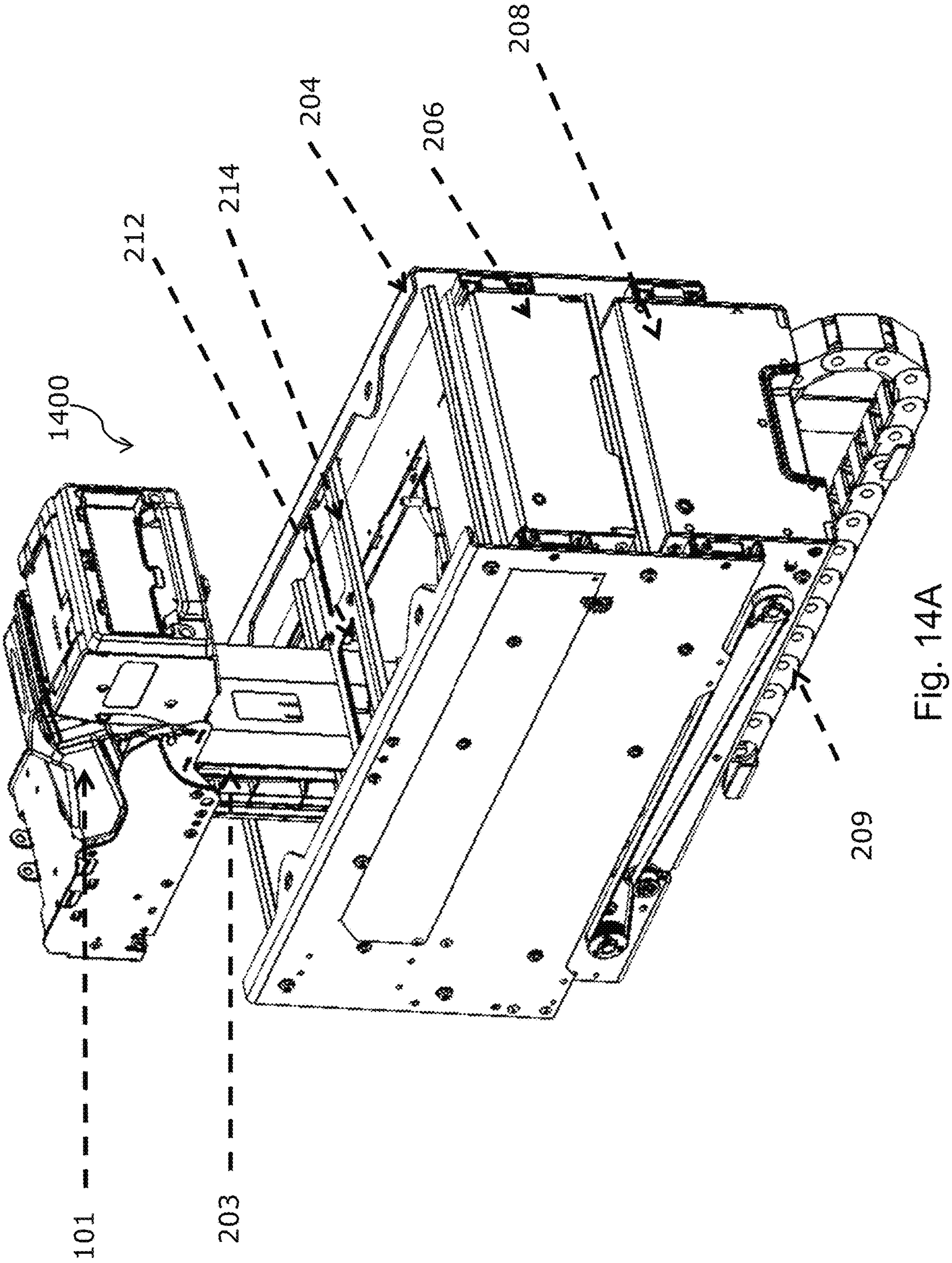
FIG. 14A illustrates an example of a perspective view of a lock-safe apparatus showing an internal structure in accordance with various embodiments of the present disclosure.
Figure 14B:
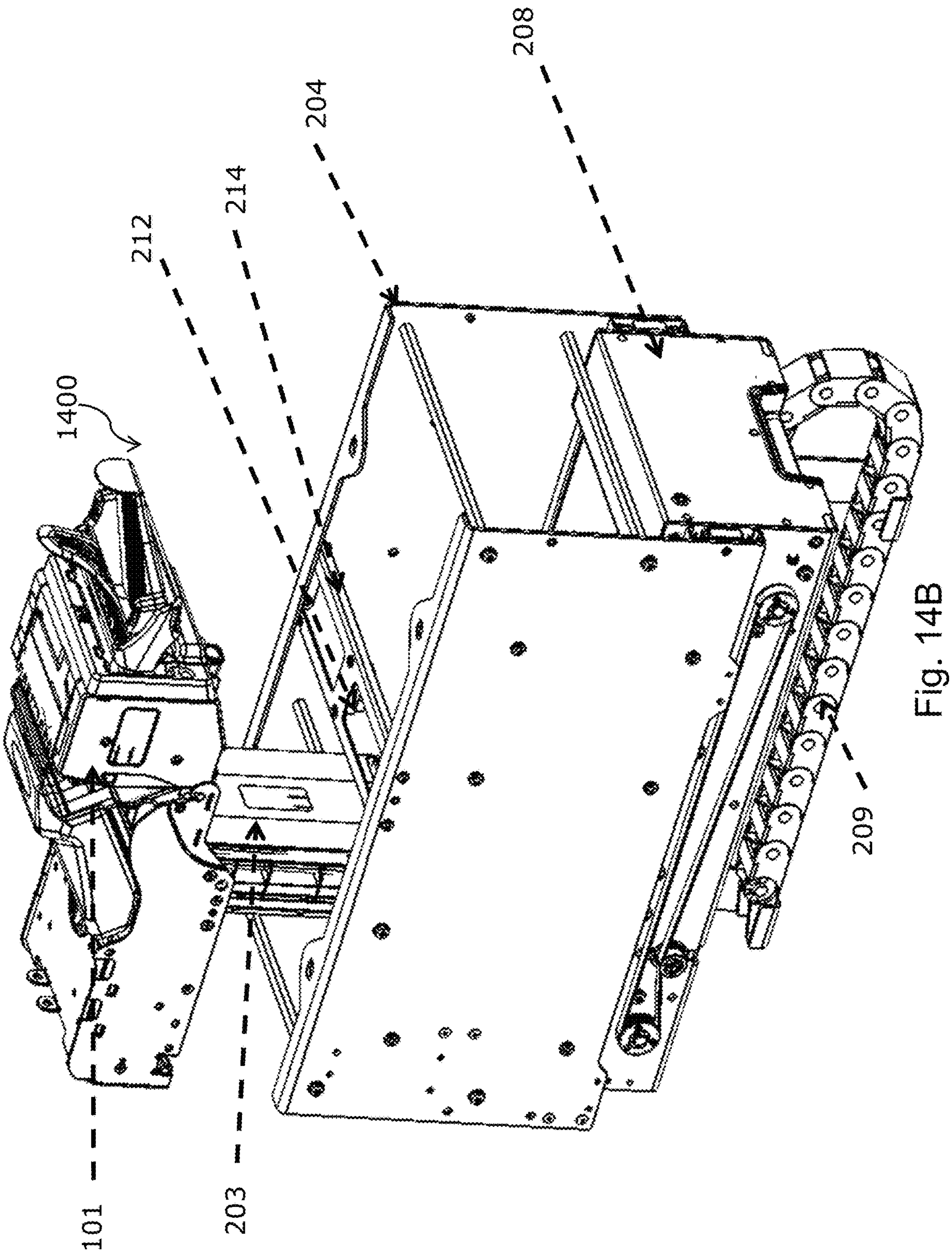
FIG. 14B illustrates an example of a perspective view of a lock-safe apparatus showing an internal structure in accordance with various embodiments of the present disclosure.

FIGS. 14A and 14B illustrate various views of an embodiment of a lock-safe apparatus 1400 showing an internal structure. The internal structure of the lock-safe apparatus 1400 can be a part of the lock-safe apparatus 100 illustrated in FIGS. 1A and 1B. FIG. 14A illustrates an example of a perspective view of the lock-safe apparatus 1400 showing an internal structure in accordance with various embodiments of the present disclosure, FIG. 14B illustrates a perspective view of the lock-safe apparatus 1400 showing an internal structure in accordance with various embodiments of the present disclosure.

FIG. 14A illustrates an example of a perspective view of a lock-safe apparatus 1400 showing an internal structure in accordance with various embodiments of the present disclosure. The internal structure of the lock-safe apparatus 1400 can be a part of the lock-safe apparatus 100 illustrated in FIGS. 1A and 1B. In addition to the locking mechanism (not shown), the safe 102 (FIGS. 1A-1B) also includes a banknote transport and turn-around mechanism 203, frame 204 to support an escrow module or storing unit 206 and a bag holding and sealing mechanism 208 that supports cashbag 202. The bag holding and sealing mechanism 208 has a structure, such as a frame, and is made of a material capable of supporting the weight of the bag and the weight of the bag holding unit, when the bag is empty or full, such as being made from a rigid or semi-rigid material such as plastic, metal, or other materials. Genuine banknotes verified by banknote acceptor 101 and transported to the safe 102 (FIGS. 1A-1B) are further transported and turned-around by mechanism 203 and dropped into the escrow module 206. Banknotes coming into escrow module 206 are freely stacked into a banknote stack 210. The banknote stack 210 is then dropped into the cashbag 202. A multipurpose cashbag level and banknote presence in escrow detector 212 is mounted on a support 214 mounted on frame 204 looking down into the temporary storage of the escrow module 206.

FIG. 14B illustrates an example of a perspective view of a lock-safe apparatus 1400 showing an internal structure in accordance with various embodiments of the present disclosure. The internal structure of the lock-safe apparatus 1400 can be a part of the lock-safe apparatus 100 illustrated in FIGS. 1A and 1B. In addition to the locking mechanism (not shown), the safe 102 (FIGS. 1A-1B) also includes a banknote transport and turn-around mechanism 203, frame 204 to support a bag holding and sealing mechanism 208 that supports cashbag 202. Genuine banknotes verified by banknote acceptor 101 and transported to the safe 102 (FIGS. 1A-1B) are further transported and turned-around by mechanism 203 and dropped into the cashbag 202. A multipurpose cashbag level and banknote presence in escrow detector 212 is mounted on a support 214 looking down into the cashbag 202. Support 214 is mounted on frame 204.

Figure 15A:
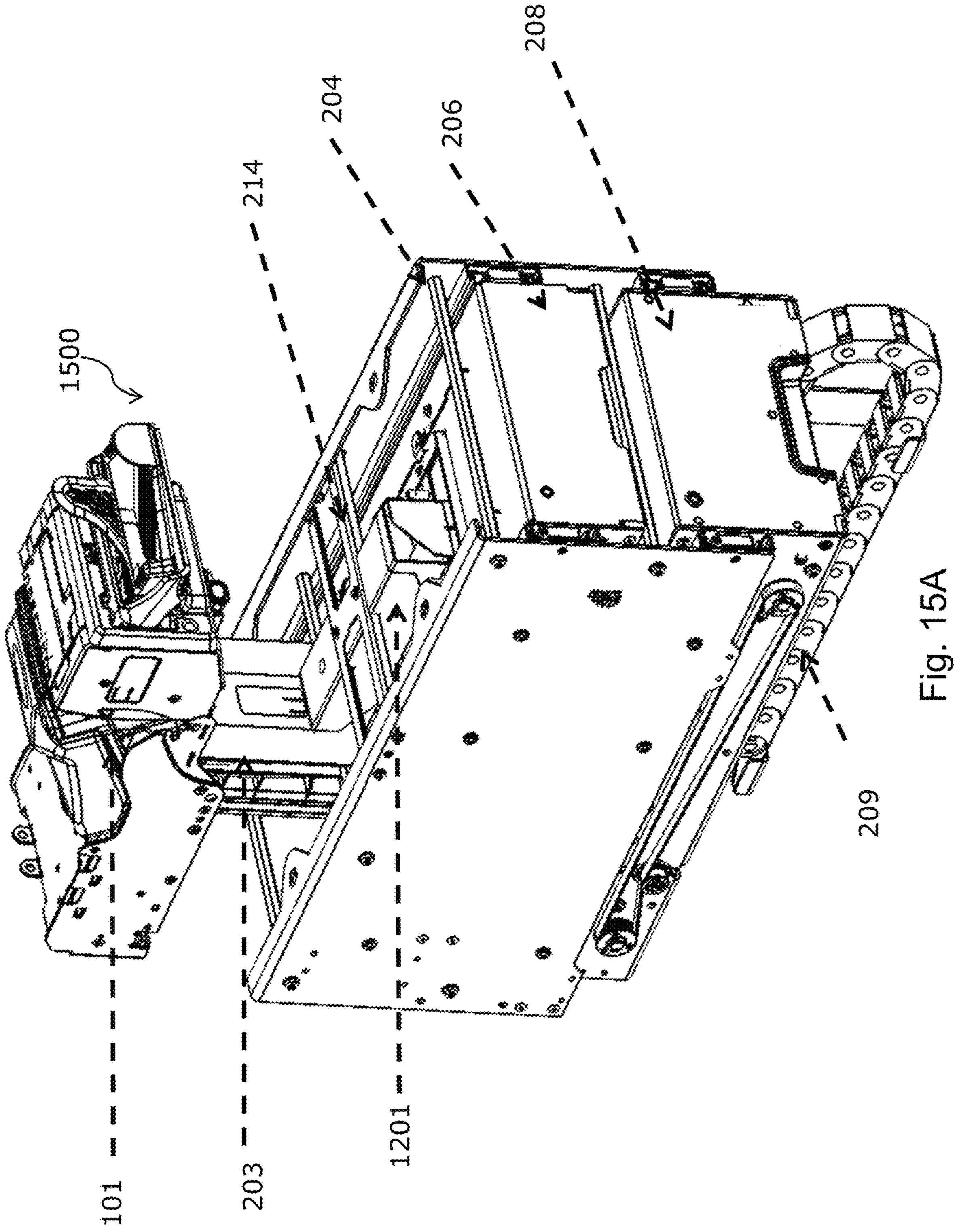
FIG. 15A illustrates an example of a perspective view of a lock-safe apparatus showing an internal structure in accordance with various embodiments of the present disclosure.
Figure 15B:
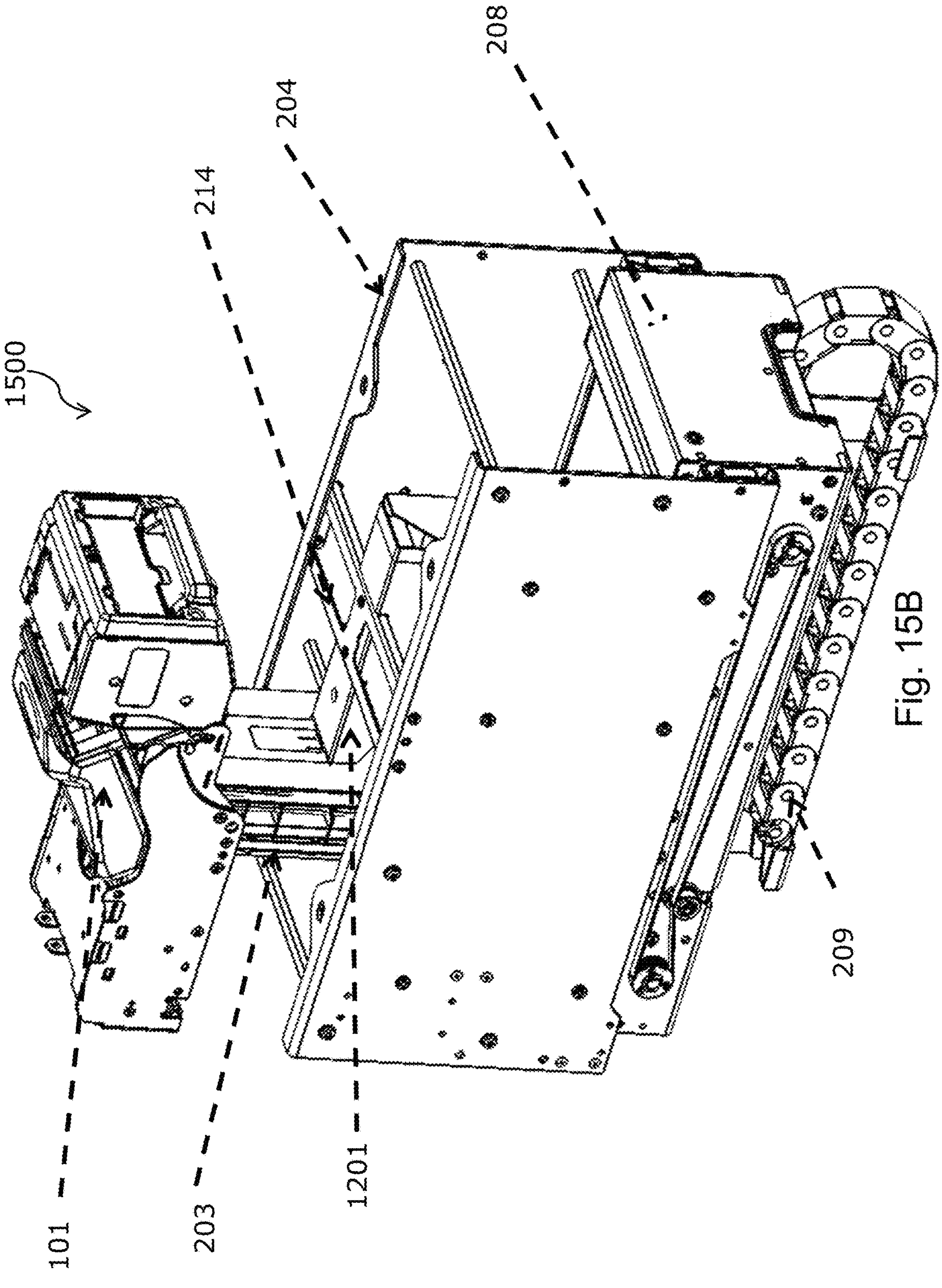
FIG. 15B illustrates an example of a perspective view of a lock-safe apparatus showing an internal structure in accordance with various embodiments of the present disclosure.
Figure 15C:
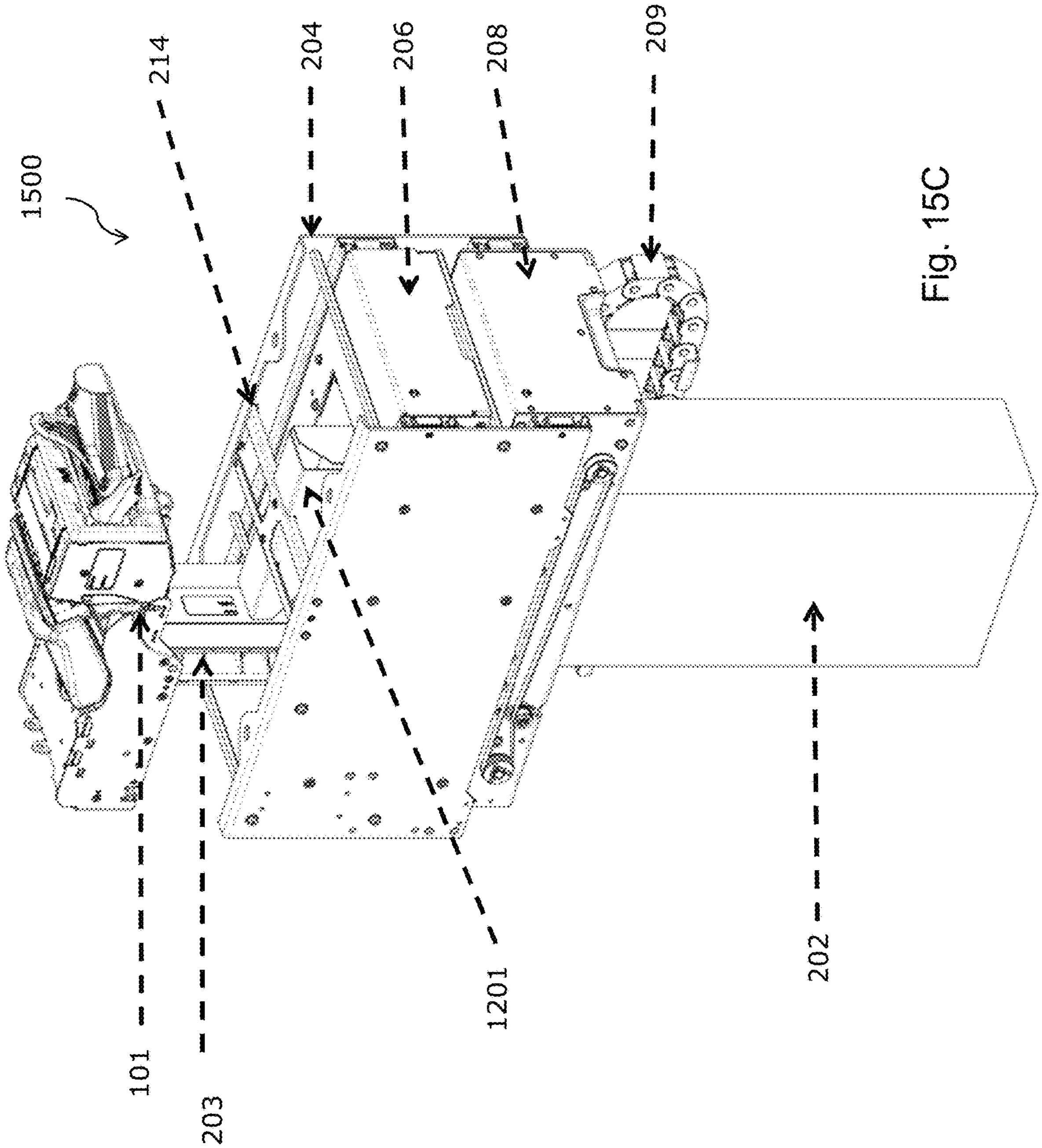
FIG. 15C illustrates an example of a perspective view of a lock-safe apparatus showing an internal structure in accordance with various embodiments of the present disclosure.
Figure 15D:
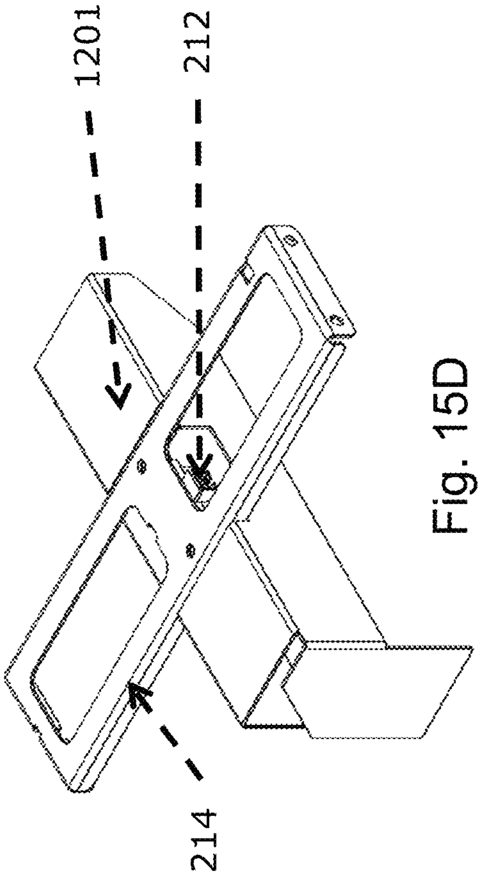
FIG. 15D illustrates an example of a perspective view of a protective baffle in accordance with various embodiments of the present disclosure.
Figure 15E:
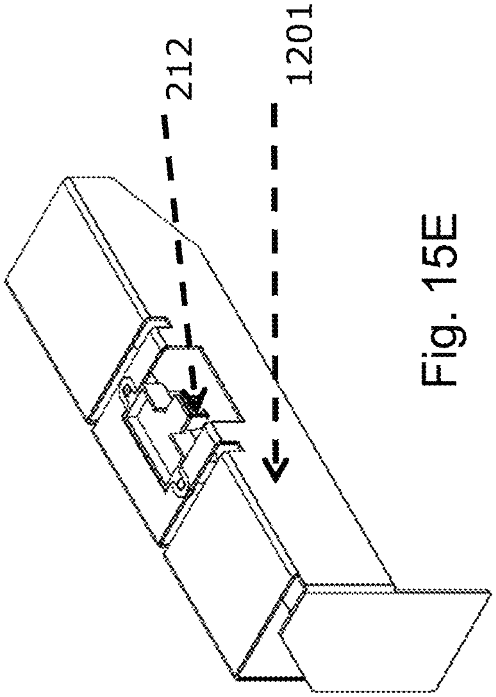
FIG. 15E illustrates an example of a perspective view of a protective baffle in accordance with various embodiments of the present disclosure.
Figure 15F:
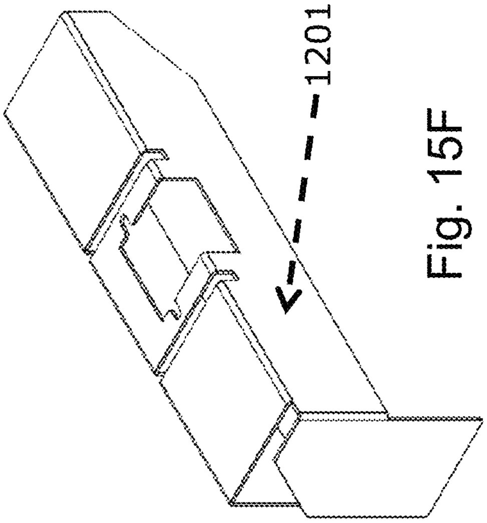
FIG. 15F illustrates an example of a perspective view of a protective baffle in accordance with various embodiments of the present disclosure.
Figure 15G:
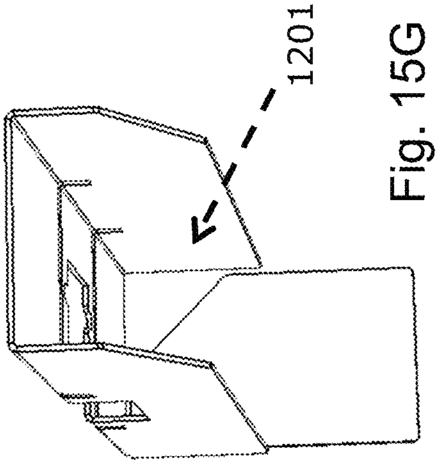
FIG. 15G illustrates an example of a perspective view of a protective baffle in accordance with various embodiments of the present disclosure.

FIGS. 15A-15G illustrate various views of an embodiment of a lock-safe apparatus 1500 showing an internal structure. The internal structure of the lock-safe apparatus 1500 can be a part of the lock-safe apparatus 100 illustrated in FIGS. 1A and 1B. FIG. 15A illustrates an example of a perspective view of the lock-safe apparatus 1500 showing an internal structure in accordance with various embodiments of the present disclosure, FIG. 15B illustrates a perspective view of the lock-safe apparatus 1500 showing an internal structure in accordance with various embodiments of the present disclosure. FIG. 15C illustrates a perspective view of the lock-safe apparatus 1500 showing an internal structure in accordance with various embodiments of the present disclosure. FIG. 15D illustrates a perspective view of a protective baffle 1201 along with the support 214 and the sensor 212. FIG. 15E illustrates a perspective view of a protective baffle 1201 along with the sensor 212, FIGS. 15F-15G show various vies of the protective baffle 1201.

FIG. 15A illustrates an example of a perspective view of a lock-safe apparatus 1500 showing an internal structure in accordance with various embodiments of the present disclosure. The internal structure of the lock-safe apparatus 1500 can be a part of the lock-safe apparatus 100 illustrated in FIGS. 1A and 1B. In addition to the locking mechanism (not shown), the safe 102 (FIGS. 1A-1B) also includes a banknote transport and turn-around mechanism 203, frame 204 to support an escrow module or storing unit 206 and a bag holding and sealing mechanism 208 that supports cashbag 202. Genuine banknotes verified by banknote acceptor 101 and transported to the safe 102 (FIGS. 1A-1B) are further transported and turned-around by mechanism 203 and dropped into the escrow module 206. Banknotes coming into escrow module 206 are freely stacked into a banknote stack 210. The banknote stack 210 is then dropped into the cashbag 202. A multipurpose cashbag level and banknote presence in escrow detector 212 (not shown) is mounted on a support 214 mounted on frame 204 looking down into the temporary storage of the escrow module 206. A protective baffle 1201 is placed below the support 214 and covers the sensor 212, between the sensor 212 and escrow module 206, to protect sensor 212 against curled up banknotes. The baffle 1201 may include a number of bars connected between two rods, such that there is open space between each of the bars, allowing the sensor 212 to still detect the presence of the banknotes or the cashbag even though the baffle 1201 is positioned between the sensor 212 and the escrow module 206. In other embodiments, baffle 1201 may comprise a mesh or grid allowing viewing area for sensor 212. In other embodiments, baffle 1201 may comprise a plate with either a hole or transparent section allowing viewing area for sensor 212.

FIG. 15B illustrates an example of a perspective view of a lock-safe apparatus 1500 showing an internal structure in accordance with various embodiments of the present disclosure. The internal structure of the lock-safe apparatus 1500 can be a part of the lock-safe apparatus 100 illustrated in FIGS. 1A and 1B. In addition to the locking mechanism (not shown), the safe 102 (FIGS. 1A-1B) also includes a banknote transport and turn-around mechanism 203, frame 204 to support a bag holding and sealing mechanism 208 that supports cashbag 202. Genuine banknotes verified by banknote acceptor 101 and transported to the safe 102 (FIGS. 1A-1B) are further transported and turned-around by mechanism 203 and dropped into the cashbag 202. A multipurpose cashbag level and banknote presence in escrow detector 212 is mounted on a support 214 looking down into the cashbag 202. Support 214 is mounted on frame 204. A protective baffle 1201 is placed below the support 214 and covers the sensor 212, to protect sensor 212 against curled up banknotes. The baffle 1201 may include a number of bars connected between two rods, such that there is open space between each of the bars, allowing the sensor 212 to still detect the presence of the banknotes or the cashbag even though the baffle 1201 is positioned between the sensor 212 and the bag holding module 208. In other embodiments, baffle 1201 may comprise a mesh or grid allowing viewing area for sensor 212. In other embodiments, baffle 1201 may comprise a plate with either a hole or transparent section allowing viewing area for sensor 212.

FIG. 15C illustrates an example of a perspective view of a lock-safe apparatus 1500 showing an internal structure in accordance with various embodiments of the present disclosure. The internal structure of the lock-safe apparatus 1500 can be a part of the lock-safe apparatus 100 illustrated in FIGS. 1A and 1B. In addition to the locking mechanism (not shown), the safe 102 (FIGS. 1A-1B) also includes a banknote transport and turn-around mechanism 203, frame 204 to support an escrow module or storing unit 206 and a bag holding and sealing mechanism 208 that supports cashbag 202. Genuine banknotes verified by banknote acceptor 101 and transported to the safe 102 (FIGS. 1A-1B) are further transported and turned-around by mechanism 203 and dropped into the escrow module 206. Banknotes coming into escrow module 206 are freely stacked into a banknote stack 210. The banknote stack 210 is then dropped into the cashbag 202. A multipurpose cashbag level and banknote presence in escrow detector 212 (not shown) is mounted on a support 214 mounted on frame 204 looking down into the temporary storage of the escrow module 206. A protective baffle 1201 is placed below the support 214 and covers the sensor 212, between the sensor 212 and escrow module 206, to protect sensor 212 against curled up banknotes. The baffle 1201 may include a number of bars connected between two rods, such that there is open space between each of the bars, allowing the sensor 212 to still detect the presence of the banknotes or the cashbag even though the baffle 1201 is positioned between the sensor 212 and the escrow module 206. In other embodiments, baffle 1201 may comprise a mesh or grid allowing viewing area for sensor 212. In other embodiments, baffle 1201 may comprise a plate with either a hole or transparent section allowing viewing area for sensor 212.

FIGS. 15D-15G illustrate an example of a baffle 1201 shown in FIGS. 15A-15C. FIG. 15D shows an example of the location of baffle 1201, support 214 and sensor 212. In other embodiments, the support 214 and baffle 1201 may be combined into a single component that may house and protect the sensor 212. FIG. 15E illustrates relative location of sensor 212 and protective baffle 1201. FIGS. 15F and 15G illustrate various views of the protective baffle 1201; in other embodiments, baffle 1201 may comprise a mesh or grid allowing viewing area for sensor 212; in other embodiments, baffle 1201 may comprise a plate with either a hole or transparent section allowing viewing area for sensor 212.

Figure 16B:
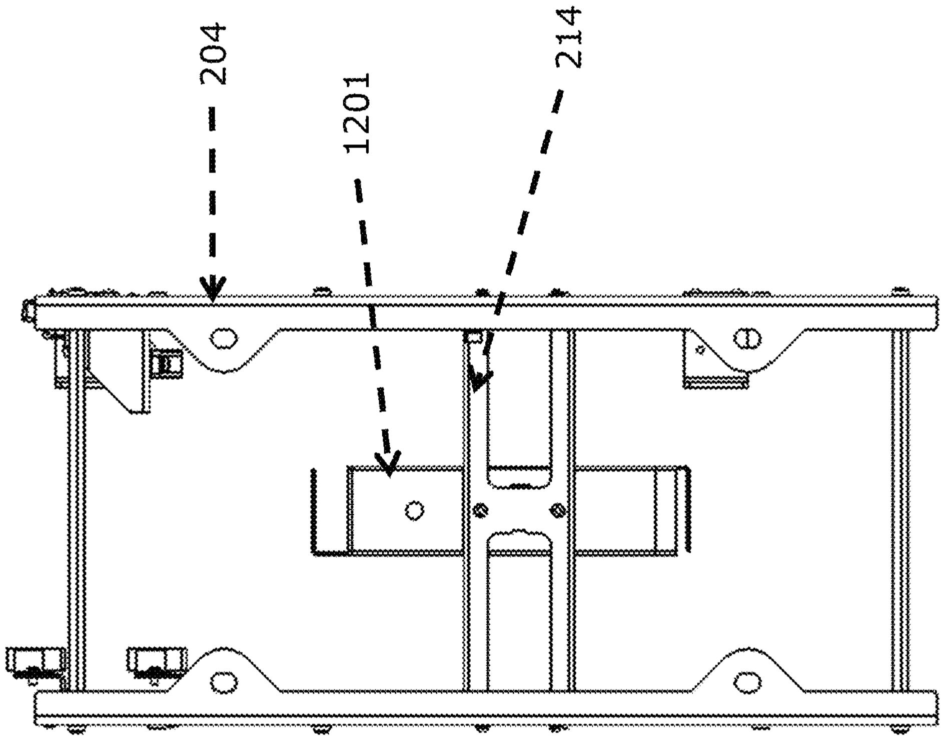
FIG. 16B illustrates top view of a frame of a lock-safe apparatus in accordance with various embodiments of the present disclosure.
Figure 16A:
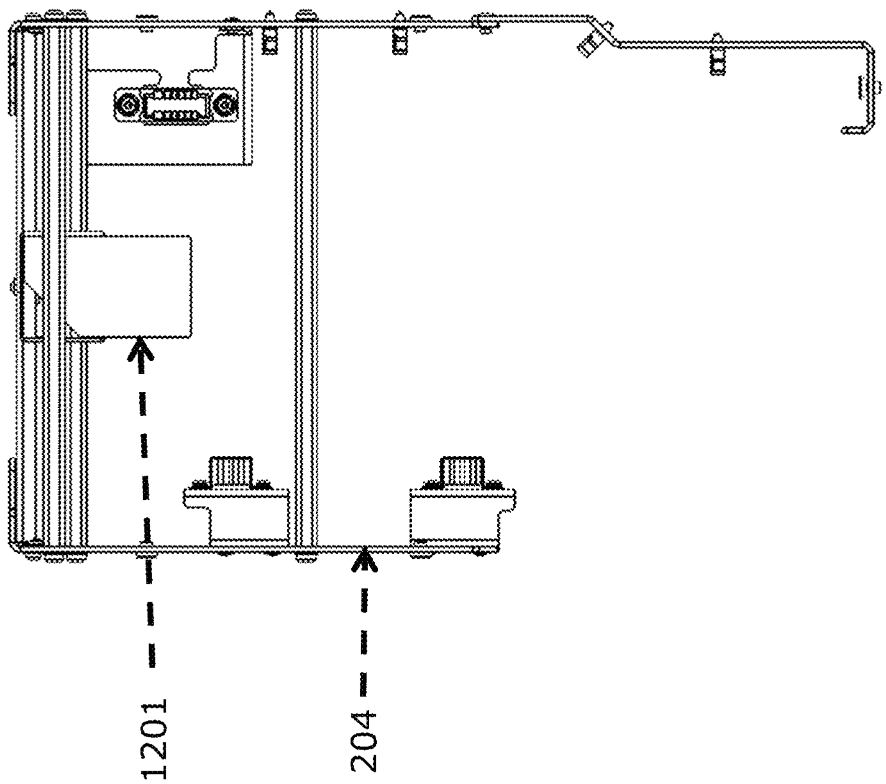
FIG. 16A illustrate front view of a frame of a lock-safe apparatus in accordance with various embodiments of the present disclosure.

FIGS. 16A and 16B illustrate front and top views of the frame 204 shown in FIGS. 1A-1B respectively. FIGS. 16A and 16B show baffle 1201 and support 214 mounted on frame 204. The sensor 212 is hidden underneath support 214 and covered by baffle 1201.

Figure 17B:
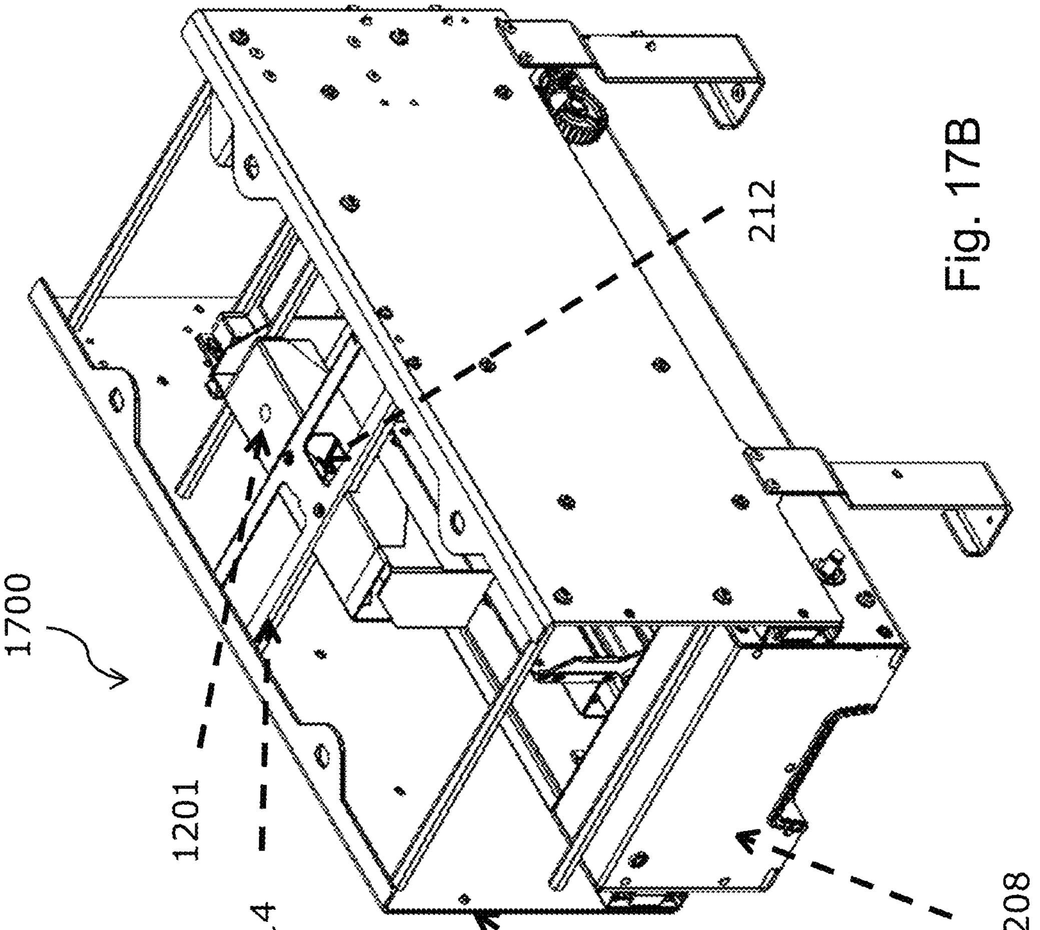
FIG. 17B illustrates an example of a perspective view of a lock-safe apparatus showing an internal structure in accordance with various embodiments of the present disclosure.
Figure 17A:
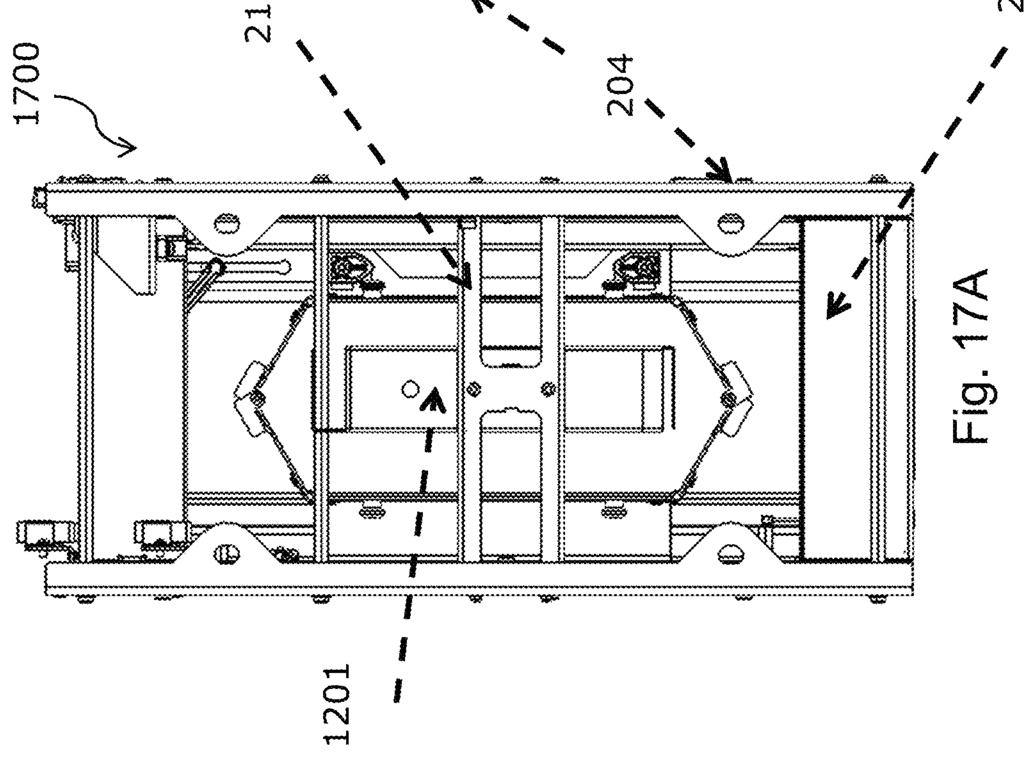
FIG. 17A illustrates an example of a top view of a lock-safe apparatus showing an internal structure in accordance with various embodiments of the present disclosure.

FIGS. 17A and 17B illustrate an example of a perspective view of a lock-safe apparatus 1700 showing an internal structure in accordance with various embodiments of the present disclosure. The internal structure of the lock-safe apparatus 170 can be a part of the lock-safe apparatus 100 illustrated in FIGS. 1A and 1B. In addition to the locking mechanism (not shown), the safe 102 (FIGS. 1A and 1B) also includes a banknote transport and turn-around mechanism 203, frame 204 to support an escrow module or storing unit 206 and a bag holding and sealing mechanism 208 that supports cashbag 202. A multipurpose cashbag level and banknote presence in escrow detector 212 is mounted on a support 214 mounted on frame 204 looking down into the temporary storage of the escrow module 206. Banknotes coming into escrow module 206 are freely stacked into a banknote stack 210. The banknote stack 210 is then dropped into the cashbag 202. A protective baffle 1201 is placed below the support 214 and covers the sensor 212, between the sensor 212 and escrow module 206, to protect sensor 212 against curled up banknotes. The baffle 1201 may include a number of bars connected between two rods, such that there is open space between each of the bars, allowing the sensor 212 to still detect the presence of the banknotes or the cashbag even though the baffle 1201 is positioned between the sensor 212 and the escrow module 206. In other embodiments, baffle 1201 may comprise a mesh or grid allowing viewing area for sensor 212. In other embodiments, baffle 1201 may comprise a plate with either a hole or transparent section allowing viewing area for sensor 212.

Figure 18B:
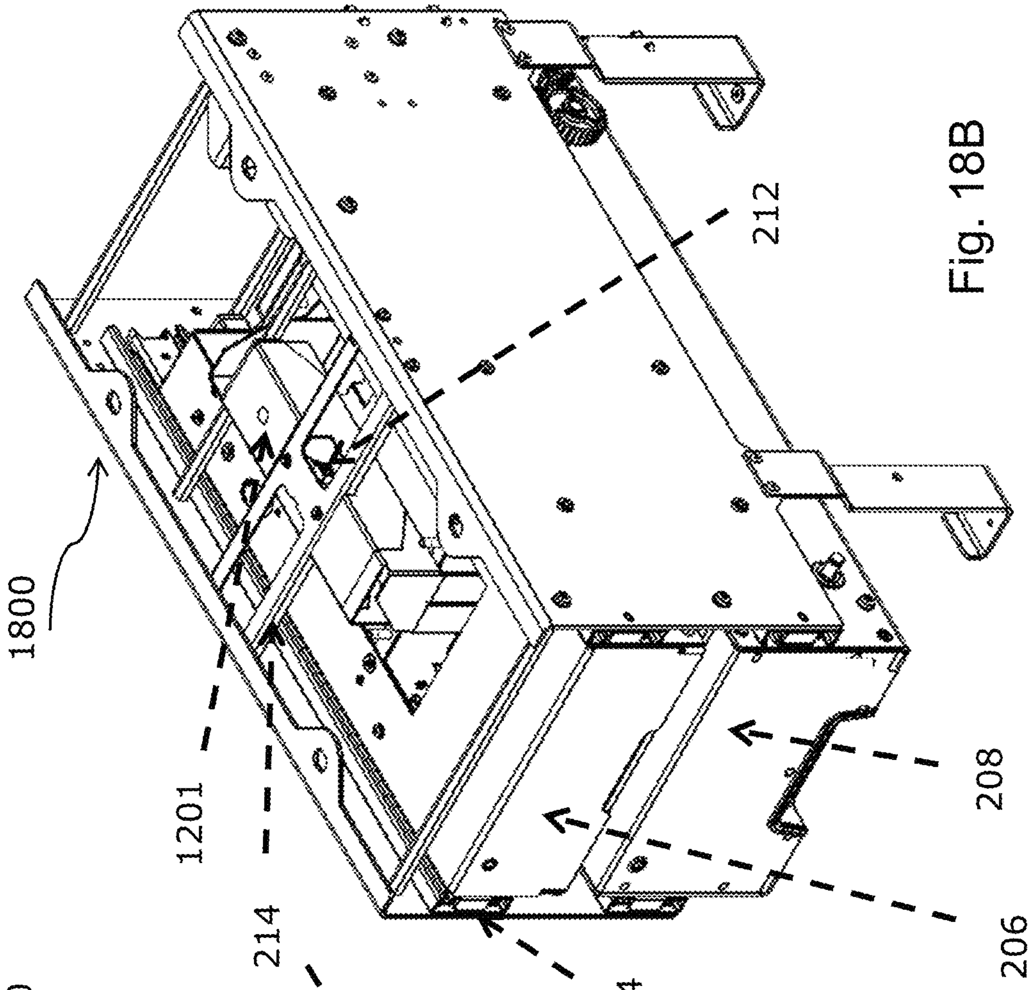
FIG. 18B illustrates an example of a perspective view of a lock-safe apparatus showing an internal structure in accordance with various embodiments of the present disclosure.
Figure 18A:
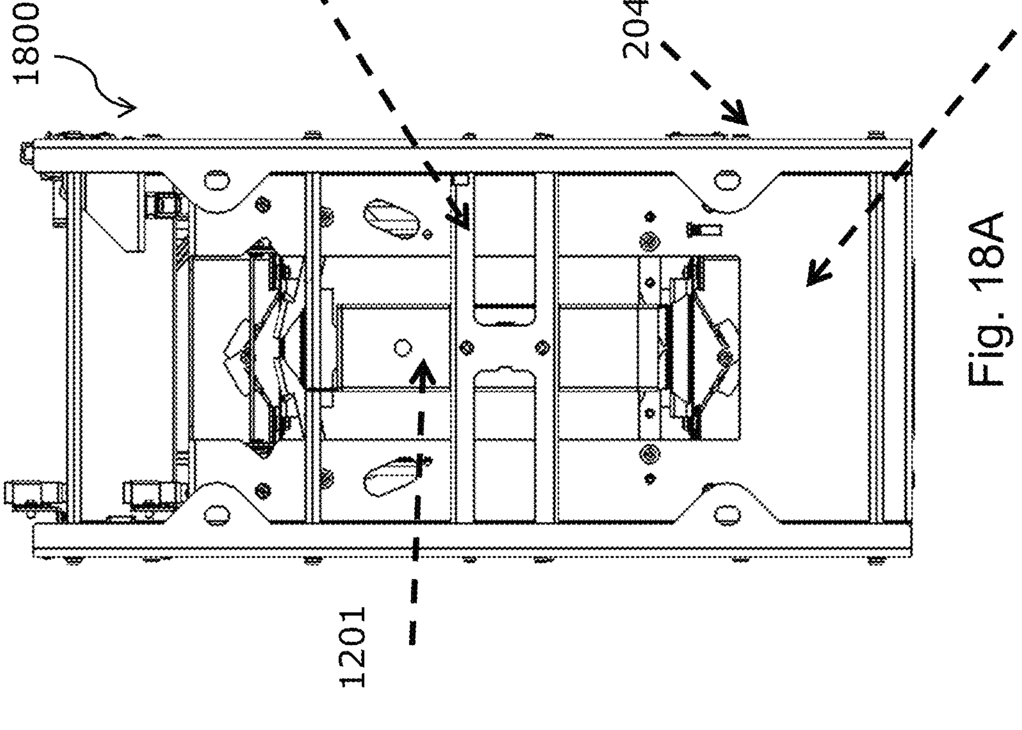
FIG. 18A illustrates an example of a top view of a lock-safe apparatus showing an internal structure in accordance with various embodiments of the present disclosure.

FIGS. 18A and 18B illustrate an example of a perspective view of a lock-safe apparatus 1800 showing an internal structure in accordance with various embodiments of the present disclosure. The internal structure of the lock-safe apparatus 1800 can be a part of the lock-safe apparatus 100 illustrated in FIGS. 1A and 1B. In addition to the locking mechanism (not shown), the safe 102 (FIGS. 1A and 1B) also includes a banknote transport and turn-around mechanism 203, frame 204 to support an escrow module or storing unit 206 and a bag holding and sealing mechanism 208 that supports cashbag 202. A multipurpose cashbag level and banknote presence in escrow detector 212 is mounted on a support 214 mounted on frame 204 looking down into the temporary storage of the escrow module 206. Banknotes coming into escrow module 206 are freely stacked into a banknote stack 210. The banknote stack 210 is then dropped into the cashbag 202. A protective baffle 1201 is placed below the support 214 and covers the sensor 212, between the sensor 212 and escrow module 206, to protect sensor 212 against curled up banknotes. The baffle 1201 may include a number of bars connected between two rods, such that there is open space between each of the bars, allowing the sensor 212 to still detect the presence of the banknotes or the cashbag even though the baffle 1201 is positioned between the sensor 212 and the escrow module 206. In other embodiments, baffle 1201 may comprise a mesh or grid allowing viewing area for sensor 212. In other embodiments, baffle 1201 may comprise a plate with either a hole or transparent section allowing viewing area for sensor 212.

Figure 19A:
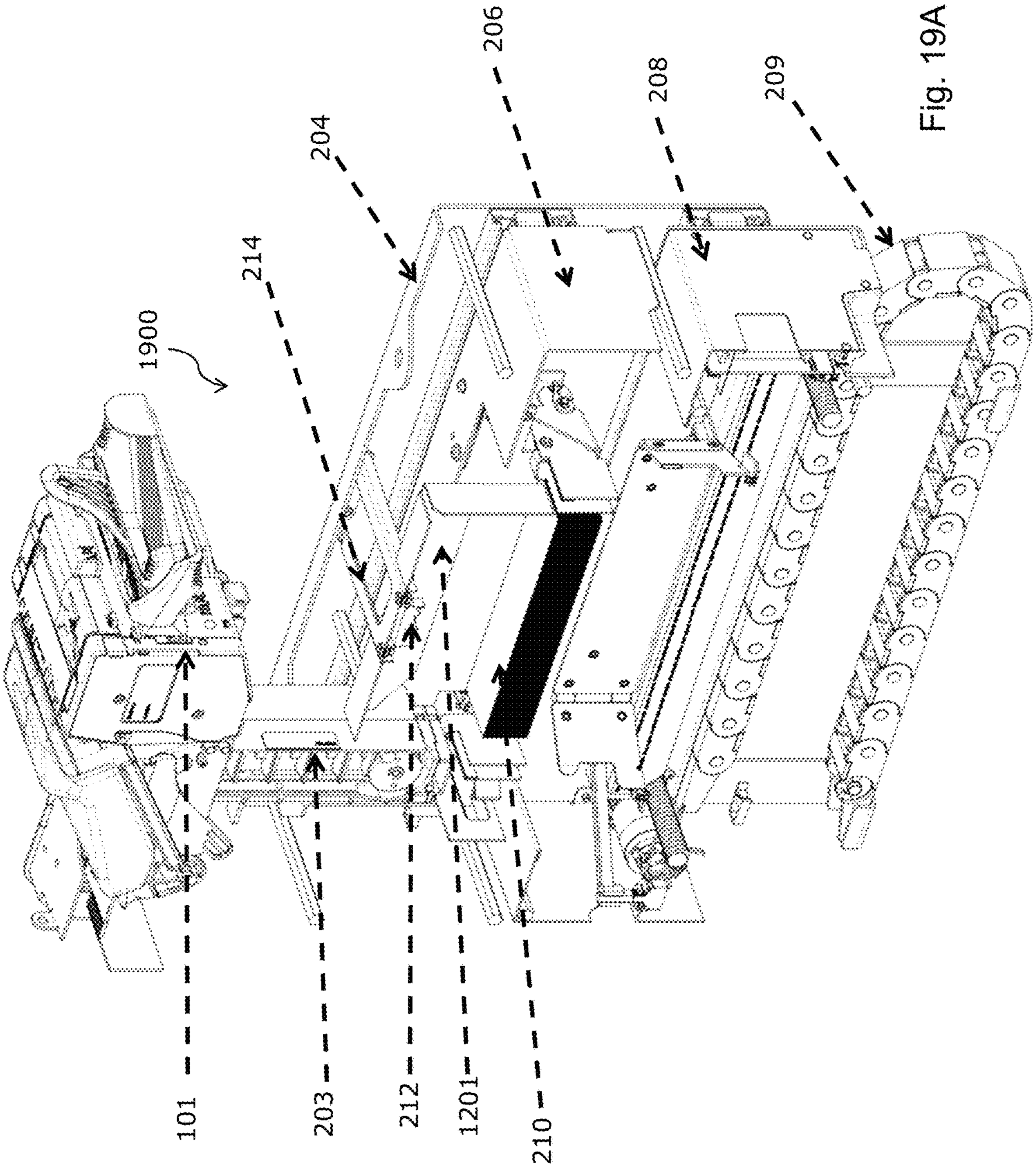
FIG. 19A illustrates an example of a cross-section prospective view of a lock-safe apparatus showing an internal structure in accordance with various embodiments of the present disclosure.
Figure 19B:
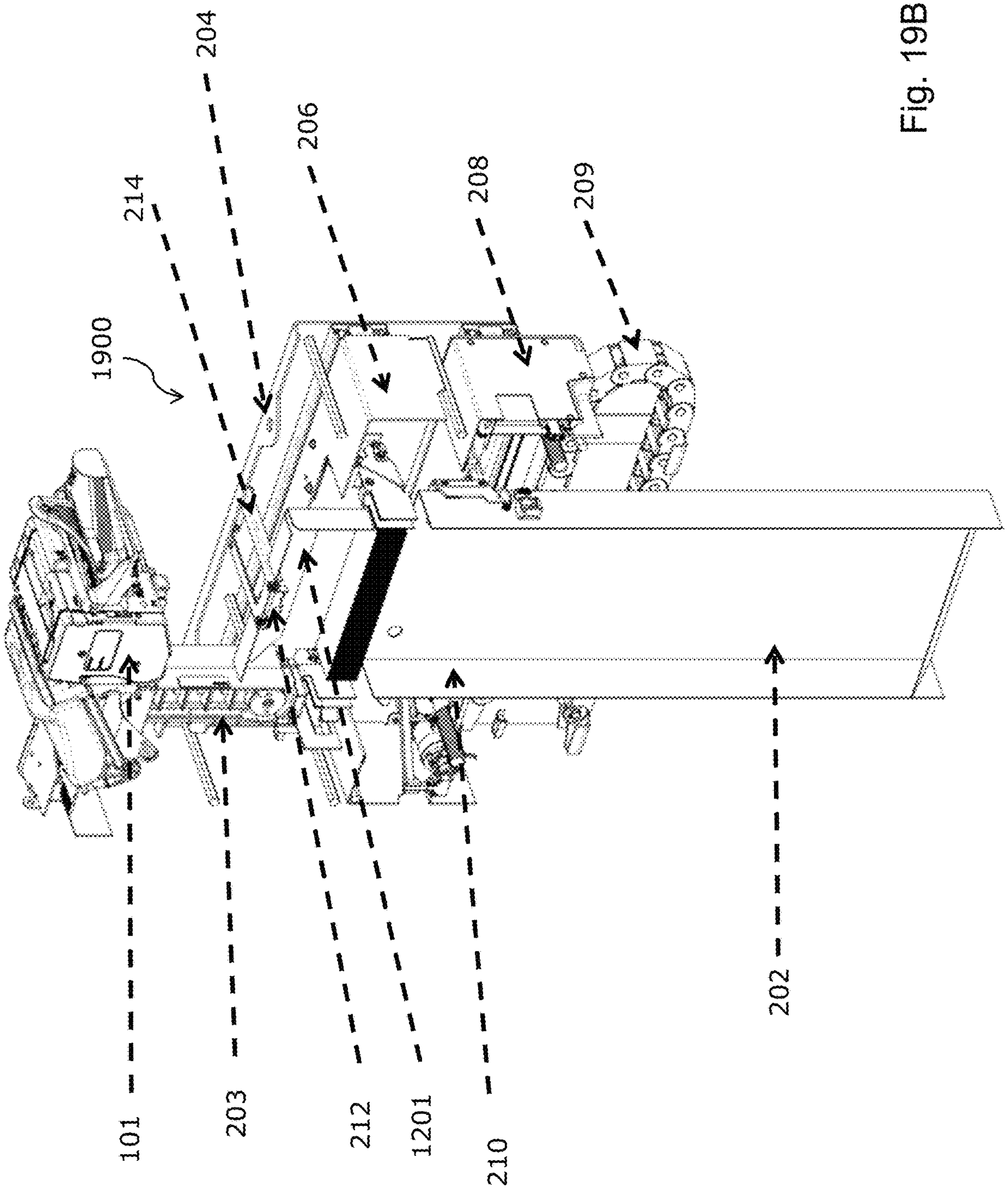
FIG. 19B illustrates an example of a cross-section prospective view of a lock-safe apparatus showing an internal structure in accordance with various embodiments of the present disclosure.
Figure 19C:
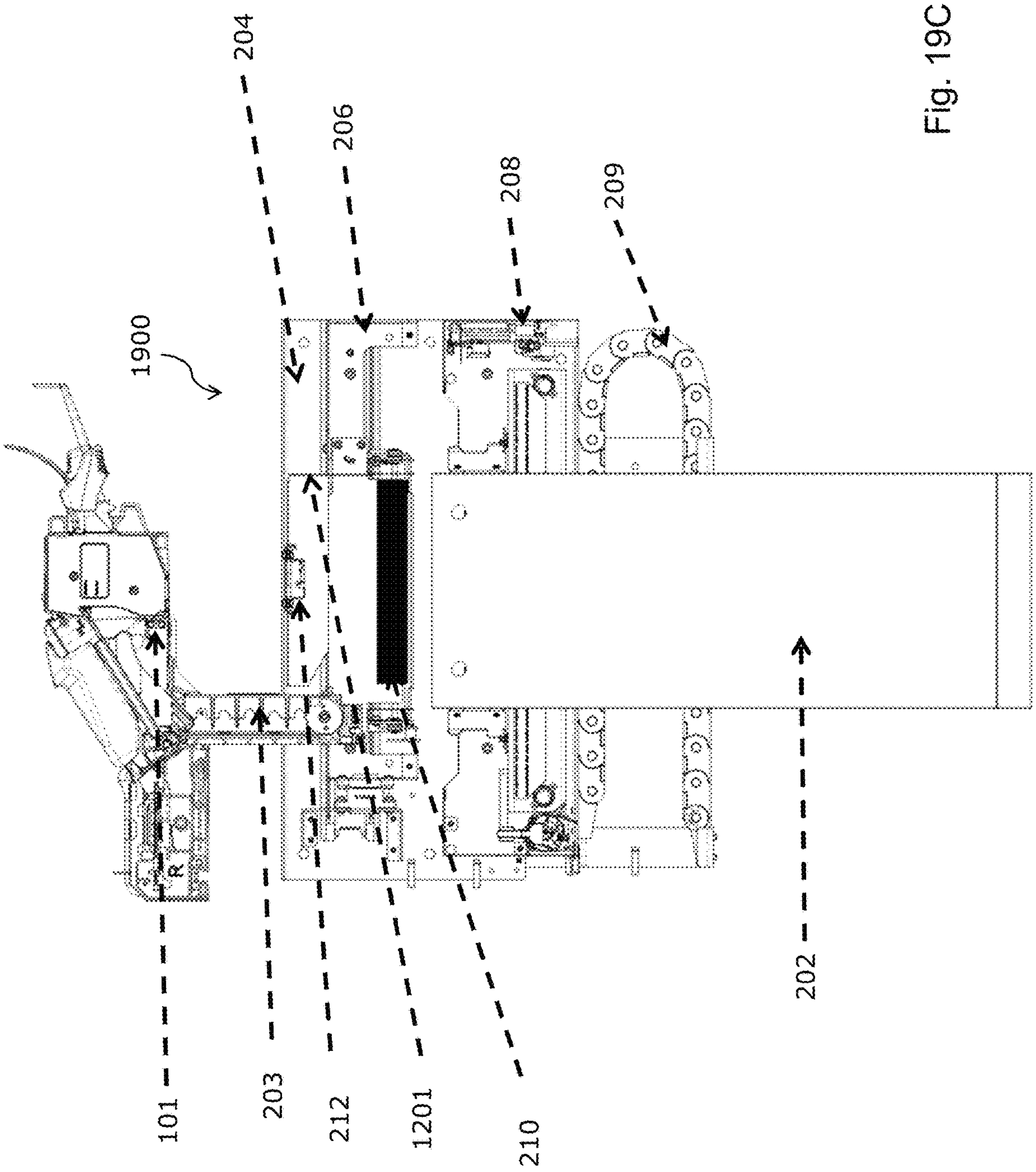
FIG. 19C illustrates an example of a side cross-section view of a lock-safe apparatus showing an internal structure in accordance with various embodiments of the present disclosure.
Figure 19D:
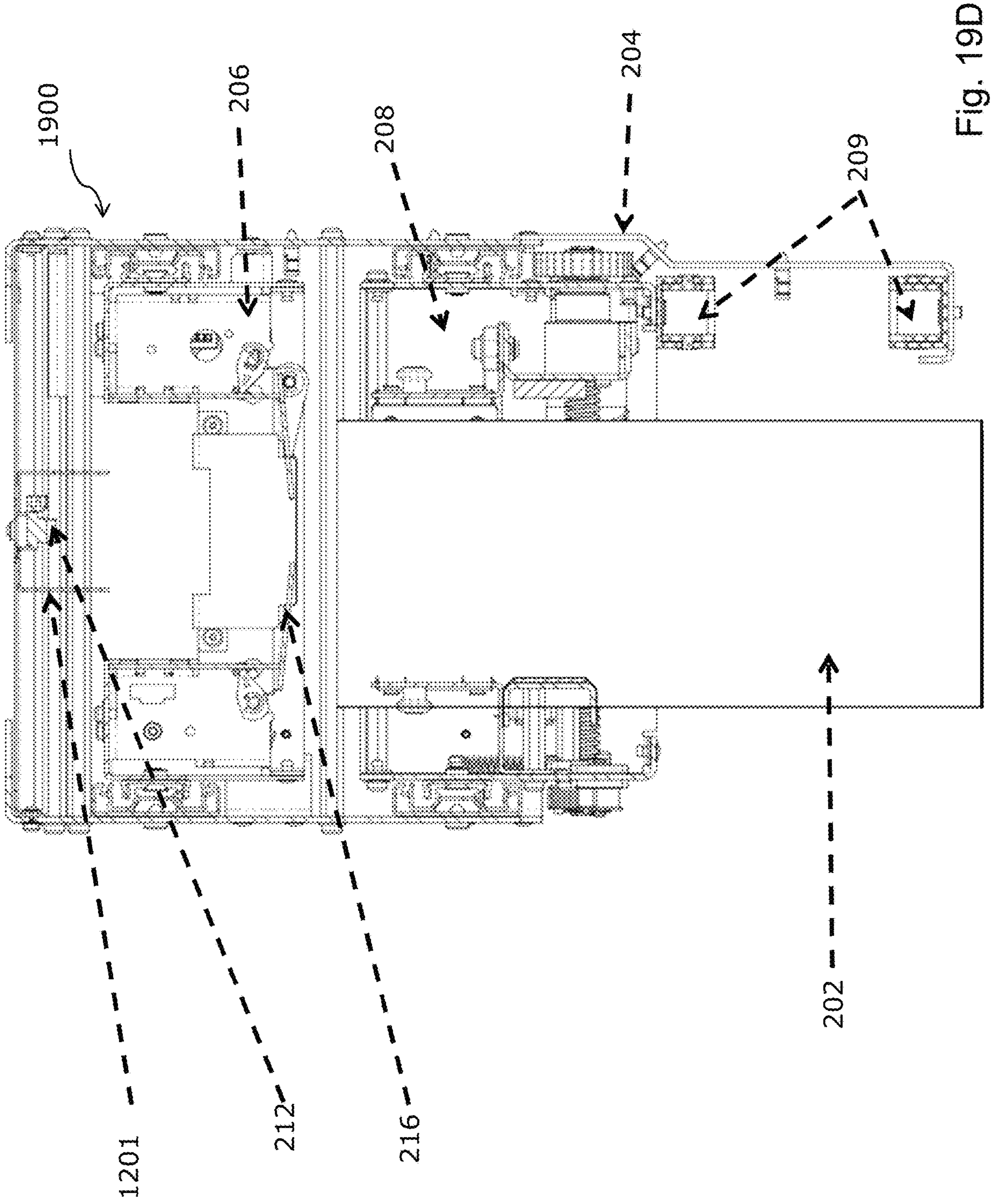
FIG. 19D illustrates an example of a front cross-section view of a lock-safe apparatus showing an internal structure in accordance with various embodiments of the present disclosure.

FIGS. 19A-19D illustrate various views of an embodiment of a lock-safe apparatus 1900 showing an internal structure. The internal structure of the lock-safe apparatus 1900 can be a part of the lock-safe apparatus 100 illustrated in FIGS. 1A and 1B. FIG. 19A illustrates an example of a perspective cross-section view of the lock-safe apparatus 1900 showing an internal structure in accordance with various embodiments of the present disclosure, FIG. 19B illustrates a perspective view of the lock-safe apparatus 1900 showing an internal structure in accordance with various embodiments of the present disclosure. FIG. 19C illustrates a side cross-section view of the lock-safe apparatus 1900 showing an internal structure in accordance with various embodiments of the present disclosure. FIG. 19D illustrates a front cross-section view of the lock-safe apparatus 1900 showing an internal structure in accordance with various embodiments of the present disclosure.

FIGS. 19A and 19B illustrate an example of a perspective cross-section view of a lock-safe apparatus 1900 showing an internal structure in accordance with various embodiments of the present disclosure; FIGS. 19C and 19D illustrate an example of a side and front cross-section views of a lock-safe apparatus 1900 showing an internal structure in accordance with various embodiments of the present disclosure. The internal structure of the lock-safe apparatus 1900 can be a part of the lock-safe apparatus 100 illustrated in FIGS. 1A and 1B. In addition to the locking mechanism (not shown), the safe 102 (FIGS. 1A and 1B) also includes a banknote transport and turn-around mechanism 203, frame 204 to support an escrow module or storing unit 206 and a bag holding and sealing mechanism 208 that supports cashbag 202. A multipurpose cashbag level and banknote presence in escrow detector 212 (not shown) is mounted on a support 214 mounted on frame 204 looking down into the temporary storage of the escrow module 206. Banknotes coming into escrow module 206 are freely stacked into a banknote stack 210. The banknote stack 210 is then dropped into the cashbag 202. A protective baffle 1201 is placed below the support 214 and covers the sensor 212, between the sensor 212 and escrow module 206, to protect sensor 212 against curled up banknotes. The baffle 1201 may include a number of bars connected between two rods, such that there is open space between each of the bars, allowing the sensor 212 to still detect the presence of the banknotes or the cashbag even though the baffle 1201 is positioned between the sensor 212 and the escrow module 206. In other embodiments, baffle 1201 may comprise a mesh or grid allowing viewing area for sensor 212. In other embodiments, baffle 1201 may comprise a plate with either a hole or transparent section allowing viewing area for sensor 212.

As shown in FIGS. 8A and 8B the sensor 212 in this embodiment shown in FIGS. 12A-19D detects if the cashbag 202 is mounted properly if an initial signal from the sensor after mounting of cashbag 202 deviates significantly from 801. During operation of the lock-safe 100, more banknotes are deposited to banknote acceptor 101 and are accumulated in cashbag 202 and signals 804 move from approaching 801 (empty cashbag 202) towards approaching signal 810. The distance indicated by signal 804 indicates how much the cashbag 202 is full at any point when the lock-safe apparatus 100 or 1300 is operational. As signals 804 move towards signal 810, the cashbag 202 is nearly full and the sealing mechanism can be activated.

Figure 20A:
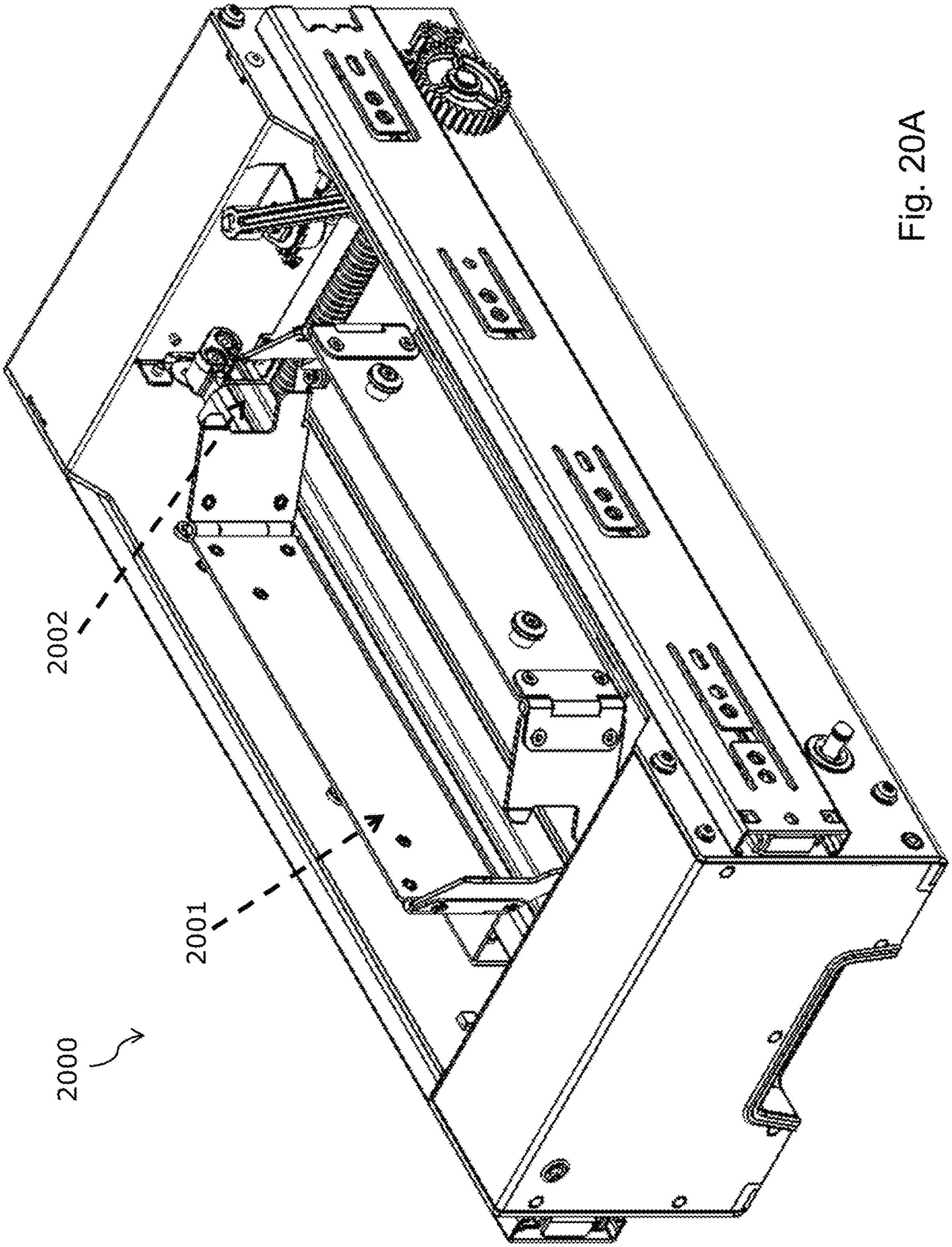
FIG. 20A illustrates an example of a perspective view of a sealing and holding mechanism in accordance with various embodiments of the present disclosure.
Figure 20B:
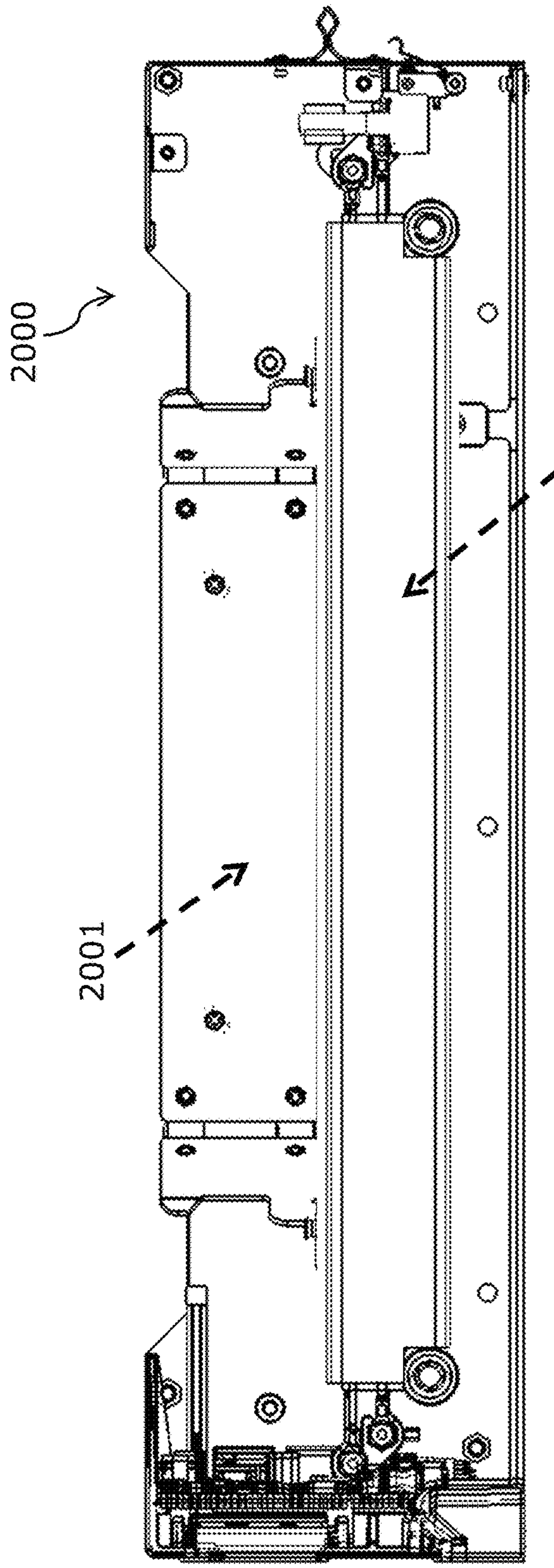
FIG. 20B illustrates an example of a cross-section view of a sealing and holding mechanism in accordance with various embodiments of the present disclosure.
Figure 20C:
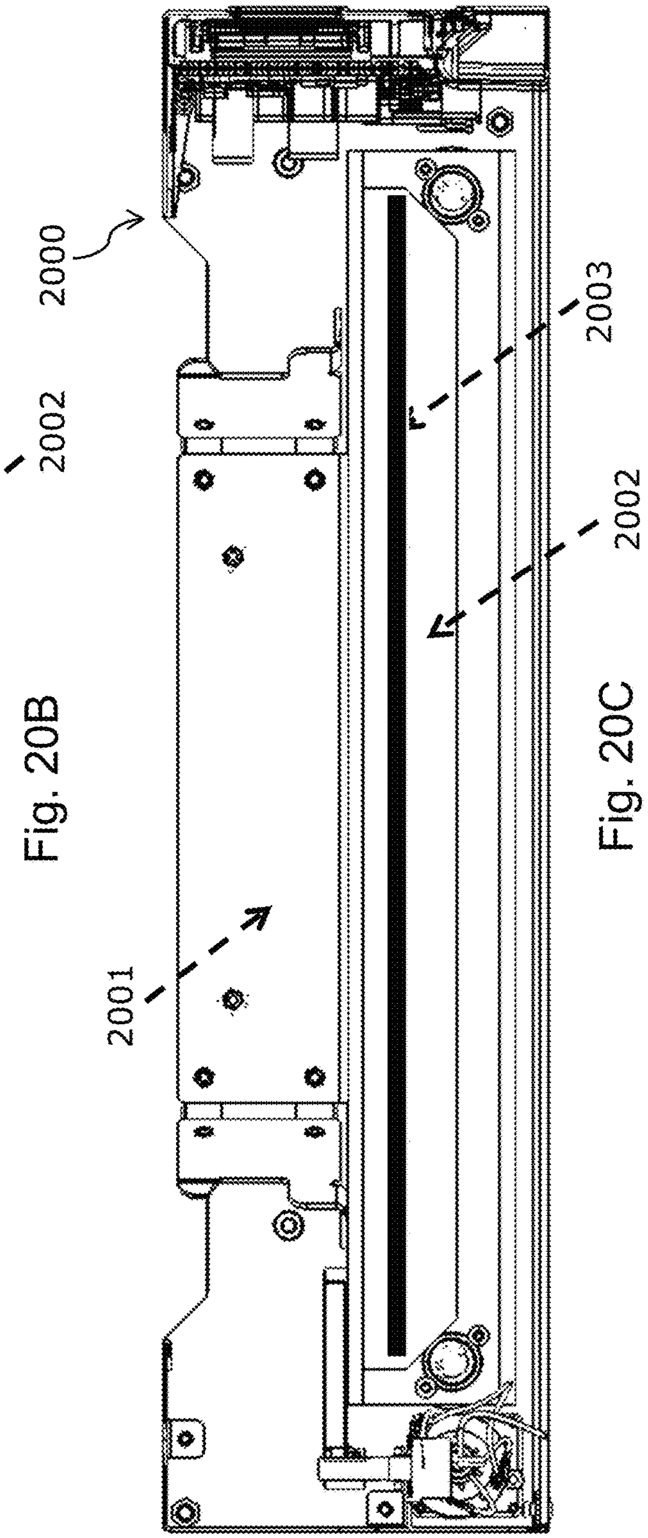
FIG. 20C illustrates an example of a cross-section view of a sealing and holding mechanism in accordance with various embodiments of the present disclosure.

FIGS. 20A-20C illustrate various views of an example of a sealing unit or sealing and holding mechanism 2000 in accordance with various embodiments of the present disclosure. FIG. 20A illustrates an example of a perspective view of a sealing and holding mechanism 2000. FIG. 20B illustrates a cross section view of a side of the sealing and holding mechanism 2000. FIG. 20C illustrates a cross section view of another side of the sealing and holding mechanism 2000. Bag sealing and holding mechanisms can come in a wide variety of configurations, and FIGS. 20A-20C do not limit the scope of this disclosure to any particular implementation of a bag sealing and holding mechanism. The bag sealing and holding mechanism can be used in the lock-safe apparatus 100 disclosed herein, and can be the bag sealing and holding mechanism 309. The sealing and holding mechanism 2000 includes a bag holding sections 2001 and sealing mechanism 2002. The sealing mechanism 2002 includes a heating element 2003. The heating element 2003 is activated upon receipt of a heating command and heat seals a bag that is being held by bag holding sections 2001.

Figure 21A:
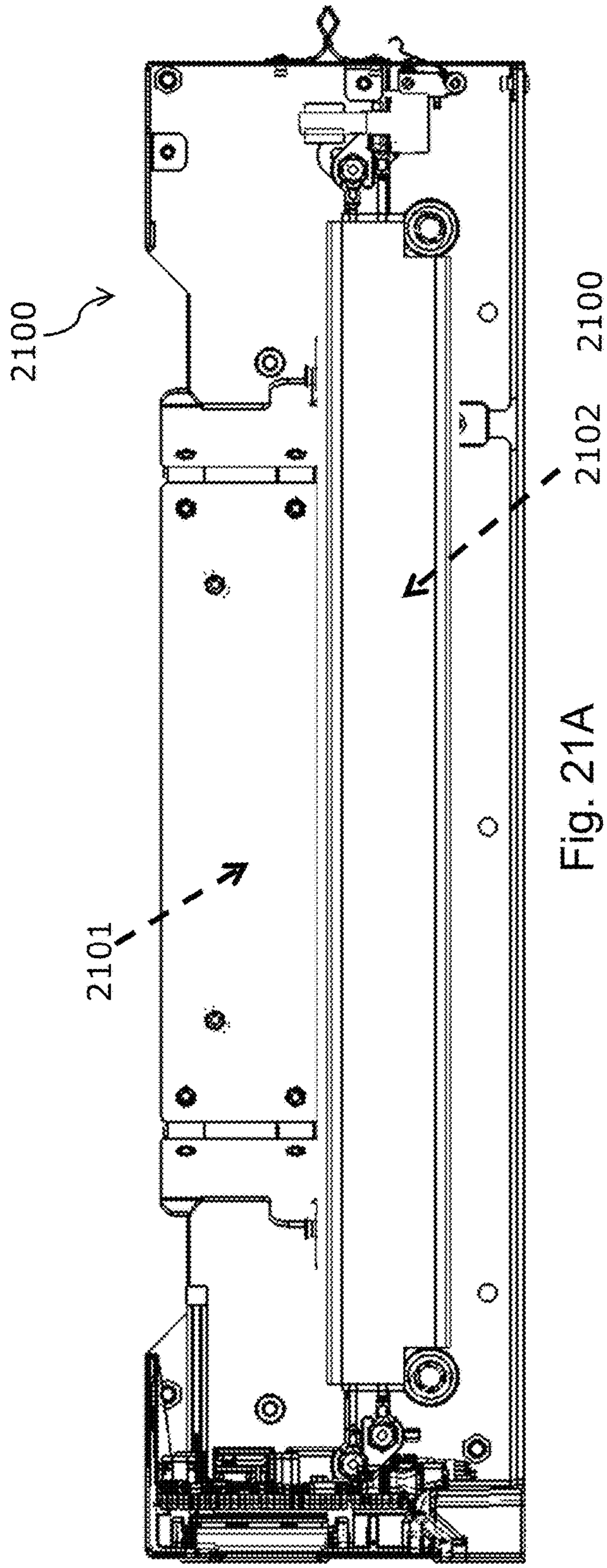
FIG. 21A illustrates an example of a cross-section view of a sealing and holding mechanism in accordance with various embodiments of the present disclosure.
Figure 21B:
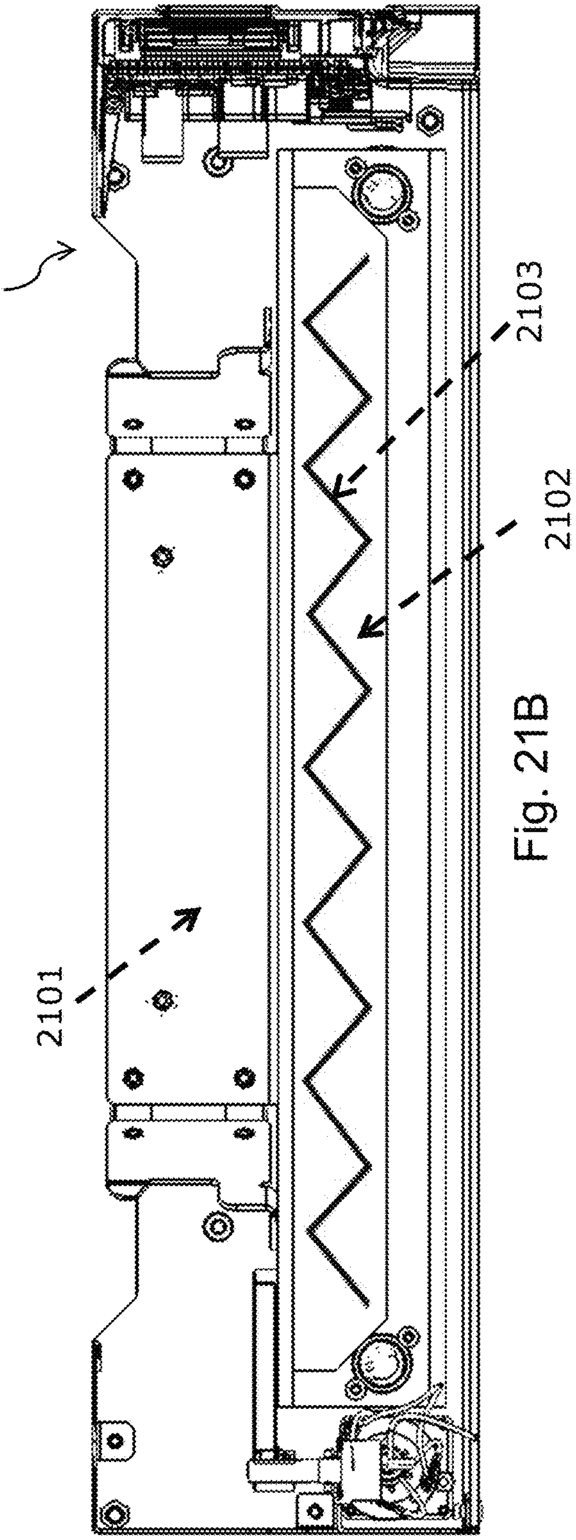
FIG. 21B illustrates an example of a cross-section view of a sealing and holding mechanism in accordance with various embodiments of the present disclosure.

FIG. 21A illustrates an example cross-section view of side of a sealing unit or sealing and holding mechanism 2100 in accordance with various embodiments of the present disclosure. FIG. 21B illustrate an example cross-section view of another side of a sealing and holding mechanism 2100 in accordance with various embodiments of the present disclosure. Bag sealing and holding mechanisms can come in a wide variety of configurations, and FIGS. 21A and 21B do not limit the scope of this disclosure to any particular implementation of a bag sealing and holding mechanism. A sealing mechanism 2102 in one side of the sealing and holding mechanism 2100 shown in FIG. 21A. The other side shown in FIG. 21B includes a heating element 2103. The heating element 2103 is activated upon receipt of heating command and heat seals a bag that is being held by a bag holding sections 2101. The non-linear heating element 2103 shown in FIG. 21B can assist in providing additional complexity in a sealing system by use of nonlinear heating element. This nonlinear heating element provides additional security to the sealing of the cashbag, thereby providing an additional tamper evident feature to the sealed cashbag. In other embodiments, the sealing mechanism 2002 may only include pressing member that mate with another pressing member and the cashbag 202 may include glue or adhesive coated section. The glue or adhesive coated sections come in contact during sealing operation and seal the cashbag after two pressing elements of the sealing mechanism 2002 press them against each other. In some embodiments, glue or adhesive coating may be applied to only one side of the bag.

Figure 22A:
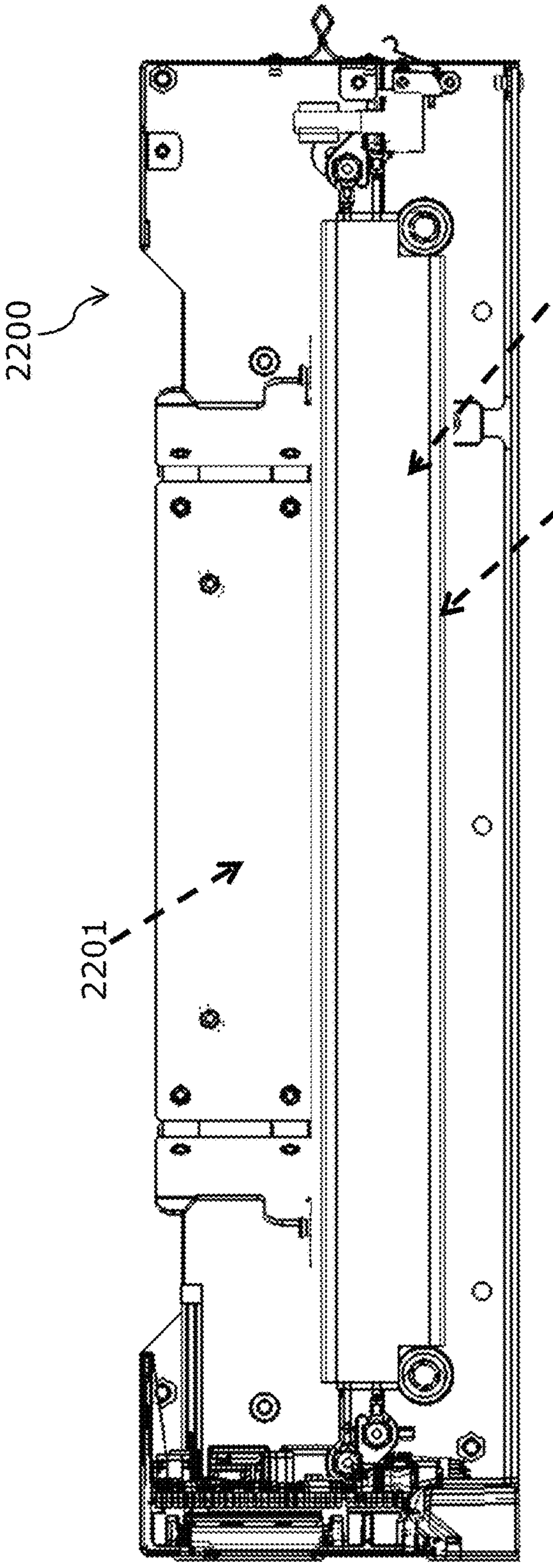
FIG. 22A illustrates an example of a cross-section view of a sealing and holding mechanism in accordance with various embodiments of the present disclosure.
Figure 22B:
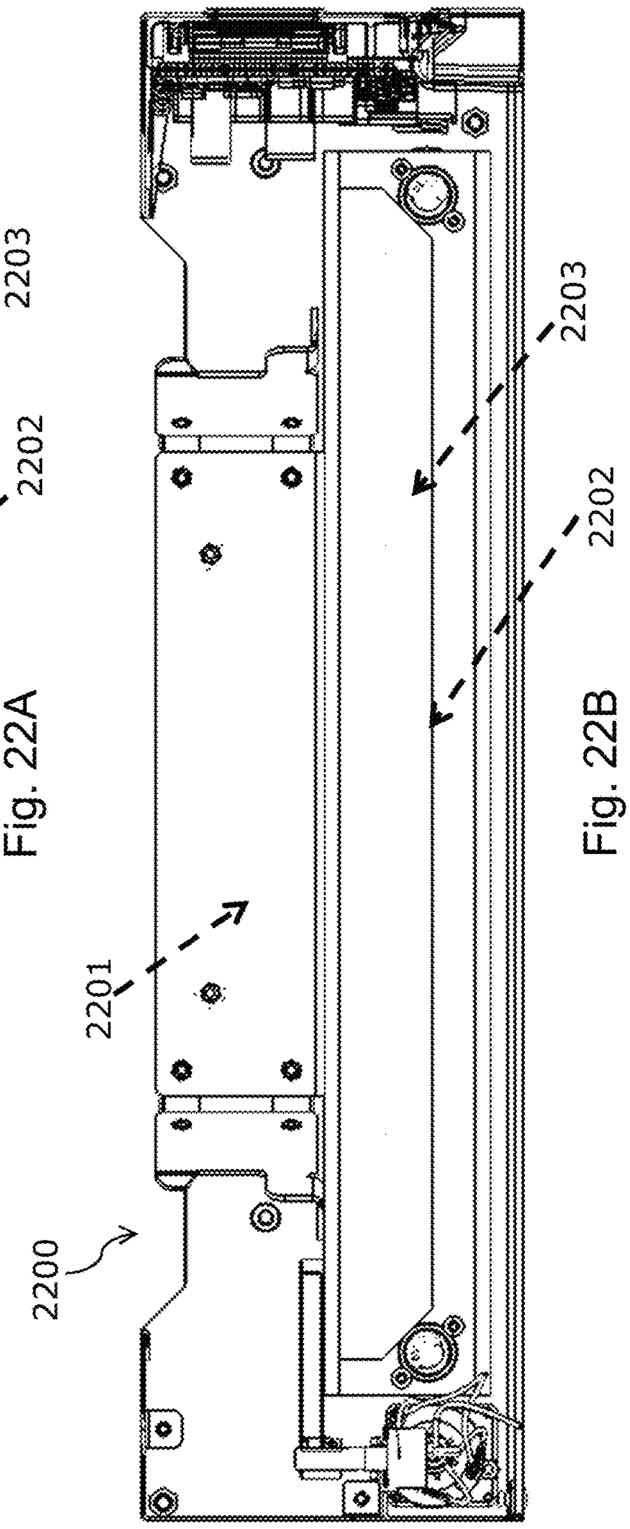
FIG. 22B illustrates an example of a cross-section view of a sealing and holding mechanism in accordance with various embodiments of the present disclosure.

FIG. 22A illustrates an example cross-section view of side of a sealing unit or sealing and holding mechanism 2200 in accordance with various embodiments of the present disclosure. FIG. 22B illustrates an example cross-section view of another side of a sealing and holding mechanism 2200 in accordance with various embodiments of the present disclosure. Bag sealing and holding mechanisms can come in a wide variety of configurations, and FIGS. 22A and 22B do not limit the scope of this disclosure to any particular implementation of a bag sealing and holding mechanism. The sealing mechanisms 2202 include a heating element 2203. The heating element 2203 is activated upon receipt of heating command and heat seals a bag that is being held by bag holding sections 2201. The non-linear heating elements 2203 on each side of the sealing mechanisms 2202 of the sealing and holding mechanism 2200 can assist in providing additional complexity in a sealing system by use of nonlinear heating elements. This nonlinear heating elements provide additional security to the sealing of the cashbag, thereby providing an additional tamper evident feature to the sealed cashbag.

In some embodiments, a first sealing mechanism 2202 disposed on one side of the cashbag has a heating element 2203 that includes a shape, letters, or other designs (such as shown with respect to heating element 2103 in FIG. 21B) raised from the surface of the first sealing mechanism 2202. A second sealing mechanism 2202 disposed on the opposite side of the cashbag from the first sealing mechanism 2202 includes a heating element 2203 with one or more recessed portions that match the shapes, letters, or other designs of the heating element 2203 on the first sealing mechanism 2202. When the first sealing mechanism and the second sealing mechanism come into contact, the raised portion of the first sealing mechanism engaged and fits within the recessed portion of the second sealing mechanism, heat sealing the bag in a nonlinear fashion.

One example embodiment can include a banknote transport mechanism operable to transport a banknote to a storing unit, the storing unit operable to store the banknote transported to the storing unit, wherein the storing unit includes a banknote storing bag to store the banknote, the banknote storing bag detachably coupled to the storing unit, and an escrow plate provided above the banknote storing bag operable to escrow the banknote before the banknote transported to the storing unit is stored in the banknote storing bag, wherein the escrow plate is operable to move from a horizontally extending hold position to a release position, and wherein the banknote transported to the storing unit is escrowed on the escrow plate when the escrow plate is located at the hold position, and a sensor configured to detect a presence of the banknote on the escrow plate, and measure a level of banknotes in the banknote storing bag.

Another example embodiment can include a banknote transport mechanism operable to transport a banknote to a storing unit, the storing unit operable to store the banknote transported to the storing unit, wherein the storing unit includes a banknote storing bag to store the banknote, the banknote storing bag detachably coupled to the storing unit, and an escrow plate provided above the banknote storing bag operable to escrow the banknote before the banknote transported to the storing unit is stored in the banknote storing bag, wherein the escrow plate is operable to move from a horizontally extending hold position to a release position, and wherein the banknote transported to the storing unit is escrowed on the escrow plate when the escrow plate is located at the hold position, and a sensor configured to measure a height of a banknote stack on the escrow plate, and measure a level of banknotes in the banknote storing bag.

Another example embodiment can include a banknote transport mechanism operable to transport a banknote to a storing unit, the storing unit operable to store the banknote transported to the storing unit, wherein the storing unit includes a banknote storing bag to store the banknote, the banknote storing bag detachably coupled to the storing unit, and an escrow plate provided above the banknote storing bag operable to escrow the banknote before the banknote transported to the storing unit is stored in the banknote storing bag, wherein the escrow plate is operable to move from a horizontally extending hold position to a release position, and wherein the banknote transported to the storing unit is escrowed on the escrow plate when the escrow plate is located at the hold position, and a sensor configured to detect a presence of the banknote on the escrow plate, and detect a presence of the banknote storing bag.

Another example embodiment can include a banknote transport mechanism operable to transport a banknote to a storing unit, the storing unit operable to store the banknote transported to the storing unit, wherein the storing unit includes a banknote storing bag to store the banknote, the banknote storing bag detachably coupled to the storing unit, and an escrow plate provided above the banknote storing bag operable to escrow the banknote before the banknote transported to the storing unit is stored in the banknote storing bag, wherein the escrow plate is operable to move from a horizontally extending hold position to a release position, and wherein the banknote transported to the storing unit is escrowed on the escrow plate when the escrow plate is located at the hold position, and a sensor configured to measure a height of a banknote stack on the escrow plate, and detect a presence of the banknote storing bag.

Another example embodiment can include a banknote transport mechanism operable to transport a banknote to a storing unit, the storing unit operable to store the banknote transported to the storing unit, wherein the storing unit includes a banknote storing bag to store the banknote, the banknote storing bag detachably coupled to the storing unit, and a sensor configured to detect a presence of the banknote storing bag, and measure a level of banknotes in the banknote storing bag.

In one or more of the above examples, the sensor is located on a top portion of the storing unit and faces down towards the escrow plate.

In one or more of the above examples, the escrow plate includes a through hole at a position allowing the sensor to look into the banknote storing bag.

In one or more of the above examples, the escrow plate includes a transparent section allowing the sensor to look into the banknote storing bag.

In one or more of the above examples, the escrow plate is transparent to allow the sensor to look into the banknote storing bag.

In one or more of the above examples, the escrow plate is pivoted on a shaft, the escrow plate operable to turn about the shaft from a horizontally extending hold position to a downwardly or obliquely downwardly extending release position.

In one or more of the above examples, the storing unit includes multiple escrow plates, each escrow plate operable to turn about a shaft from a horizontally extending hold position to a downwardly or obliquely downwardly extending release position, and wherein the banknote transported to the storing unit is escrowed on the escrow plates when the escrow plates are located at the hold position.

In one or more of the above examples, the sensor transmits a signal confirming an arrival of the banknote to the storing unit.

In one or more of the above examples, the sensor is protected by a baffle structure.

In one or more of the above examples, the sensor is protected by a mesh structure.

In one or more of the above examples, the sensor is protected by a protective cover.

In one or more of the above examples, the sensor sends a signal to initiate movement of the escrow plate.

In one or more of the above examples, the sensor initiates movement of the escrow plate.

In one or more of the above examples, the sensor sends a signal to indicate improper installation of the banknote storing bag.

In one or more of the above examples, the sensor sends a signal to indicate an absence of the banknote storing bag.

In one or more of the above examples, the sensor is configured to detect banknotes stuck in the banknote storing bag.

In one or more of the above examples, the sensor is configured to measure a sealing of the banknote storing bag.

In one or more of the above examples, the storing unit includes a heating element that is configured to provide a nonlinear sealing of the banknote storing bag.

Another example embodiment can include a banknote transport mechanism operable to transport a banknote to a storing unit, the storing unit operable to store the banknote transported to the storing unit, wherein the storing unit includes a banknote storing bag to store the banknote, the banknote storing bag detachably coupled to the storing unit; and a sensing means for measuring a level of banknotes in the banknote storing bag, and for detecting a presence of the banknote storing bag.

In one or more of the above examples, an escrow plate provided above the banknote storing bag operable to escrow the banknote before the banknote transported to the storing unit is stored in the banknote storing bag; wherein the escrow plate comprises a means to retain the escrowed banknote in a holding position and to move the escrow plate into a release position to drop the banknote into the banknote storing bag; and a sensing means for detecting a presence of the escrowed banknote on the escrow plate, and for measuring a height of a banknote stack on the escrow plate.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A cashbag sealing system comprising:

a banknote transport mechanism;

a storing unit, wherein the banknote transport mechanism is operable to transport a banknote to the storing unit, wherein the storing unit is operable to store the banknote transported to the storing unit, and wherein the storing unit includes:

a banknote storing bag to store the banknote, the banknote storing bag detachably coupled to the storing unit; and an escrow plate provided above the banknote storing bag operable to escrow the banknote before the banknote transported to the storing unit is stored in the banknote storing bag, wherein the escrow plate is operable to move from a horizontally extending hold position to a release position, and wherein the banknote transported to the storing unit is escrowed on the escrow plate when the escrow plate is located at the horizontally extending hold position; and a sensor configured to:

measure a height of a banknote stack on the escrow plate; and measure a level of banknotes in the banknote storing bag, wherein the sensor is located on a top portion of the storing unit and faces down towards the escrow plate, and wherein the escrow plate is arranged to allow the sensor to view into the banknote storing bag.

2. The cashbag sealing system of claim 1, wherein the escrow plate either (i) includes a through hole or (ii) is transparent or partially transparent, allowing the sensor to view into the banknote storing bag.

3. The cashbag sealing system of claim 1, wherein the escrow plate is pivoted on a shaft, the escrow plate operable to turn about the shaft from the horizontally extending hold position to the release position, wherein the release position is a downwardly or obliquely downwardly extending release position.

4. The cashbag sealing system of claim 3, wherein the storing unit includes multiple escrow plates, each escrow plate operable to turn about a shaft from the horizontally extending hold position to the downwardly or obliquely downwardly extending release position, and wherein the banknote transported to the storing unit is escrowed on the escrow plates when the escrow plates are located at the horizontally extending hold position.

5. The cashbag sealing system of claim 1, wherein the sensor transmits a signal confirming an arrival of the banknote to the storing unit, and wherein the sensor sends a signal to initiate movement of the escrow plate.

6. The cashbag sealing system of claim 1, wherein the sensor is protected by a protective cover.

7. The cashbag sealing system of claim 1, wherein the sensor is configured to detect banknotes stuck to a side of the banknote storing bag.

8. The cashbag sealing system of claim 1, wherein the storing unit includes a heating element, and wherein the heating element is configured to provide a nonlinear sealing of the banknote storing bag.

9. A cashbag sealing system comprising:

a banknote transport mechanism;

a storing unit, wherein the banknote transport mechanism is operable to transport a banknote to the storing unit, wherein the storing unit is operable to store the banknote transported to the storing unit, and wherein the storing unit includes:

a banknote storing bag to store the banknote, the banknote storing bag detachably coupled to the storing unit; and an escrow plate provided above the banknote storing bag operable to escrow the banknote before the banknote transported to the storing unit is stored in the banknote storing bag, wherein the escrow plate is operable to move from a horizontally extending hold position to a release position, and wherein the banknote transported to the storing unit is escrowed on the escrow plate when the escrow plate is located at the horizontally extending hold position; and a sensor configured to:

measure a height of a banknote stack on the escrow plate; and detect a presence of the banknote storing bag, wherein the sensor is located on a top portion of the storing unit and faces down towards the escrow plate, and wherein the escrow plate is arranged to allow the sensor to view into the banknote storing bag.

10. The cashbag sealing system of claim 9, wherein the escrow plate either (i) includes a through hole or (ii) is transparent or partially transparent, allowing the sensor to view into the banknote storing bag.

11. The cashbag sealing system of claim 9, wherein the escrow plate is pivoted on a shaft, the escrow plate operable to turn about the shaft from the horizontally extending hold position to the release position, wherein the release position is a downwardly or obliquely downwardly extending release position.

12. The cashbag sealing system of claim 11, wherein the storing unit includes multiple escrow plates, each escrow plate operable to turn about a shaft from the horizontally extending hold position to the downwardly or obliquely downwardly extending release position, and wherein the banknote transported to the storing unit is escrowed on the escrow plates when the escrow plates are located at the horizontally extending hold position.

13. The cashbag sealing system of claim 9, wherein the sensor transmits a signal confirming an arrival of the banknote to the storing unit, and wherein the sensor sends a signal to initiate movement of the escrow plate.

14. The cashbag sealing system of claim 9, wherein the sensor is protected by a protective cover.

15. The cashbag sealing system of claim 9, wherein the sensor sends a signal to indicate improper installation of the banknote storing bag.

16. The cashbag sealing system of claim 9, wherein the sensor sends a signal to indicate an absence of the banknote storing bag.

17. The cashbag sealing system of claim 9, wherein the sensor is configured to measure a seal quality of the banknote storing bag.

18. The cashbag sealing system of claim 9, wherein the storing unit includes a heating element, and wherein the heating element is configured to provide a nonlinear sealing of the banknote storing bag.

19. A cashbag sealing system comprising:

a banknote transport mechanism;

a storing unit, wherein the banknote transport mechanism is operable to transport a banknote to the storing unit, wherein the storing unit is operable to store the banknote transported to the storing unit, and wherein the storing unit includes a banknote storing bag to store the banknote, the banknote storing bag detachably coupled to the storing unit;

an escrow plate provided above the banknote storing bag; and a sensing means for measuring a level of banknotes in the banknote storing bag, and for detecting a presence of the banknote storing bag, wherein the sensing means is located on a top portion of the storing unit and faces down towards the escrow plate, and wherein the escrow plate is arranged to allow the sensing means to view into the banknote storing bag.

20. The cashbag sealing system of claim 19, wherein:

the escrow plate is operable to escrow the banknote before the banknote transported to the storing unit is stored in the banknote storing bag;

the escrow plate comprises a means to retain the escrowed banknote in a holding position and to move the escrow plate into a release position to drop the banknote into the banknote storing bag; and the sensing means is further for detecting a presence of the escrowed banknote on the escrow plate, and for measuring a height of a banknote stack on the escrow plate.

* * * * *